US010403173B2

(12) United States Patent
Fiske

(10) Patent No.: US 10,403,173 B2
(45) Date of Patent: Sep. 3, 2019

(54) NADO CRYPTOGRAPHY USING ONE-WAY FUNCTIONS

(71) Applicant: FISKE SOFTWARE LLC, San Francisco, CA (US)

(72) Inventor: Michael Stephen Fiske, San Francisco, CA (US)

(73) Assignee: Fiske Software, LLC, San Francisco, CA (US)

( * ) Notice: Subject to any disclaimer, the term of this patent is extended or adjusted under 35 U.S.C. 154(b) by 1108 days.

(21) Appl. No.: 14/292,935

(22) Filed: Jun. 1, 2014

(65) Prior Publication Data

US 2018/0233069 A1 Aug. 16, 2018

Related U.S. Application Data

(60) Provisional application No. 61/865,134, filed on Aug. 13, 2013, provisional application No. 61/992,915, (Continued)

(51) Int. Cl.
*G09C 1/00* (2006.01)
*H04L 9/06* (2006.01)
(Continued)

(52) U.S. Cl.
CPC ............... *G09C 1/00* (2013.01); *H04L 9/065* (2013.01); *H04L 9/0618* (2013.01);
(Continued)

(58) Field of Classification Search
None
See application file for complete search history.

(56) References Cited

U.S. PATENT DOCUMENTS 4,255,811 A 3/1981 Adler
4,316,055 A 2/1982 Feistel
(Continued)

FOREIGN PATENT DOCUMENTS

WO WO 2012/172080 A1 * 12/2012 ............... H04L 9/08

OTHER PUBLICATIONS

Dake. Image of SHA-1 avalanche effect. http://commons.wikimedia.org/wiki/File:Sha1_avalanche_effect.png# Oct. 2006.
(Continued)

*Primary Examiner* — Christopher A Revak
(74) *Attorney, Agent, or Firm* — David Lewis

(57) ABSTRACT

NADO Cryptography Using One-way Functions is a symmetric cryptography for encrypting and decrypting information. The NADO process introduces some novel concepts and methods to cryptography: (1) The notion of a key generator is presented that eliminates the dependence of the cryptographic security on a single, static cryptography key. (2) A key generator updating method built with one-way functions exhibiting the avalanche effect that generates an unpredictable sequence of keys as the encryption or decryption algorithm executes; (3) An sequence of unpredictable permutations that diffuse the informations across the whole block. (4) An sequence of unpredictable permutations that act as substitution boxes. (4) The use of key generator updating and one-way functions that exploit the avalanche effect to update the permutations in (3) and (4). NADO using one-way functions can be implemented efficiently in hardware or in software.

48 Claims, 13 Drawing Sheets

Related U.S. Application Data filed on May 14, 2014, provisional application No. 62/004,852, filed on May 29, 2014.

(51) Int. Cl.
  *H04L 9/08* (2006.01)
  *H04L 9/30* (2006.01)

(52) U.S. Cl.
  CPC .......... *H04L 9/0625* (2013.01); *H04L 9/0631* (2013.01); *H04L 9/0643* (2013.01); *H04L 9/0852* (2013.01); *H04L 9/0861* (2013.01); *H04L 9/0891* (2013.01); *H04L 9/3066* (2013.01); *H04L 2209/12* (2013.01); *H04L 2209/24* (2013.01); *H04L 2209/38* (2013.01)

(56) References Cited

U.S. PATENT DOCUMENTS

| | | | |
|---|---|---|---|
| 4,405,829 A | 9/1983 | Rivest et al. | |
| 5,001,753 A | 3/1991 | Davio | |
| 5,297,207 A | 3/1994 | Degele | |
| 5,375,170 A | 12/1994 | Shamir | |
| 5,511,123 A | 4/1996 | Adams | |
| 5,687,238 A | 11/1997 | Shimoda | |
| 5,724,428 A | 3/1998 | Rivest | |
| 5,835,600 A | 11/1998 | Rivest | |
| 6,031,911 A | 2/2000 | Adams | |
| 6,069,954 A * | 5/2000 | Moreau | H04L 9/0668 380/268 |
| 6,327,661 B1 | 12/2001 | Kocher | |
| 6,347,143 B1 | 2/2002 | Goff | |
| 7,215,269 B2 | 5/2007 | Fiske | |
| 7,215,769 B2 | 6/2007 | Fiske | |
| 9,246,674 B2 * | 1/2016 | Brainis | H04L 9/0852 |
| 2006/0126842 A1 * | 6/2006 | Campagna | H04L 9/0662 380/258 |
| 2009/0271462 A1 * | 10/2009 | Schneider | G06F 21/34 708/250 |
| 2011/0069834 A1 * | 3/2011 | Urbanik | H04L 9/0618 380/28 |
| 2011/0225425 A1 * | 9/2011 | Kotla | H04L 9/3236 713/175 |
| 2016/0380772 A1 * | 12/2016 | Gopal | H04L 9/3242 713/170 |

OTHER PUBLICATIONS

Praveen Gauravaram, Lars Knudsen, Krystian Matusiewicz, Florian Mendel, Christian Rochberger, Martin Schliffer, and Sren S. Thomsen. Grstl a SHA-3 candidate. http://www.groestl.info http://www.groestl.info/Groestl.pdf 2011.

Mihir Bellare and Phillip Rogaway. Introduction to Modern Cryptography. 2005. http://www.cs.ucdavis.edu/~rogaway/classes/227/spring05/book/main.pdf.

Oded Goldreich. Foundations of Cryptography. vols. I Basic Tools. Cambridge University Press. 2001.

Oded Goldreich. Foundations of Cryptography. vol. II Basic Applications. Cambridge University Press. 2004.

T.W. Cusick and Pante Stanica. Cryptographic Boolean Functions and Applications. Academic Press, Elsevier, 2009.

NIST. Advanced Encryption Standard (AES), FIPS 197. Nov. 2001. http://csrc.nist.gov/publications/fips/fips197/fips-197.pdf.

Richard A. Mollin. Codes: The Guide to Secrecy From Ancient to Modern Times. Chapman & Hall. 527-530, 2005.

Juliano Rizzo and Thai Duong. Practical Padding Oracle Attacks. Black Hat Conference. 2010. https://www.usenix.org/legacy/event/woot10/tech/full_papers/Rizzo.pdf http://en.wikipedia.org/wiki/Padding_oracle_attack http://people.cs.kuleuven.be/~andre.marien/security/playing%20with%20cbc.pdf.

Alex Biryukov and Khovratovich, D.: Related-Key Cryptanalysis of the Full AES-192 and AES-256. In Matsui, M., ed.: Asiacrypt. LNCS 5912, Springer, 1-18, 2009.

Alex Biryukov, Khovratovich, D., Nikolic, I. Distinguisher and Related-Key Attack on the Full AES-256. Advances in Cryptology—Crypto 2009. LNCS 5677. Springer, 231-249, 2009.

Patrick Derbez, Pierre-Alain Fouque and Jeremy Jean. Improved Key Recovery Attacks on Reduced-Round AES in the Single-Key Setting. Advances in Cryptology—Eurocrypt 2011. LNCS 7881. Springer, 371-387, 2011.

Alex Biryukov and Dmitry Khovratovich. Feasible Attack on the 13-round AES-256. 2010.

Andrey Bogdanov, Dmitry Khovratovich, and Christian Rechberger. Biclique Cryptanalysis of the Full AES. Advances in Cryptology—Asiacrypt 2011. LNCS 7073, Springer, 344-371, 2011.

Daniel Bernstein and Tanja Lange. Non-uniform cracks in the concrete: the power of free precomputation. Advances in Cryptology—Asiacrypt. LNCS 8270. Springer, 321-340, 2013.

Orr Dunkelman, Nathan Keller, Adi Shamir. Improved Single-Key Attacks on 8-round AES. Cryptology ePrint Archive. Report 2010:322, 2010. http://eprint.iacr.org/2010/322.pdf.

Jon Passki and Tom Ritter. An Adaptive-Ciphertext Attack against I ! C Block Cipher Modes with Oracle. IACR Cryptology ePrint Archive 2012:292, 2012. http://eprint.iacr.org/2012/292.pdf http://ritter.vg/blog-separator_oracle.html.

Horst Feistel. Cryptography and Computer Privacy. Scientific American. 228, No. 5, 15-23, 1973.

Clark Robinson. Dynamical Systems Stability, Symbolic Dynamics, and Chaos. CRC Press. 1995.

Xuejia Lai. Higher Order Derivatives and Differential Cryptanalysis. In Communications and Cryptography: Two Sides of One Tapestry, R.E. Blahut et al., eds., Kluwer Academic Publishers, 227-233, 1994.

Ming Duan, Xuejia Lai, Mohan Yang, Xiaorui Sun and Bo Zhu. Distinguishing Properties of Higher Order Derivatives of Boolean Functions. IACR Cryptology ePrint. 2010. https://eprint.iacr.org/2010/417.pdf.

NIST FIPS-180-4, Source Hash Standard, Mar. 2012. http://csrc.nlst.gov/publications/fips/fips180-4/fips-180-4.pdf.

John Hennessy, David Patterson. Computer Architecture. 5th Edition, Morgan Kaufmann, 2012.

NIST. FIPS-180-2: Secure Hash Standard, Aug. 2002. http://www.itl.nist gov/fipspubs/.

Data Encryption Standard. Federal Information Processing Standards Publication. FIPS PUB 46, National Bureau of Standards, Washington, DC. 1977.

Data Encryption Standard (DES). Federal Information Processing Standards Publication, FIPS PUB 46-3, National Bureau of Standards, Gaithersburg, MD. 1999. http://csrc.nist.gov/publications/fips/fips46-3/fips46-3.pdf.

ClaudeShannon.CommunicationTheoryofSecrecySystems.1949. http://netlab.cs.ucla.edu/wiki/ files/shannon1949.pdf.

Alan M. Turing. On computable numbers, with an application to the Entscheidungsproblem. Proc. London Math. Soc. Series 2 42 (Parts 3 and 4), 230-265, 1936.

Andre Stefanov, Nicolas Gisin, Olivier Guinnard, Laurent Guinnard, and Hugo Zbinden. Optical quantum random number generator, Journal of Modern Optics, 47(4):596 698, 2000.

Mario Stipcevic and B. Medved Rogina. Quantum random number generator based on photonic emission in semiconductors: Review of Scientific Instruments. 7B, 045104: 1-7, 2007.

A. A. Abbott, C. S. Calude, J. Conder & K. Svozil. Strong Kochen-Specker theorem and incomputability of quantum randomness. Physical Review A. 86 062109, 1-11, 2012.

John Conway and Simon Kochen. The Strong Free Will Theorem. Notices of the American Mathematical Society. 56(2), 226-232, Feb. 2009.

Simon Kochen and Ernst P. Specker. The Problem of Hidden Variables in Quantum Mechanics. Journal of Mathematics and Mechanics (now Indiana Univ. Math Journal) 17 No. 1, 59-87, 1967.

Klint Finley. Chinese 3upercomputer is Still the Worlds Most Powerful. Wired Magazine. Nov. 18, 2013.

(56) References Cited

OTHER PUBLICATIONS

Guido Bertoni, Joan Daemen, Michael Peeters, Gilles Van Assche. Keccak Reference 3.0 2011. http://keccak.noekeon.org/ http://en.wikipedia.org/wiki/Keccak.

Jean-Philippe Aumasson, Samuel Neves, Zooko Wilcox-O'Hearn, Christian Winnerlein. Blake. https://131002.net/blake/ http://en.wikipedia.org/wiki/BLAKE_(hash_function).

Hongjun Wu. The Hash Function JH. 2011. http://ehash.iaik.tugraz.at/wiki/JH http://www3.ntu.edu.sg/home/wuhj/research/jh/jh_round3.pdf.

Niels Ferguson, Stefan Lucks, Bruce Schneier, Doug Whiting, Mihir Bellare, Tadayoshi Kohno, Jon Callas, Jesse Walker. The Skein Hash Function Family. 2010. https://www.schneier.com/skein1.3.pdf http://en.wikipedia.org/wiki/Skein_(hash_function).

A.F. Webster and S.E. Tavares. On the Design of S-Boxes. Advances in Cryptology. CRYPTO 85 Proceedings. LNCS 218. Springer, 523-534, 1986.

Fouz Sattar and Muid Mufti. Spectral Characterization and Analysis of Avalanche in Cryptographic Substitution Boxes using Walsh-Hadamard Transformations. International Journal of Computer Applications. 28 No. 6. Aug. 2011.

Michael Stephen Fiske. Non-autonomous Dynamical Systems Applicable to Neural Computation. Northwestern University. 1996.

Mike Spivak. Differential Geometry. vol. I. Publish or Perish, Inc. 1979.

Nathan Jacobson. Basic Algebra I. W.H. Freeman and Company. 1985.

Daniel Bernstein. Curve25519: new Diffie-Hellman speed records. Public Key Cryptography. LNCS 3958. New York, Springer. 207-228, 2006. http://cr.yp.to/ecdh/curve25519-20080209.pdf.

Neil Koblitz. Introduction to Elliptic Curves and Modular Forms, Springer-Verlag 1984.

Joseph Silverman and John Tate. Rational Points on Elliptic Curves. Springer-Verlag 1992.

J.D Golic, Linear Models for keystream generators. Computers, IEEE Transactions on vol. 45, Issue 1, 1996, 41-49.

B Srisuchinwong, T.A. York, P. Tsalides. A symmetric cipher using autonomous and non-autonomous cellular automata. Global Telecommunications Conference. Globecom 1995. IEEE vol. 2, Nov. 13-17, 1995 pp. 1172-1177.

C. Riera, M.G. Parker. Generalized Bent Criteria for Boolean Functions. Information Theory. IEEE Transactions on vol. 52, Issue 9, Sep. 2006, pp. 4142-4159.

\* cited by examiner

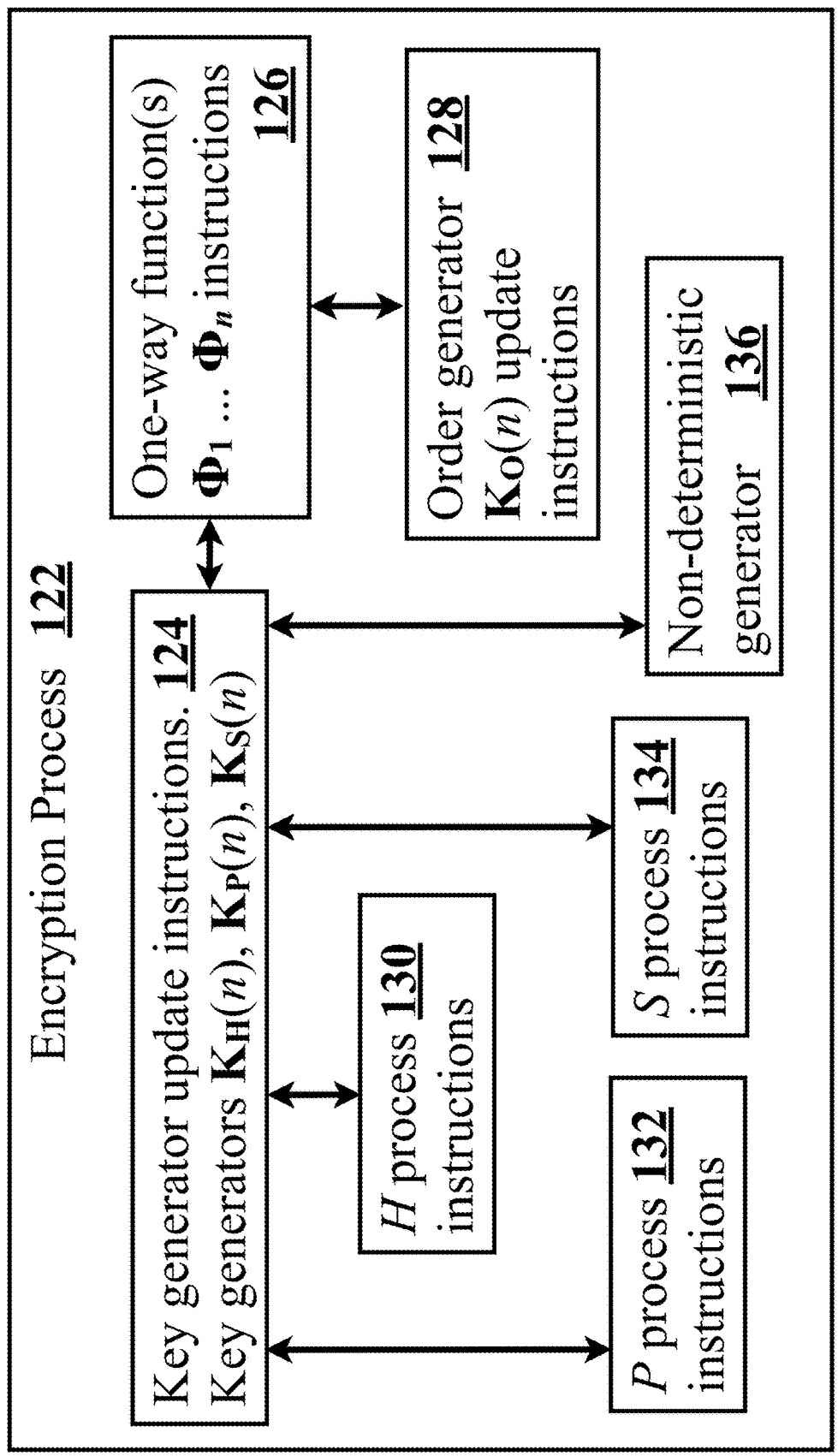

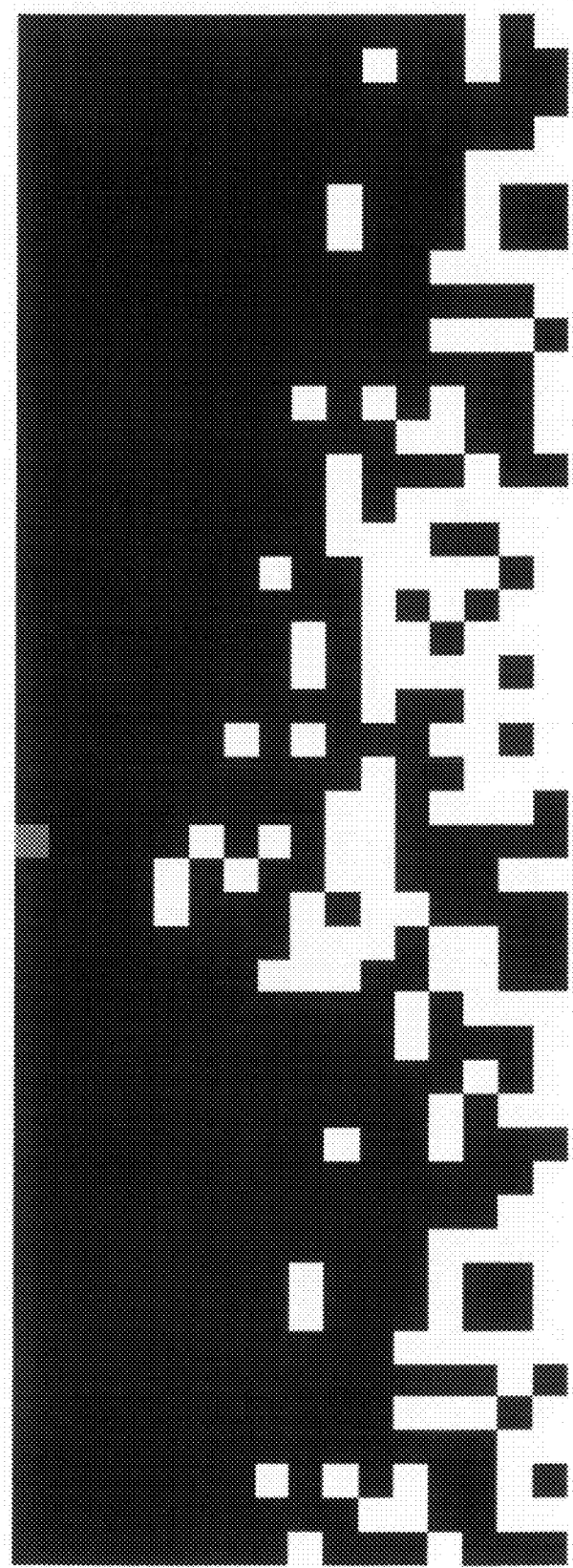

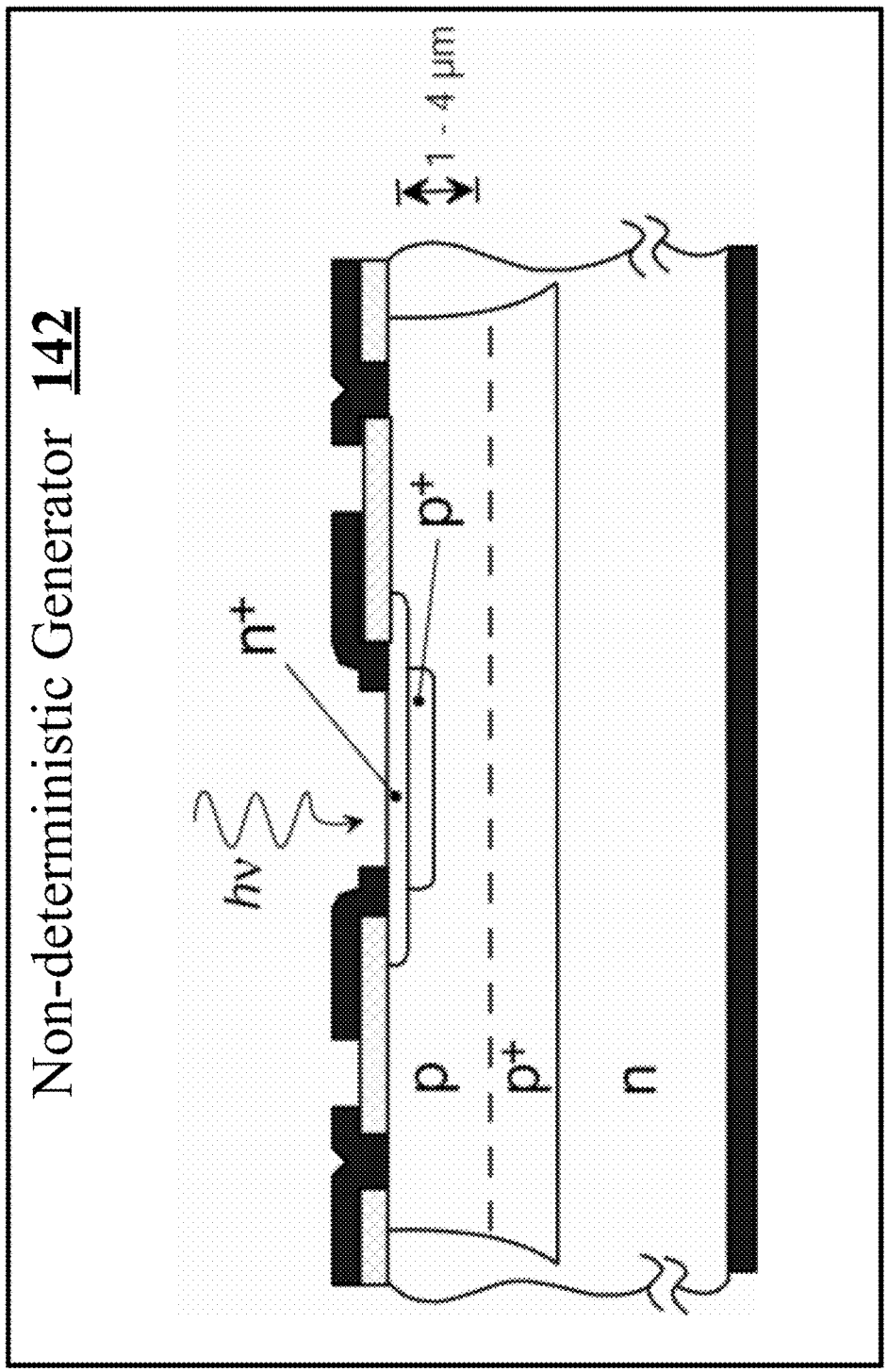

*H* process: AES block cipher

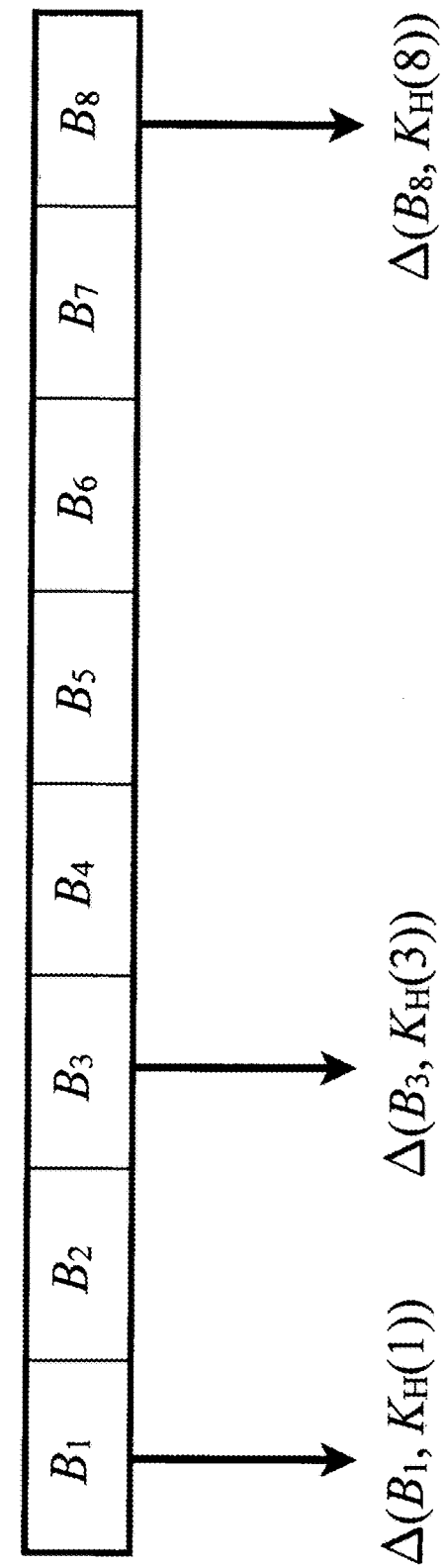

A permutation [4, 2, 0, 5, 3, 1] that permutes 6 bits.

$P$ process: $\mu$ permutes 512 bits $k_i$ corresponds to K[i] in C-code listing

NADO CRYPTOGRAPHY USING ONE-WAY FUNCTIONS

1 RELATED APPLICATIONS

This application claims priority benefit of U.S. Provisional Patent Application Ser. No. 61/865,134, entitled "NADO Cryptography using one-way functions", filed Aug. 13, 2013, which is incorporated herein by reference. This application claims priority benefit of U.S. Provisional Patent Application Ser. No. 61/992,915, entitled "NADO Cryptography using key generators with one way functions", filed May 14, 2014, which is incorporated herein by reference. This application claims priority benefit of U.S. Provisional Patent Application Ser. No. 62/004,852, entitled "NADO Cryptography Using One-Way functions", filed May 29, 2014, which is incorporated herein by reference.

2 BACKGROUND

Field of Invention

The present invention relates broadly to cryptographic methods and devices. In some embodiments, it pertains to symmetric cryptographic methods and machines. Cryptographic devices and methods are generally used to encrypt and decrypt information transmitted through communication and transmission systems. For example, the cryptographic methods may be used to encrypt a phone call; in some embodiments, the phone call may be transmitted using voice over IP (internet protocol) using a mobile phone. These methods also may be used to encrypt passive data stored on a computer or another physical device such as a tape drive. Typically, the information is encrypted by a sending agent, sometimes called Bob, using his unique key(s), and the encrypted information, called ciphertext, is transmitted to a receiving agent, sometimes called Alice. Using her unique key(s), the receiving agent Alice applies a decryption device or method to the ciphertext. The output of this decryption device or method is the same information that the sending agent gathered before encrypting and sending it.

3 BACKGROUND

Prior Art

The subject matter discussed in this background section should not be assumed to be prior art merely as a result of its mention in the background section. Similarly, a problem mentioned in the background section or associated with the subject matter of the background section should not be assumed to have been previously recognized in the prior art. The subject matter in the "Summary and some Advantages of Invention" section represents different approaches, which in and of themselves may also be inventions, and various problems, which may have been first recognized by the inventor.

Reference [1] provides a practical and theoretical description of cryptography and cryptographic methods. References [2, 3, 4] also provide a description of current cryptographic methods that are publicly available. Public-key cryptography is typically used for key management and a myriad of protocols. Symmetric private-key cryptography is useful for encrypting data and securing private voice and written communications.

AES is a block cipher with block size 16 bytes (128 bits) that is a symmetric cryptographic algorithm [5, 6]. AES is commonly used in industry, endorsed by NIST, and used by the United States Department of Defense. AES is the most widely used block cipher today. For example, AES-128—that uses 128 bit keys—is currently used by the FileVault application on Apple computers. FileVault encrypts the hard drive inside the Apple Computer.

In recent years, various attacks on the AES cipher have demonstrated weaknesses in the AES cipher. In some cases, practical oracle padded attacks [7] have been able to capture the plaintext from ciphertext that has been encrypted by AES. At least part of the weakness in AES is slow diffusion in the key scheduling [8, 9, 10]. AES's weaknesses are further exacerbated by a static substitution box and for a fixed key, AES maps two identical blocks of plaintext to two identical blocks of ciphertext. In particular, a feasible attack on AES-256 has been demonstrated with only one fewer round—13 rounds instead of 14—in the key schedule [11]. Overall, in recent years, additional publicly available (non-classified) attacks on the AES cipher have been discovered [12, 13, 14, 15], which suggest that AES is not as strong a cipher as previously believed by the cryptographic community.

Furthermore, the prior art [1, 2, 6, 16] does not disclose the notion of a key generator nor of deriving a new key based on the updating of a key generator. The use of key generators in this invention eliminates the dependence of the cryptographic security on a single, static cryptography key. Typically, the cryptographic methods in the prior art use a static key throughout the entire execution of the encryption algorithm. The use of a static key in the prior art is further implied by some attacks—cited in the previous paragraph—that attempt to capture or reconstruct the static key.

As an example of the static key assumption in the prior art, some oracle padded attacks [7] rely upon the fact that the attacker has some information about the last block. This helps the attacker work backwards to find the static key. In this invention, the use of one-way functions to dynamically update the key generator helps hinder the adversary obtaining even the key used for that one block because this would require a pre-image attack on a one-way function with no direct information about the digest and searching over a sequence of larger key generators, rather than searching for one static key used for every block.

4 SUMMARY AND SOME ADVANTAGES OF INVENTION

The invention(s) described here is a process for encrypting and decrypting information, used in communication, transmission and data storage systems. The first stage or method is called the H process. One of the purposes of the H process is to use a one-way function to partially encrypt the plaintext and help uniformly distribute the statistics of the ciphertext delivered to stage 2. The H process uses a key generator updating method that utlizes one-way functions. In some embodiments, the H process may be implemented with a block cipher where the key generator is updated after one or more blocks of plaintext have been encrypted by the block cipher. In some embodiments, this block cipher may be AES-256 or AES-128 or DES. In other embodiments, a new stream cipher method, described in section 6.13, titled PROCESS H AS A STATE GENERATOR; this method also uses key generator updating and one-way functions to implement the H process as stream cipher.

The second stage or method is called the P process. The P process uses a dynamically perturbed permutation to diffuse the partially encrypted plaintext information, created by the H process, across the whole block of information. FIGS. 6a and 6b illustrate how a permutation can diffuse the information across a block of information. In some embodiments, the block size is 256 bytes which is substantially larger than the block size of AES. In other embodiments, the block size may be 64 bytes, 128 bytes or even 1024 bytes.

The third stage or method is called the S process. The S process uses a dynamically updated (perturbed) permutation that acts as a nonlinear substitution box [16]. This substitution box is perturbed after one or more bytes have been encrypted so it is a dynamic substitution box, not static.

The invention introduces the notion of a key generator and key generator updating. This enables each key used by each process to be unpredictably updated after the processes have together encrypted one or more blocks of plaintext. Furthermore, the key generator may be significantly larger than the key used by each of the three processes. The key generator updating creates favorable, cryptographic properties and strengthens cryptographic ciphers that already exist and have been tested.

Each process depends on a distinct dynamically updated key generator so that the key generator is updated (perturbed) independently of the other two. In other words, these three different dynamically perturbed (updated) key generators are independent of each other; from an alternative perspective, these three processes are three distinct dynamical systems [17] that work together to execute a symmetric cryptography. If m denotes a block of the plaintext, then the complete encryption of one block of plaintext m can be expressed as $c=S(P(H(m, K_H(n_H)), K_P(n_P), K_S(n_S))$, where $K_S(n_S)$ is the $n_S$ update of the original key generator $K_S(0)$ for the S process; where $K_P(n_P)$ is the $n_P$ update of the original key generator $K_P(0)$ for the P process; and $K_H(n_H)$ is the $n_H$ update of the original key generator $K_H(0)$ for the H process. $n_H$, $n_P$ and $n_S$ are natural numbers. For these embodiments, the decryption of ciphertext c, can be expressed as $H^{-1}(P^{-1}(S^{-1}(c, K_S(n_S)), K_P(n_P)), K_H(n_H))=m$.

Each key generator $K_H$, $K_P$ and $K_S$ can be represented as a circular array. This enables the key generator updating method to exclusive- or a rotation of this circular array with a one-way hash of part of the circular array. This method of key generator updating exploits the avalanche effect of the one-way hash functions and causes each initial key generator $K_H(0)$, $K_P(0)$, and $K_S(0)$ to iterate over a huge orbit. In more concrete terms, the sequence $K_H(0)$, $K_H(1)$, $K_H(2)$, ..., $K_H(n)$ ... does not have collisions until it is about the length predicted by the birthday paradox, based on a uniform probability distribution. Page 77 of [1] provides a description of the well-known birthday paradox. FIG. 1C shows an example of the avalanche effect for one-way hash function SHA-1 [18].

Furthermore, even when there is a collision after the mth iteration of the key generator, in general, the period of the orbit of $K_H$ is substantially larger and is usually on the order of $2^{|K_H|}$ where $|K_H|$ is the length of key generator $K_H$. For example, if $|K_H|=512$ bits, and key generator $K_H(n)$ is used to derive a new 256-bit AES key for the nth block of 16 bytes of plaintext, then the periodicity of this orbit is substantially greater than $2^{256}$ even though for process H it is an orbit on $\{0, 1\}^{256}$. When this key generator updating method is applied—using one or more one-way function with a good avalanche effect—where AES-256 is the block cipher used in the H process, this substantially increases the computational complexity that must be overcome in order to break process H as a standalone block cipher.

The motivation for the new notion of a key generator and its design can also be understood from a differential cryptanalysis point of view [19]. In the AES-256 cipher, each distinct 256-bit key K creates a different encryption boolean function $E(K, \cdot)$ where $E: \{0, 1\}^{256} \times \{0, 1\}^{128} \rightarrow \{0, 1\}^{128}$. In other words, the key K acts as a parameter where each $E(K, \cdot)$ is some function $f: \{0, 1\}^{128} \rightarrow \{0, 1\}^{128}$ with $f = (f_1, \ldots, f_{128})$ and each $f_k: \{0, 1\}^{128} \rightarrow \{0, 1\}$. As discussed in [20], each $f_k$ has a degree $\leq 128$. From this perspective, the key generator updating creates a high, dimensional orbit over the function space $\{f | f: \{0, 1\}^{128} \rightarrow \{0, 1\}^{128}\}$, which greatly increases the effective degree. Overall, key generator updating, based on one-way functions with a good avalanche effect, creates a powerful cryptographic method that can enhance the cryptographic strength of primitives such as AES-256 that have already been analyzed for many years.

Further, in some embodiments, the completeness property and avalanche effect of good one-way function(s) enables consecutive key generators $K_H(n)$ and $K_H(n+1)$ to have a Hamming distance that is about $\frac{1}{2}|(K_H(n)|$, which means $K_H(n) \oplus K_H(n+1)$ is about half ones and half zeroes and their order is unpredictable. This property hinders key related attacks. These favorable cryptographic, properties also hold for the orbit of the S key generator $K_S(0)$, $K_S(1)$, $K_S(2)$, ..., $K_S(n)$ ... and the orbit of the P key generator $K_P(0)$, $K_P(1)$, $K_P(2)$, ..., $K_P(n)$ ....

In some embodiments, the S process may be performed after the H process. In these embodiments, the encryption of one block of plaintext m is expressed as $c=P(S(H(m, K_H(n_H)), K_S(n_S)), K_P(n_P))$ Similarly, $K_S(n_S)$ is the $n_S$ update of the original key generator $K_S(O)$ for the S process; where $K_P(n_P)$ is the $n_P$ update of the original key generator $K_P(0)$ key for the P process; and $K_H(n_H)$ is the $n_H$ update of the original key generator $K_H(0)$ for the H process. For these embodiments, the decryption of ciphertext c can be expressed as $P^{-1}(H^{-1}(S^{-1}(c, K_S(n_S)), K_H(n_H)), K_P(n_P))=m$.

Typically, one-way hash functions are used to authenticate information. The information that is being authenticated is sometimes called a message in the cryptographic literature that discusses one-way hash functions. In the prior art, one-way hash functions have not been used directly in encryption and decryption because one-way hash functions are not 1 to 1. (See section 6.8, titled PERMUTATIONS, for a definition of 1 to 1.) In the publication FIPS 180-4, Secure Hash Standard, written by the National Institute of Standards (NIST), the abstract [21] states:

Abstract

This standard specifies hash algorithms that can be used to generate digests of messages. The digests are used to detect whether messages have been changed since the digests were generated.

This specification describes a novel use of one-way functions to unpredictably update key generators and also perturb the H, P and S processes used in the cryptography. Each of the three processes may use one-way functions. The avalanche property of the one-way functions helps strengthen NADO cryptography against differential cryptanalysis attacks and other kinds of attacks.

NADO may be implemented efficiently in hardware or software. In some embodiments, process H is a block cipher. In other embodiments, as described in section 6.13, process H is a state generator that acts as a stream cipher, by generating an unpredictable sequence of states with the help of one-way hash functions and key generator updating that also uses one-way functions. Process P generates an unpredictable, sequence of permutations that diffuses the encrypted information, created by the H process, across a block that is usually greater than 16 bytes; Process S generates a sequence of substitution boxes, each created by a permutation that is dynamically updated after one or more bytes of encryption.

Another enhancement is the difficulty of breaking this encryption method as function of its execution speed. The executable code that implements a NADO embodiment requires a small amount of computer memory, less than 5K of RAM for even relatively large key generators $K_H$, $K_P$, and $K_S$. This embodiment can execute on a Reduced Instruction Set Computer (RISC) 150 MHZ chip [22]; this embodiment protects the privacy of a real-time mobile phone conversation. For this embodiment, the key generator $K_H$ for the H process has size at least 512 bits; the key generator $K_P$ for the P process has size at least 512 bits; and the key generator $K_S$ for the S process has size at least 512 bits. Further, in this real-time mobile phone embodiment, each of these key generators are independent of the other two and are updated using the one-way hash function SHA-512 [23] or another one-way hash function such as Keccak, Salsa, Blake, Skein or Grstl. Some NADO embodiments are fast enough to enable applications such as real-time encryption of wireless transmissions, real-time embedded systems, secure communications between satellites and the secure routing and transmission of Internet traffic.

5 BRIEF DESCRIPTION OF THE FIGURES

In the following figures, although they may depict various examples of the invention, the invention is not limited to the examples depicted in the figures.

FIG. 1B shows a process for encrypting information.

FIG. 1C shows the avalanche effect after 16 rounds of the SHA-1 one-way hash function on the first 46 bits of the SHA-1 output.

FIG. 1D shows a diagram of a semiconductor chip that can detect photons and generates a non-deterministic process.

FIG. 5b shows another embodiment of the H process being implemented with the DES block cipher [24, 25].

Figure 6A:
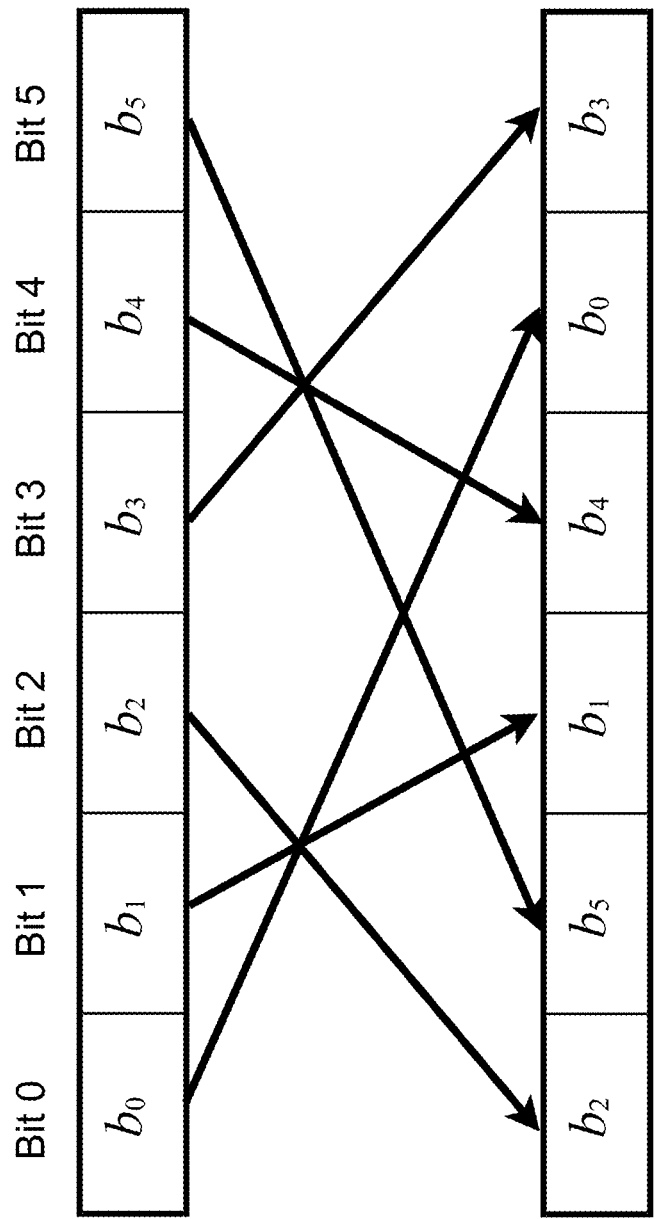
FIG. 6a shows a permutation $\sigma=[4,2,0,5,3,1]$ that permutes 6 bits over a 6 bit block. The representation [4,2,0,5,3,1] means $\sigma(0)=4$, $\sigma(1)=2$, $\sigma(2)=0$, $\sigma(3)=5$, $\sigma(4)=3$ and $\sigma(5)=1$.
Figure 6B:
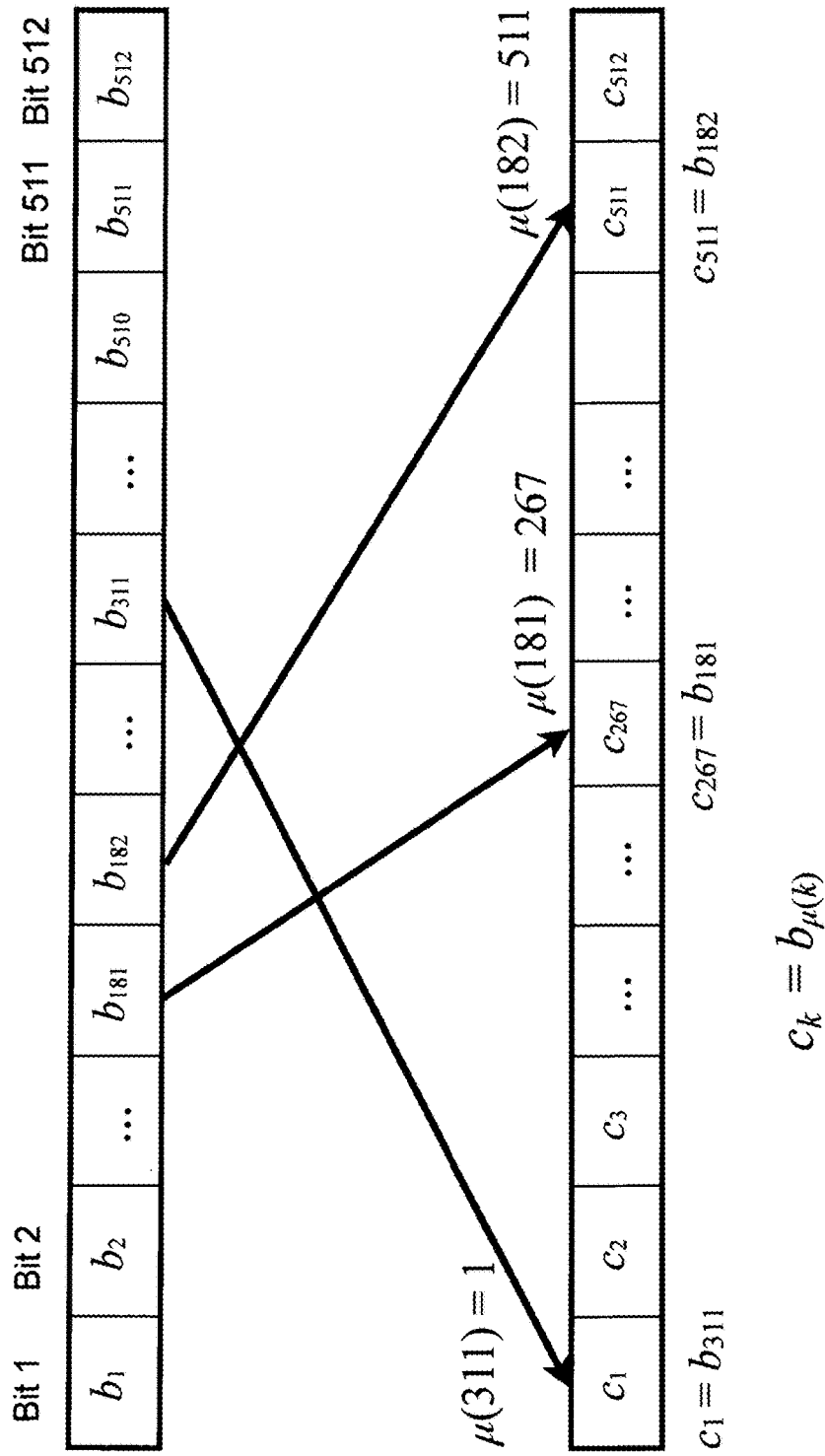

FIG. 6b shows the P process permuting (diffusing) bits over a 512 bit block. μ is the permutation that performs this diffusion. In FIG. 6b, μ sends bit 181 to bit 267 and also maps bit 311 to bit 1. In [26], the cryptographic value of diffusing information was presented.

Figure 7:
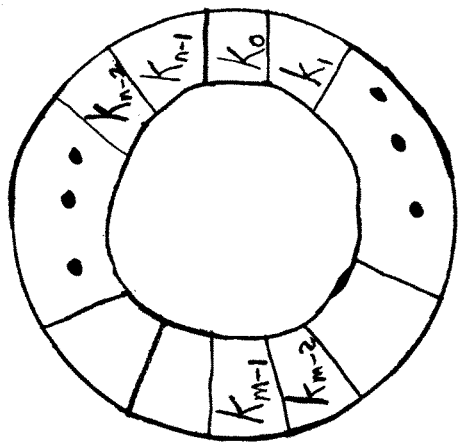
Figure 7:
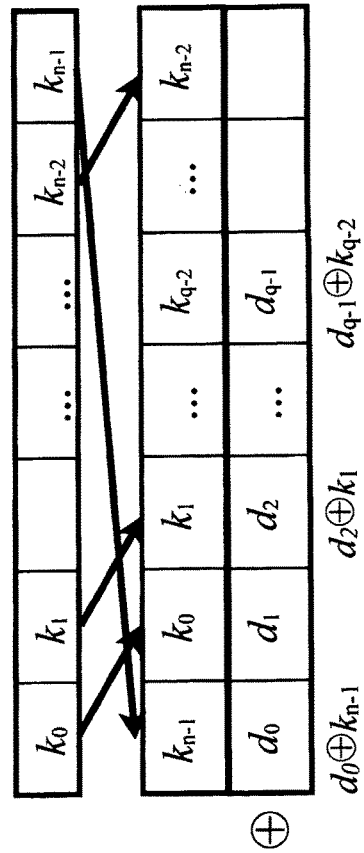

FIG. 7 shows a computation that updates the key generator. The key generator K, indicated in FIG. 7, may represent key generator $K_H$ used by the H process, or key generator $K_P$ used by the P process or key generator $K_S$ used in the S process. The symbol Φ represents a one-way hash function. The key generator K is rotated one element to the right and then part of it $K_m$ is hashed by Φ and then exclusive-or'd with the rotated key. This updates the key generator in an unpredictable way and exploits the avalanche effect of the one-way function. After enough key generator updates, this updating eventually mixes the output of the one-way function across the whole key generator in an unpredictable way even for a large key generator such as a 512 byte key generator.

6 DETAILED DESCRIPTION

Although various embodiments of the invention may have been motivated by various deficiencies with the prior art, which may be discussed or alluded to in one or more places in the specification, the embodiments of the invention do not necessarily address any of these deficiencies. In other words, different embodiments of the invention may address different deficiencies that may be discussed in the specification. Some embodiments may only partially address some deficiencies or just one deficiency that may be discussed in the specification, and some embodiments may not address any of these deficiencies.

Section 6.1, titled INFORMATION SYSTEM, describes information systems that utilize the cryptographic process. Section 6.3, titled CRYPTOGRAPHIC PROCESS, describes the cryptographic process. Sections 6.2, 6.4, 6.5, 6.7, 6.8, 6.9, 6.10, 6.11, 6.12, and 6.13 describe novel algorithms, concepts, hardware, infrastructure, machines, methods, techniques and systems that contribute to some embodiments of the cryptographic process. Section 6.14 describes some key generator distribution methods. Section 6.15 describes the general Diffie-Hellman key generator exchange, based on abelian groups, that securely creates and distributes key generators between Alice and Bob. Section 6.16 describes an elliptic curve Diffie-Hellman exchange that uses non-determinism to create the private keys.

6.1 Information System

Figure 1A:
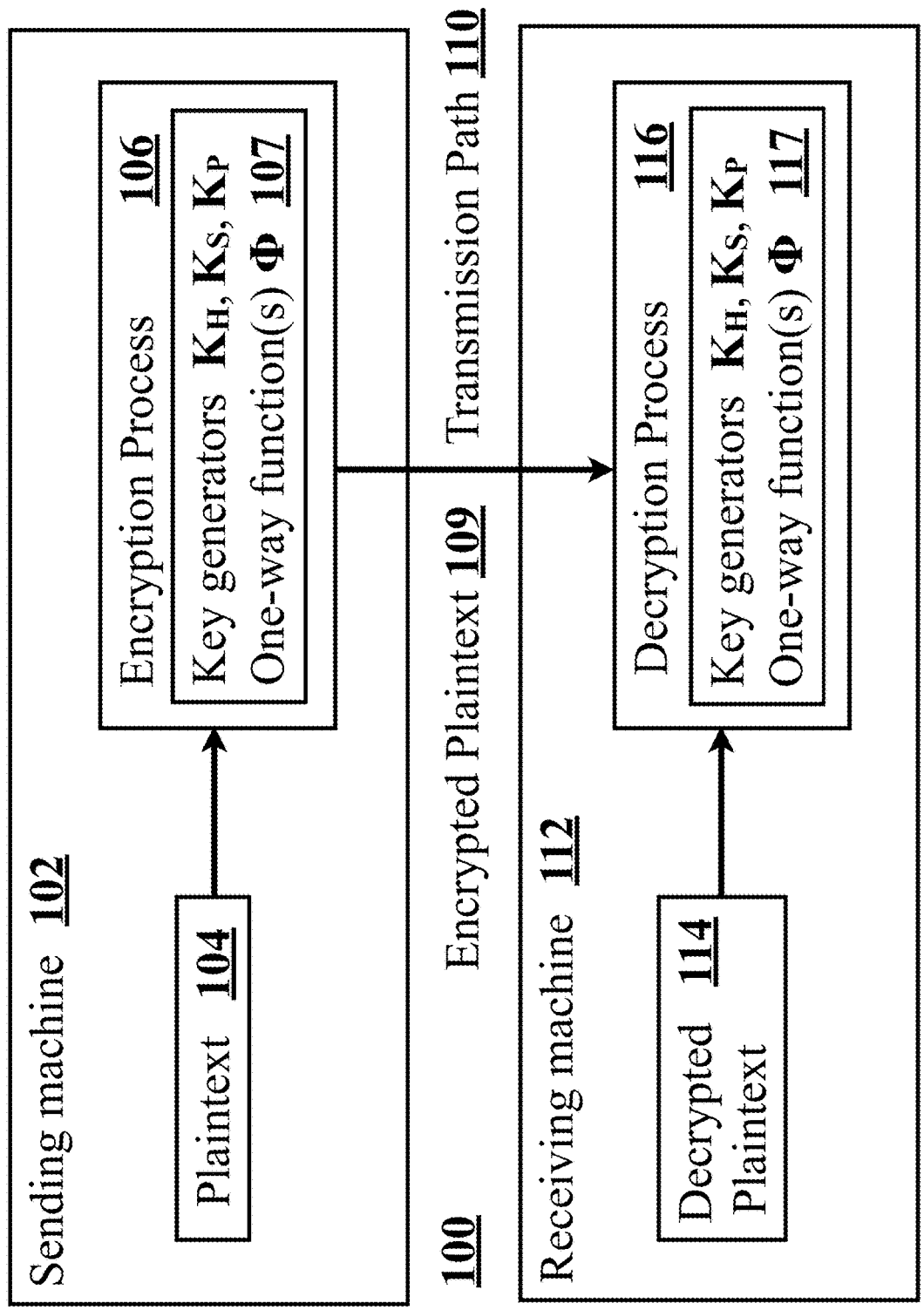
FIG. 1A shows an information system for sending and receiving encrypted information.

FIG. 1A shows an information system 100 for encrypting information in a manner that is expected to be secure. Information system 100 includes plaintext 104 (unencrypted information), encryption processes 106, key generators 107 and one-way hash 107, a sending machine 102, encrypted plaintext (encrypted information) 109 and a transmission path 110, a decrypting machine 112, decryption processes 116, decrypted plaintext 114, and key generators 117 and one-way hash 117. In other embodiments, information system 100 may not have all of the components listed above or may have other components instead of and/or in addition to those listed above.

Information system 100 may be used for transmitting encrypted plaintext. Plaintext 104 refers to information that has not been encrypted yet that is intended to be delivered to another location, software unit, machine, person, or other entity. Although plaintext has the word "text" in it, the meaning of plaintext in this specification is broader and refers to any kind of information that has not been encrypted. For example, plaintext could be voice data that has not yet been encrypted. In an embodiment, plaintext may be unencrypted information being transmitted wirelessly between satellites. Plaintext may be represented in analog form in some embodiments and may be represented in digital form. In an embodiment, the sound waves transmitted from a speaker's mouth into a mobile phone microphone are plaintext. The representation of this plaintext information before reaching the microphone is in analog form. Subsequently, the plaintext information may be digitally sampled so it is represented digitally after being received by the mobile phone microphone. In general, plaintext herein refers to any kind of information that has not been encrypted.

In this specification, the term location may refer to geographic locations and/or storage locations. A particular storage location may be a collection of contiguous and/or noncontiguous locations on one or more machine readable media. Two different storage locations may refer to two different sets of locations on one or more machine-readable media in which the locations of one set may be intermingled with the locations of the other set. In this specification, the term "machine-readable medium" is used to refer to any medium capable of carrying information that is readable by a machine. One example of a machine-readable medium is a computer-readable medium. Another example of a machine-readable medium is paper having holes that are detected that trigger different mechanical, electrical, and/or logic responses. The term machine-readable medium also includes media that carry information while the information is in transit from one location to another, such as copper wire and/or optical fiber and/or the atmosphere and/or outer space. It may be desirable to keep the contents of plaintext 104 secret. Consequently, it may be desirable to encrypt plaintext 104, so that the transmitted information is expected to be unintelligible to an unintended recipient should the unintended recipient attempt to read and/or decipher the encrypted plaintext transmitted. Plaintext 104 may be a collection of multiple, unencrypted information blocks, an entire plaintext, a segment of plaintext (information), or any other portion of a plaintext.

Encryption process 106 may be a series of steps that are performed on plaintext 104. In this specification, the term "process" refers to a series of one or more operations. In one embodiment, the term "process" refers to one or more instructions for encrypting machine 102 to execute the series of operations that may be stored on a machine-readable medium. Alternatively, the process may be carried out by and therefore refer to hardware (e.g., logic circuits) or may be a combination of instructions stored on a machine-readable medium and hardware that cause the operations to be executed by encrypting machine 102 or decrypting machine 112. Plaintext 104 may be an input for encryption process 106. The steps that are included in encryption process 106 may include one or more mathematical operations and/or one or more other operations. In an embodiment, "process" may also include operations or effects that are best described as non-deterministic. In an embodiment, "process" may include some operations that can be executed by a digital computer program and some physical effects that are non-deterministic.

Herein the term "process" refers to and expresses a broader notion than "algorithm". The formal notion of "algorithm" was presented in Turing's paper [27] and refers to a finite machine that executes a finite number of instructions with finite memory. "Algorithm" is a deterministic process in the following sense: if the finite machine is completely known and the input to the machine is known, then the future behavior of the machine can be determined. However, there is quantum random number generator (QRNG) hardware [28, 29] and other embodiments that measure quantum effects from photons, whose physical process is non-deterministic. The recognition of non-determinism observed by quantum random number generators and other quantum embodiments is based on experimental evidence and years of statistical testing. Furthermore, the quantum theory—derived from the Kochen-Specker theorem and its extensions [30, 31, 32]—implies that the outcome of a quantum measurement cannot be known in advance and cannot be generated by a Turing machine (digital computer program). As a consequence, a non-deterministic process cannot be generated by an algorithm; namely, a sequence of operations executed by a digital computer program. FIG. 1D shows an embodiment of a non-deterministic process.

In FIG. 1A, key generators 107 may include one or more key generators. Key generators 107 may be used by encryption process 106 to help derive one or more keys used to encrypt at least part of plaintext 104. Key generators 117 may be used by decryption process 116 to help derive one or more keys used to decrypt at least part of encrypted plaintext 109. In an embodiment, one or more key generators 107 and key generators 117 are derived from a non-deterministic generator 136 in FIG. 1B. In another embodiment, by using key generators 107, two parties may use the same encryption process, but are still not expected to be able to decrypt one another's encrypted information unless they use the same key generators 107 in the same order during the cryptographic process. Key generators 107 may be a broad range of sizes. For example, if the size of a key generator 107 is measured in bits, one or more key generators may be 256 bits, 512 bits, 1000 bits, 1024 bits, 4096 bits or larger. In an embodiment, two parties (Alice and Bob) may establish the same key generators 107, by first generating Diffie-Hellman private keys from their respective non-deterministic generators 136 and then executing a Diffie-Hellman key generator exchange. Details of a Diffie-Hellman key generator exchange, using elliptic curves, are described in section 6.16, titled KEY GENERATOR EXCHANGE USING ELLIPTIC CURVES. In an embodiment, the hardware device shown in FIG. 1D may be part of non-deterministic generator 136.

Sending machine 102 may be an information machine that handles information at or is associated with a first location, software unit, machine, person, sender, or other entity. Sending machine 102 may be a computer, a phone, a mobile phone, a telegraph, a satellite, or another type of electronic device, a mechanical device, or other kind of machine that sends information. Sending machine 102 may include one or more processors and/or may include specialized circuitry for handling information. Sending machine 102 may receive plaintext 104 from another source (e.g., a transducer such as a microphone), may produce all or part of plaintext 104, may implement encryption process 106, and/or may transmit the output to another entity. In another embodiment, sending machine 102 receives plaintext 104 from another source, while encryption process 106 and the delivery of the output of encryption process 106 are implemented manually. In another embodiment, sending machine 102 implements encryption process 106, having plaintext 104 entered, via a keyboard (for example) or via a mobile phone microphone, into sending machine 102. In another embodiment, sending machine 102 receives output from encryption process 106 and sends the output to another entity. In an embodiment, sending machine 102 may generate new key generators 107 for other information machines. Throughout this specification other embodiments may be obtained by substituting a human being, software, or other entity for the sending machine 102.

Encrypted plaintext 109 includes at least some plaintext 104 that is encrypted by encryption process 106.

Transmission path 110 is the path taken by encrypted plaintext 109 to reach the destination to which encrypted plaintext 109 was sent. Transmission path 110 may include one or more networks. For example, transmission path 110 may be the Internet; for example, transmission path 110 may be wireless using voice over Internet protocol. Transmission path 110 may include any combination of any of a direct connection, hand delivery, vocal delivery, one or more Local Area Networks (LANs), one or more Wide Area Networks (WANs), one or more phone networks, including paths under the ground via fiber optics cables and/or one or more wireless networks, and/or wireless inside and/or outside the earth's atmosphere.

Receiving machine 112 may be an information machine that handles information at the destination of an encrypted plaintext 109. Receiving machine 112 may be a computer, a phone, a telegraph, a router, a satellite, or another type of electronic device, a mechanical device, or other kind of machine that receives information. Receiving machine 112 may include one or more processors and/or specialized circuitry configured for handling information, such as encrypted plaintext 109. Receiving machine 112 may receive encrypted plaintext 109 from another source and/or reconstitute (e.g., decrypt) all or part of encrypted plaintext 109.

In one embodiment, receiving machine 112 only receives encrypted plaintext 109 from transmission path 110, while encryption process 106 is implemented manually and/or by another information machine. In another embodiment, receiving machine 112 implements decryption process 116 that reproduces all or part of plaintext 104, referred to as decrypted plaintext 114. In another embodiment, receiving machine 112 receives encrypted plaintext 109 from transmission path 110, and reconstitutes all or part of decrypted plaintext 114 using decryption process 116.

Receiving machine 112 may be identical to sending machine 102. For example, receiving machine 112 may receive plaintext 104 from another source, produce all or part of plaintext 104, and/or implement encryption process 106. Similar to sending machine 102, receiving machine 112 may create key generators 117. Receiving machine 112 may transmit the output of decryption process 116, via transmission path 110 to another entity and/or receive encrypted plaintext 109 (via transmission path 110) from another entity. Receiving machine 112 may present encrypted plaintext 109 for use as input to decryption process 116. Throughout this specification other embodiments may be obtained by substituting a human being, software, and/or another entity for the receiving machine 112.

6.2 The Avalanche Effect and One-Way Functions

One-way function 107 in FIG. 1A and one-way function 126 in FIG. 1B may include one or more one-way functions. A one-way function $\Phi$, has the property that given an output value z, it is computationally intractable to find an information element $m_z$ such that $\Phi(m_z)=z$. In other words, a one-way function $\Phi$ is a function that can be easily computed, but that its inverse $\Phi^{-1}$ is computationally intractable to compute. For today's computers, a computation that takes $10^{101}$ computational steps is considered computationally intractable.

More details are provided on computationally intractable. In an embodiment, there is an amount of time T that encrypted information must stay secret. If encrypted information has no economic value or strategic value after time T, then computationally intractable means that the number of computational steps required by all the world's computing power will take more time to compute than time T. Let C(t) denote all the world's computing power at the time t in years. For example, C(2013) is considerably larger than C(1970).

Consider an online bank transaction that encrypts the transaction details of that transaction. Then in most embodiments, the number of computational steps that can be computed by all the world's computers for the next 30 years is in many embodiments likely to be computationally intractable as that particular bank account is likely to no longer exist in 30 years or have a very different authentication interface.

To make the numbers more concrete, the 2013 Chinese supercomputer that broke the world's computational speed record computes about 33,000 trillion calculations per second [33].

The meaning of computationally intractable may depend upon the technology and scientific knowledge that exists during the time period for which the encrypted information should stay secret. For example, if the allied armies planning to invade Normandy encrypted their communications about their invasion plans 3 weeks in advance, then all the world's computing power that existed during World War II must not be able to break those encrypted communications for at least 4 weeks and possibly a longer time T is required. C(1945) is likely to have been considerably less than the computational speed of the aforementioned Chinese supercomputer. Thus, in 1945 computationally intractable for T=4 weeks on the Normandy invasion is considerably less than 33,860 trillion calculations per second×4 weeks, which equals $33.86\times10^{15}\times3600\times24\times28<8.2\times10^{22}$ calculations.

If T=1 one year and we can assume that there are at most 1 billion of these supercomputers. (This can be inferred from economic considerations, based on a far too low 1 million dollar price for each supercomputer. Then these 1 billion supercomputers would cost 1,000 trillion dollars.). Thus, C(2014)×1 year is less than $10^9\times33\times10^{15}\times3600\times24\times365=1.04\times10^{33}$ computational steps. To get some perspective in terms of cryptography, the Bernstein 25519 elliptic curve cryptography has conjectured complexity of $2^{128}$ computational steps. Also, $2^{128}>10^{38}$ so in terms of this measure of computational intractability, the Bernstein 25519 elliptic curve cryptography is computationally intractable in 2014.

As just discussed, in some embodiments and applications, computationally intractable may be measured in terms of how much the encrypted information is worth in economic value and what is the current cost of the computing power needed to decrypt that encrypted information. In other embodiments, economic computational intractability may be useless. For example, suppose a family wishes to keep their child's whereabouts unknown to violent kidnappers. Suppose T=100 years because it is about twice their expected lifetimes. Then 100 years×C(2064) is a better measure of computational intractible for this application. In other words, for critical applications that are beyond an economic value, one should strive for a good estimate of the world's computing power in the future.

One-way functions that exhibit completeness and a good avalanche effect or the strict avalanche criterion [39] are preferable embodiments: these properties are favorable for the key generator updating. FIG. 1C shows the avalanche effect after 16 rounds of the SHA-1 on the first 46 bits of the SHA-1 output. The SHA-1 digest size is 160 bits (i.e. length of its output). Only one bit has been flipped in the input. The white bits show bits that have flipped from 0 to 1 or 1 to 0 as a result of flipping the one bit of input. At the 16th round, there are more white bits than black bits. The strict avalanche criteria says that there is a 50% chance that a bit flip occurs. 80 rounds of SHA-1 are supposed to ensure an appropriate amount of diffusion.

The definition of completeness and a good avalanche effect are quoted directly from [39]:

If a cryptographic transformation is complete, then each ciphertext bit must depend on all of the plaintext bits. Thus, if it were possible to find the simplest Boolean expression for each ciphertext bit in terms of plaintext bits, each of those expressions would have to contain all of the plaintext bits if the function was complete. Alternatively, if there is at least one pair of n-bit plaintext vectors X and $X_i$ that differ only in bit i, and $f(X)$ and $f(X_i)$ differ at least in bit j for all $\{(i,j): 1 \le i,j \le n\}$, the function $f$ must be complete.

For a given transformation to exhibit the avalanche effect, an average of one half of the output bits should change whenever a single input bit is complemented. In order to determine whether a m×n (m input bits and n output bits) function $f$ satisfies this requirement, the $2^m$ plaintext vectors must be divided into $2^{m-1}$ pairs, X and $X_j$ such that X and $X_j$ differ only in bit i. Then the $2^{m-1}$ exclusive-or sums $V_i = f(X) \oplus f(X_i)$ must be calculated. These exclusive-or sums will be referred to as avalanche vectors, each of which contains n bits, or avalanche variables.

If this procedure is repeated for all i such that $1 \le i \le m$ and one half of the avalanche variables are equal to 1 for each i, then the function $f$ has a good avalanche effect. Of course this method can be pursued only if m is fairly small; otherwise, the number of plaintext vectors becomes too large. If that is the case then the best that can be done is to take a random sample of plaintext vectors X, and for each value i calculate all avalanche vectors $V_i$. If approximately one half the resulting avalanche variables are equal to 1 for values of i, then we can conclude that the function has a good avalanche effect.

A hash function, also denoted as Φ, is a function that accepts as its input argument an arbitrarily long string of bits (or bytes) and produces a fixed-size output of information. The information in the output is typically called a message digest or digital fingerprint. In other words, a hash function maps a variable length m of input information to a fixed-sized output, Φ(m), which is the message digest or information digest. Typical output sizes range from 160 to 512 bits, but can also be larger. An ideal hash function is a function Φ, whose output is uniformly distributed in the following way: Suppose the output size of Φ is n bits. If the message m is chosen randomly, then for each of the $2^n$ possible outputs z, the probability that $\Phi(m)=z$ is $2^{-n}$. In an embodiment, the hash functions that are used are one-way.

A good one-way hash function is also collision resistant. A collision occurs when two distinct information elements are mapped by the one-way hash function Φ to the same digest. Collision resistant means it is computationally intractable for an adversary to find colllisions: more precisely, it is computationally intractable to find two distinct information elements $m_1$, $m_2$ where $m_1 \ne m_2$ and such that $\Phi(m_1) = \Phi(m_2)$.

A number of one-way hash functions may be used. SHA-1 is a one-way hash function, designed by the NSA and standardized by NIST. The message digest size of SHA-1 is 160 bits. Other alternative hash functions are of the type that conform with the standard SHA-256, which produces a message digest size of 256 bits, and SHA-512, which produces a message digest size of 512 bits [23].

An embodiment of a one-way hash function is Keccak [34]. An embodiment of a one-way hash function is BLAKE [35]. An embodiment of a one-way hash function is GrØstl [36]. An embodiment of a one-way hash function is JH [37]. Another embodiment of a one-way hash function is Skein [38].

In other embodiments, other types of one-way functions may be used in place of a one-way hash function. For these alternative one-way functions, completeness and a good avalanche effect are favorable properties for these functions to exhibit. The strict avalanche criterion is a favorable property for these alternative one-way functions to also have.

In an embodiment, one-way hash 126 in FIG. 1B may be implemented as executable machine instructions in the native machine instructions of a microprocessor. In another embodiment, one-way function 126 in FIG. 1B may be implemented in hardware such as an FPGA (field programmable gate array) or an ASIC (application specific integrated circuit).

6.3 Cryptographic Process

Information 104 in FIG. 1A that has not been encrypted is called plaintext or a message: Please wire $50,000 to account 349-921118. Information that has been encrypted is sometimes called ciphertext: +,-3y=0z14.*5A,0QxR4cie; iu-j":9b!2P-)1X[0t. In some embodiments, information may consist of voice data that is transmitted across the Internet, using a voice over Internet protocol. Square brackets [ ] represent a sequence. The sequence [0, 1] is not the same sequence as [1, 0]; the order matters. A NADO cryptographic method consisting of an H process 130 in FIG. 1B, a P process 132 in FIG. 1B and an S process 134 in FIG. 1B is described below. In some embodiments, the order of the H process, S process and H process may rearranged with order generator 128. In some embodiments, one or two of the processes may be omitted.

Encryption. Consider a block of plaintext of size M=JN, where N is the size of the output of the block cipher used and J is a natural number i.e., $\{1, 2, 3, \ldots, 8, \ldots 16, \ldots,\}$. This part describes an encryption process S○P○H, where stage 1 is process H, stage 2 is process P and stage 3 is process S. Plaintext $B=[B_1, B_2, \ldots, B_J]$ is the current block that will be encrypted where each subblock $B_k$ has size N.

1. Process H uses some of the current key generator $K_H(1)$ to derive a key that the block cipher uses to encrypt the first plaintext block of size N bytes, represented as $H(B_1, K_H(1))$. The symbol H represents the encryption performed by the block cipher used in the H process. Then the H process updates key generator $K_H$ to key generator $K_H(2)$. Some of $K_H(2)$ is used to derive a new key for the block cipher in order to encrypt the second subblock $B_2$, represented as $H(B_2, K_H(2))$. This encryption of each subblock $B_k$ occurs J times until the last one is encrypted as $H(B_J, K_H(J))$.

Figure 5A:
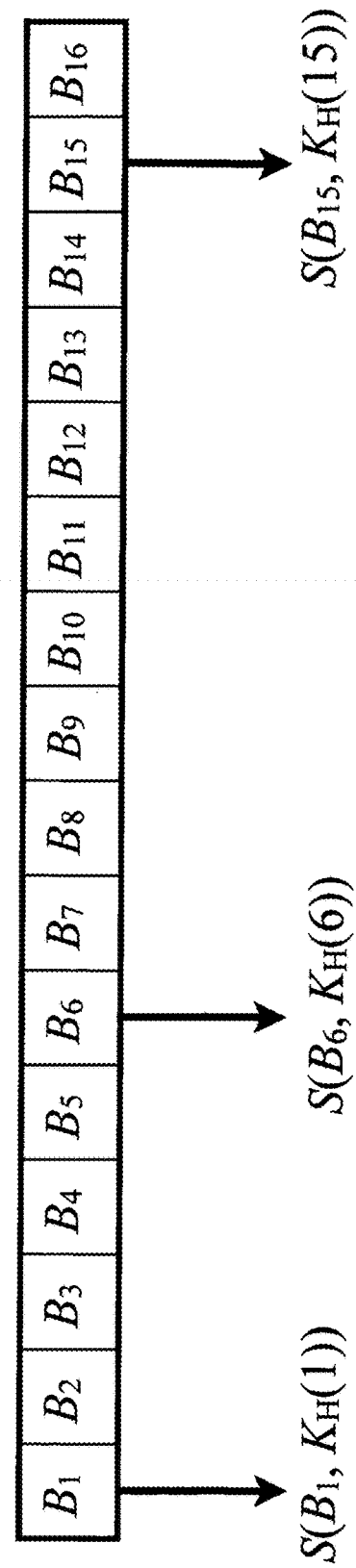
FIG. 5a shows the H process being implemented with the AES-256 block cipher [5].

FIG. 5a shows AES-256 as the block cipher, where M=256 bytes (2048 bits). FIG. 5b shows DES implementing the block cipher, where M=64 bytes (512 bits).

2. Process P uses some of the current value of key generator $K_P$ to update the permutation $\mu: \{1, 2, \ldots, M\} \rightarrow \{1, 2, \ldots, M\}$. Then the permutation $\mu$ permutes the encrypted M bits received from process H to $[c_1, c_2, \ldots, c_M]$, where each $c_j = b_{\mu(j)}$. Permutation $\mu$ diffuses the partially encrypted plaintext from process H over a block of size M bits. A portion of the current key generator $K_P$ is updated using a one-way hash function: this means that the permutation μ used for the next block of size M will usually be quite different.

FIG. 6b shows an example of the P process diffusing bits of information across a 512 bit block. In FIG. 6b, μ sends bit 181 to bit 267 and also maps bit 311 to bit 1. FIG. 6a shows an example of the P process diffusing bits of information across a 6 bit block. For the example in FIG. 5a, μ permutes the bits across a 2048 bit block.

3. Process S uses some of the current key generator $K_S$ to generate a substitution box, represented as $\sigma_1$. $\sigma_1$: $\{0, 1, \ldots, K-1\} \to \{0, 1, \ldots, K-1\}$ further encrypts the first element of the block from step 2 as $\sigma_1(c_1 \ldots c_K)$ where each $c_j$ is the jth bit received from process P. In some embodiments, $\sigma_1$ is updated to $\sigma_2$: $\{0, 1, \ldots, K-1\} \to \{0, 1, \ldots, K-1\}$ so that $\sigma_2 \neq \sigma_1$; in other embodiments, $\sigma_1$ may not be updated so that $\sigma_2 = \sigma_1$. $\sigma_2$ further encrypts the second element $c_{K+1} \ldots c_{2K}$ of the M bit block from process P as $\sigma_2(c_{K+1} \ldots c_{2K})$ and so on all the way up to $\sigma_n(c_{(n-1)K+1} \ldots c_{nK})$. This completely encrypted block of M bits is $[e_1, e_2, \ldots, e_n]$ where the jth completely encrypted element is $e_j = \sigma_k(c_{(j-1)K+1} \ldots c_{jK})$ and M=Kn.

The current key generator $K_S$ is updated using a one-way hash function. This means that the updated substitution box for the next block is usually quite different from the previous substitution box.

Decryption. For each block of ciphertext of size M=JN, this part describes a decryption process $H^{-1} \bigcirc P^{-1} \bigcirc S^{-1}$ in 3 stages. Ciphertext $[e_1, e_2, \ldots, eM]$ is the current block that will be decrypted where M=Kn.

1. Process S uses some of the current key generator $K_S$ to create a substitution box, represented as $\sigma_1^{-1}$. $\sigma_1^{-1}$ further decrypts the first element of the block as $\sigma_1^{-1}(e_1)$. In some embodiments, $\sigma_1^{-1}$ is updated to $\sigma_2^{-1}$ so that $\sigma_2^{-1} \neq \sigma_1^{-1}$; in other embodiments, $\sigma_1^{-1}$ may not be updated so that $\sigma_2^{-1} = \sigma_1^{-1}$. $\sigma_2^{-1}$ further decrypts the second element of the block as $\sigma_2^{-1}(e_2)$ and so on all the way up to $\sigma_n^{-1}(e_n)$. This partially decrypted block is $[d_1, d_2, \ldots, d_n]$ where the kth partially decrypted element is $d_k = \sigma_k^{-1}(e_k)$. The current key generator $K_S$ is updated using a one-way hash function: This means that the substitution box for the next block that will be decrypted is usually quite different.

2. Process P uses some of the current key generator $K_P$ to create an inverse permutation $\mu^{-1}$: $\{1, \ldots, M\} \to \{1, \ldots, M\}$ and permutes the block received from stage 1 to $[d_{\mu^{-1}(1)}, d_{\mu^{-1}(2)} \ldots, d_{\mu^{-1}(M)}]$. Over a block of size M, permutation $\mu^{-1}$ unscrambles the partially decrypted ciphertext received from stage 1 (decryption process S). A portion of the current key generator $K_P$ is updated using a one-way hash function: this means that the permutation $\mu^{-1}$ used for the next block is usually quite different.

3. After process P is completed, the encrypted subblocks of size N bytes are $[H(B_1, K_H(1)), \ldots, H(B_J, K_H(J))]$. Process H uses some of the current key generator $K_H$ to derive a key that completely decrypts the first subblock as $H^{-1}[H(B_1, K_H(1)), K_H(1)] = B_1$ where symbol $H^{-1}$ represents the decryption algorithm of the block cipher in process H. Then key generator $K_H(1)$ is updated to $K_H(2)$. Using some of $K_H(2)$ to derive a new key, the block cipher decrypts the second encrypted subblock $H^{-1}[H(B_2, K_H(2)), K_H(2)] = B_2$. This decryption of each subblock $H^{-1}[H(B_j, K_H(i)), K_H(i)] = B_i$ is performed J times by the block cipher. The current key generator $K_H(i)$ is updated using a one-way hash function after the decryption of each subblock. In some embodiments, the key generator update occurs after the decryption subblocks $B_2, B_4, B_6 \ldots$ but not after the decryption of subblocks $B_1, B_3, B_5 \ldots$. In other embodiments, the key generator update occurs only after subblocks $B_1, B_3, B_5 \ldots$ but not after the subblocks $B_2, B_4, B_6 \ldots$. In some embodiments, the key generator update occurs after every fourth subblock of decryption. Overall, this computes the completely decrypted block $[B_1, \ldots, B_J]$.

In other embodiments, during encryption, process H may be executed after the S or P process. For example, an embodiment may compute $H \bigcirc P \bigcirc S$ as the encryption. This means the H process is executed in stage 3 and the S process is executed in stage 1. For the nth block B of size M, formally this encryption computation is represented as $H(P(S(B, K_S(n)), K_P(n)), K_H(n))$, where $K_S(n)$ is the key generator for process S on the nth block; $K_P(n)$ is the key generator for process P on the nth block; and where $K_H(n)$ is the key generator for process H on the nth block.

In other embodiments, the H process may be performed in the second stage. For example, $S \bigcirc H \bigcirc P$ may be computed as the encryption. In an embodiment, an order generator $K_O(n)$ may be used to determine the order of processes H, S, P for the encryption of the nth block B of size M. For example, in the first block, during encryption, $S \bigcirc H \bigcirc P$ may perform the encryption computation. In the second block, $H \bigcirc S \bigcirc P$ may perform the encryption computation. In the third block, $H \bigcirc P \bigcirc S$ may perform the encryption computation. In the fourth block, $P \bigcirc S \bigcirc H$ may perform the encryption and so on. In embodiment, the order generator $K_O(n)$ may be updated to $K_O(n+1)$ for the n+1th block, according to the key generator updating methods, described in section 6.5.

6.4 Cryptographic Hardware and Infrastructure

FIG. 1D shows an embodiment of a non-deterministic process, which detects arrival times of photons. It is an example of an embodiment of non-deterministic generator 136. hv refers to the energy of the photon that arrives where h is Planck's constant and v is the frequency. In an embodiment, three consecutive arrival times $t_1 < t_2 < t_3$ of three consecutive photons may be compared. If $t_2 - t_1 > t_3 - t_2$, then non-deterministic generator 142 produces a 1 bit. If $t_2 - t_1 < t_3 - t_2$, then non-deterministic generator 142 produces a 0 bit. If $t_2 - t_1 = t_3 - t_2$, then no non-deterministic information is produced and three more arrival times are sampled by this non-deterministic process.

Figure 3B:
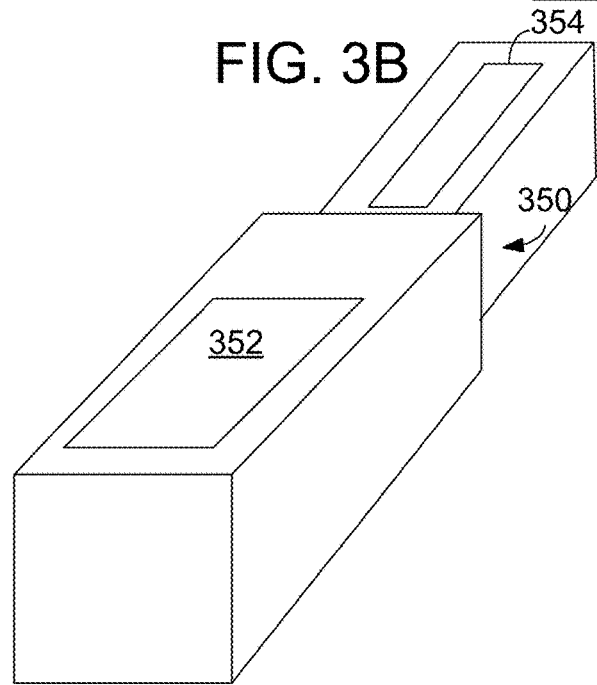
FIG. 3B shows an authentication token that contains a computer processor that can encrypt plaintext that represents authentication data.
Figure 4:
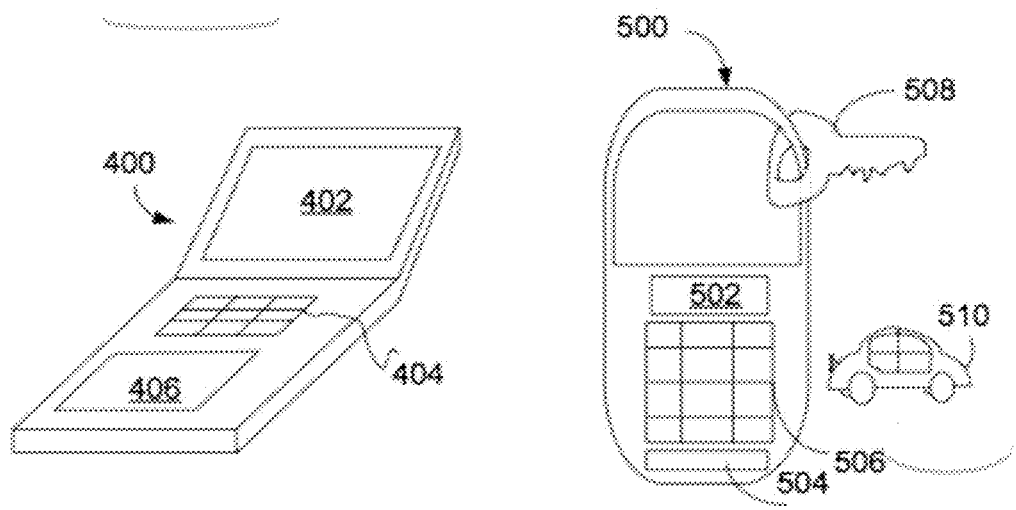
FIG. 4 shows a mobile phone embodiment 400 that encrypts wireless voice data and decrypts wireless voice data. The mobile phone 500 is an embodiment that sends wireless encrypted plaintext to an automobile.

Information system 200 illustrates some of the variations of the manners of implementing information system 100. Sending machine 202 is one embodiment of sending machine 101. Sending machine 202 may be a secure USB memory storage device as shown in 3A. Sending machine 202 may be an authentication token as shown in FIG. 3B. A mobile phone embodiment of sending machine 202 is shown in FIG. 4.

Figure 2A:
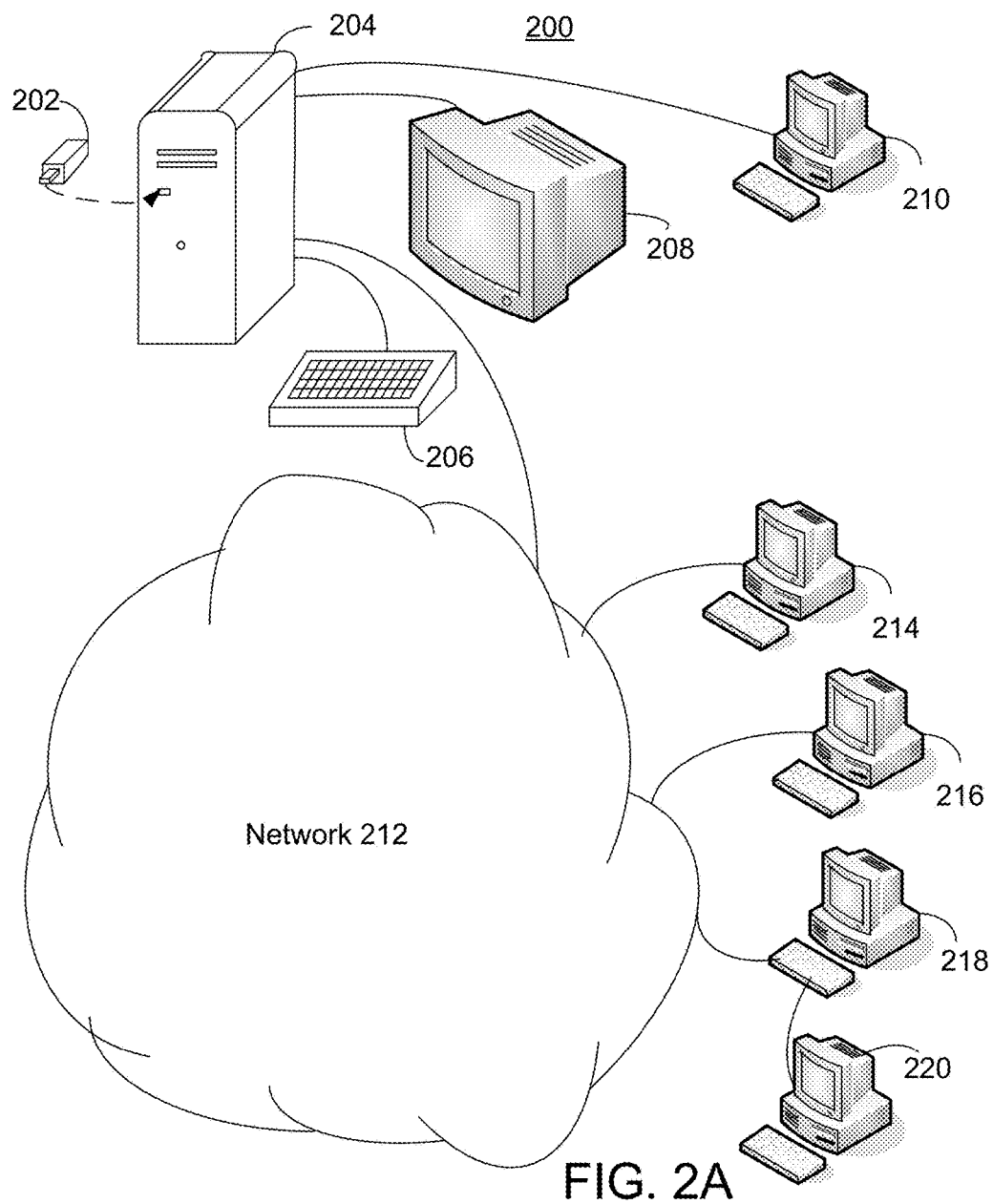
FIG. 2A shows a computer network transmitting encrypted plaintext, which in some embodiments may be the Internet or a part of a network that supports an infrastructure such as the electrical grid, a financial exchange, or a power plant.
Figure 2B:
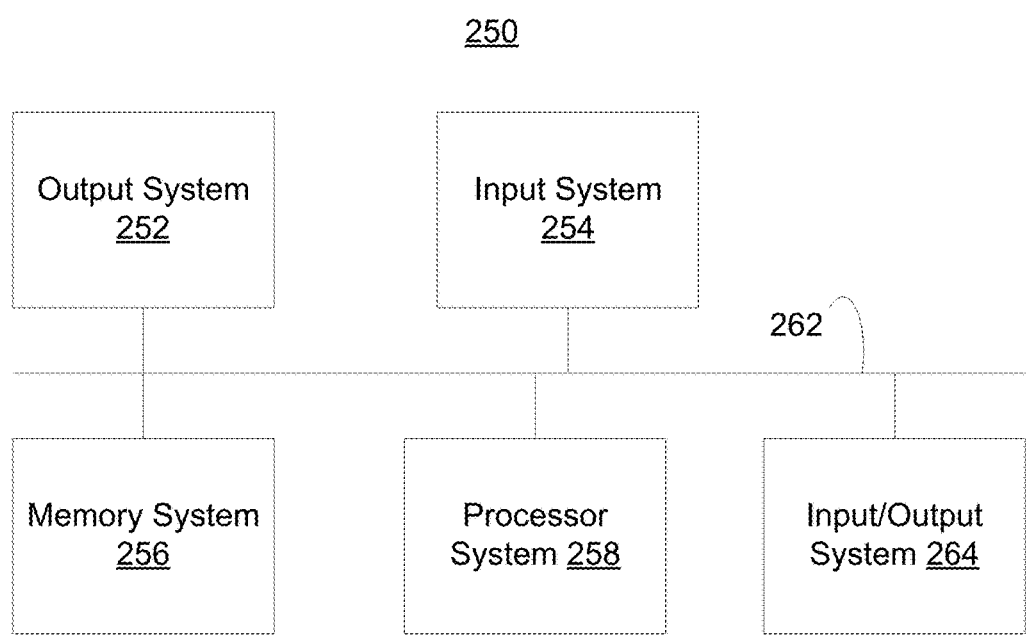
FIG. 2B shows a secure computing area for encrypting information, which includes a processor, memory and input/output system.

Sending machine 202 or sending machine 400 may communicate wirelessly with computer 204. In an embodiment, computer 204 may be a call station for receiving encrypted plaintext 109 from sending machine 400. A user may use input system 254 and output system 252 of sending machine (mobile phone) 400 to transmit encrypted voice data to a receiving machine that is a mobile phone. In an embodiment, input system 254 in FIG. 2B is a microphone that is integrated with sending machine (mobile phone) 400. In an embodiment, output system 252 in FIG. 2B is a speaker that is integrated with sending machine (mobile phone) 400. In another embodiment, sending machine 202 is capable of being plugged into and communicating with computer 204 or with other systems via computer 204.

Computer 204 is connected to system 210, and is connected, via network 212, to system 214, system 216, and system 218, which is connected to system 220. Network 212 may be any one or any combination of one or more Local Area Networks (LANs), Wide Area Networks (WANs), wireless networks, telephones networks, and/or other networks. System 218 may be directly connected to system 220 or connected via a LAN to system 220. Network 212 and system 214, 216, 218, and 220 may represent Internet servers or nodes that route encrypted plaintext (voice data) received from sending machine 400 shown in FIG. 4. In FIG. 2A, system 214, 216, 218, and system 220 and network 212 may together serve as a transmission path 110 for encypted plaintext 109. In an embodiment, system 214, 216, 218, and system 220 and network 212 may execute the Internet protocol stack in order to serve as transmission path 110 for encrypted plaintext 109. In an embodiment, encrypted plaintext 109 may be voice data. In an embodiment, encrypted plaintext 109 may be routing data. In an embodiment, encrypted plaintext 109 may be email. In an embodiment, encrypted plaintext 109 may be text data sent from sending machine 400.

In FIG. 1B, encryption process 122 may be any of, a part of any of, or any combination of any of system 210, network 212, system 214, system 216, system 218, and/or system 220. As an example, routing information of transmission path 110 may be encrypted using encryption process 122 that executes in system computer 210, network computers 212, system computer 214, system computer 216, system computer 218, and/or system computer 220. Encryption process 106 may be executed inside sending machine 400 and decryption process 116 may be executed inside receiving machine 400 in FIG. 4.

In an embodiment, the NADO processes H, P and S execute in a secure area of processor system 258 of FIG. 2B. In an embodiment, specialized hardware in processor system 258 may be implemented to speed up the computation of the one-way functions 126 in FIG. 1B that are used in processes H, P and S. In an embodiment, this specialized hardware in processor system 258 may be embodied as an ASIC (application specific integrated circuit) that computes SHA-1 and/or SHA-512 and/or Keccak and/or BLAKE and/or JH and/or Skein. An ASIC chip can increase the execution speed of the computation of processes H, P and S. In an embodiment, input system 254 receives voice data and sends it to processor system 258 where the voice data is encrypted. Output system 252 sends the encrypted voice data 109 to a telecommunication network 212. In an embodiment, memory system 256 stores key generators 124 and permutation data structures and process H block cipher instructions 130 as described in section 6.7, titled DERIVING A BLOCK CIPHER KEY FROM A GENERATOR. In another embodiment, memory system 256 stores process H state generator instructions as described in section 6.13, titled PROCESS H AS A STATE GENERATOR.

In an embodiment, memory system 256 stores process P permutation instructions 132 as described in section 6.9, titled The P PROCESS: PERMUTING INFORMATION and section 6.11, titled UPDATING PERMUTATIONS IN THE S OR P PROCESS. In an embodiment, memory system 256 stores process S substitution box instructions 134, as described in section 6.12, titled THE S PROCESS and section 6.11, titled UPDATING PERMUTATIONS IN THE S OR P PROCESS. In an embodiment, memory system 256 stores encrypted voice data that is waiting to be sent to output system 252 and sent out along transmission path 110, routed and served by system computers 210, 214, 216, 218 and 220 and network 212.

Figure 3A:
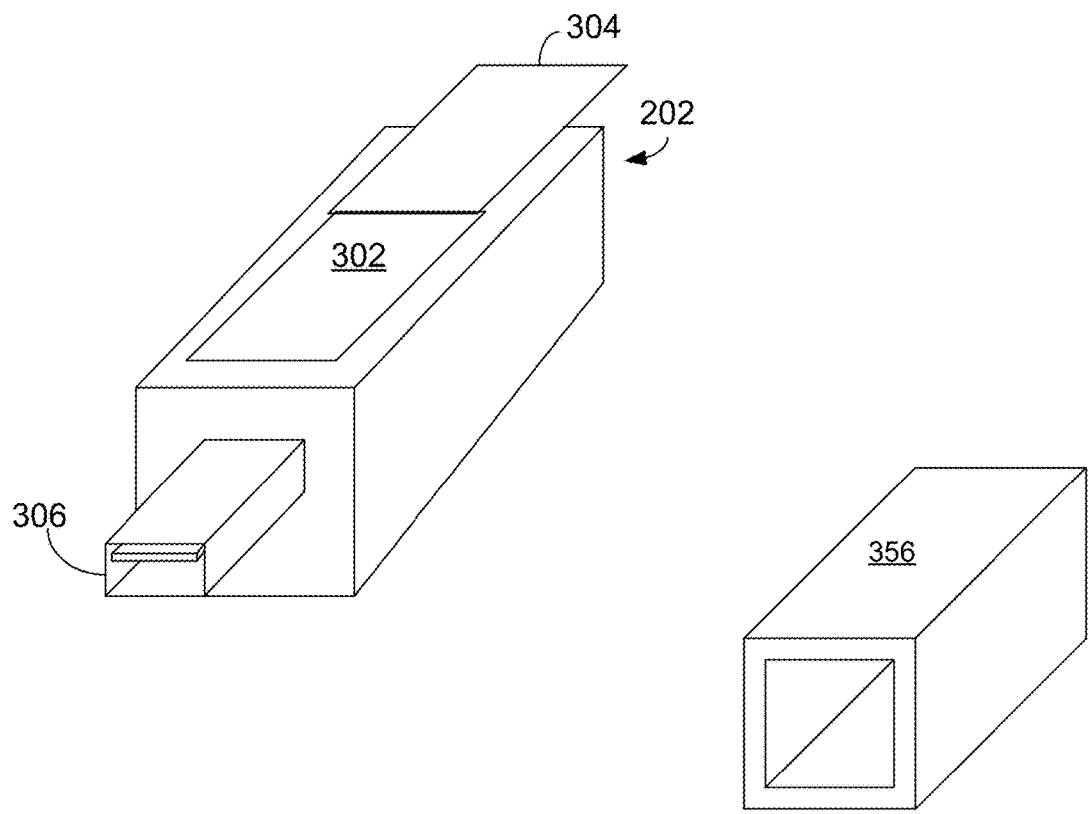
FIG. 3A shows a USB drive that can act as a sending machine and receiving machine to store and protect a user's data by encrypting the data.

In an embodiment, the H process instructions 130, the P process instructions 132 and S process instructions 134 execute in a secure area of processor system 258 that is inside self-contained USB drive shown in FIG. 3A. In an embodiment, encryption process 122 encrypts data stored on the USB drive to protect the data's privacy.

In an embodiment, the H process 130, the P process 132 and the S process 134 encrypt a voice conversation in a secure area of processor system 258 is inside mobile phone 400 that is an embodiment of sending machine 102 and receiving machine 112).

In an embodiment, in FIG. 1B, the H process 130 and/or P process 132 and/or S process execute in a secure area of each processor system 258 (FIG. 2B) that is contained inside system computers 210, 214, 216, 218 and 220 and inside network 212, shown in FIG. 2A.

6.5 Key Generator Updating with One-Way Functions

The binary operator $\oplus$ represents addition modulo 2 (mathematicians) or exclusive-or (computer scientists). $\oplus$ is defined as: $1 \oplus 0=1$. $0 \oplus 1=1$. $0 \oplus 0=0$. $1 \oplus 1=0$.

If k and d represent more than one bit and have the same length in bits, then the bitwise exclusive-or function is defined by applying $\oplus$ to corresponding bits. As an example, suppose the key generator k=[10110000], and the digest d=[00101110]. In this case, $\oplus(k,d)=[1\oplus0, 0\oplus0, 1\oplus1, 1\oplus0, 0\oplus1, 0\oplus1, 0\oplus1, 0\oplus0]=[10011110]$.

Suppose $K=[k_0, k_1, \ldots, k_{n-1}]$ is the current key generator. In the description below, K may represent the current key generator $K_P$ used in the P process; or K may be the current key generator $K_H$ used in the H process; or S may be the current key generator $K_S$ used in the S process.

Let $\Phi$ denote a one-way hash function. In an embodiment, $\Phi$ may be SHA-512. In an embodiment, $\Phi$ may be SHA-1. In another embodiment $\Phi$ may be Keccak. In another embodiment $\Phi$ may be BLAKE. In another embodiment $\Phi$ may be JH. In another embodiment $\Phi$ may be GrØstl. In another embodiment $\Phi$ may be Skein.

Suppose the digest size of $\Phi$ is q elements. Let $K_m=[k_0, k_1, \ldots, k_{m-1}]$ where m≤n. Let the output of the one-way hash $\Phi$ on input $K_m$ be $\Phi(K_m)=[d_0, d_1, \ldots, d_{q-1}]$ where q<n. After the last round of encryption or decryption, in an embodiment, the key generator K may be updated to $K_{next}$, where $K_{next}=[k_{n-1} \oplus d_0, k_0 \oplus d_1, k_1 \oplus d_2, \ldots, k_{q-2} \oplus d_{q-1}, k_{q-1}, \ldots, k_{n-2}]$. This computation of $K_{next}$ is shown in FIG. 7.

The purpose of the rotation and one-way hash of part of the key generator is to exploit the avalanche effect of the one-way function. The exclusive-or operation $\oplus$ mixes the output of the one-way hash function, by not skewing what ideally should be a 50% probability of each bit being 0 or 1. The rotation enables the key generator update to use a much larger key generator than the key size used by the H, P or S process. For example, the AES-256 block cipher uses a static 256 bit key. However, key generator $K_H$ for the H process may be greater than 512 bits. The rotation eventually mixes the output of the one-way hash function even if the one-way function is SHA-1 which has an output size of only 160 bits.

The following C code implements the above computation with the following assumptions. Each subscript above indexes a byte (8 bits) of unsigned char. Each element K[i] is an unsigned char. In the C syntax, the symbol ^ performs the bitwise exclusive-or computation, represented above as $\oplus$. The symbol ^ is above the numeral 6 on a standard American computer keyboard. Function one_way_hash(unsigned char*d, unsigned char*K, int K_length) implements one-way hash function Φ, where int K_length is the size of input K[0] ... K[m−1] to function one_way_hash.

```
unsigned char temp = K[n-1];
int i;
unsigned char d[q];
temp = K[n-1];
/* Rotate the circular array of unsigned char one byte to the right. */
memmove(K+1, K, n-1);
/* K[n-1] is rotated into K[0] */
K[0] = temp;
/* Hash n bytes of the key and store the digest in d */
one_way_hash(d, K, n);
/* ^ is the exclusive-or in C syntax. */
for(i = 0; i < q; i++)
{
    K[i] = K[i] ^ d[i];
}
```

K may refer to the H process key generator $K_H(i)$ where after the update $K_{next}$ is the name of H process key generator $K_H(i+1)$ as described in section 6.3. Similarly, in the C code listing, K may refer to the P process key generator $K_P(i)$ where after the update $K_{next}$ is the name of P process key generator $K_P(i+1)$. Similarly, symbol K may refer to the S process key generator $K_S(i)$ where after the update $K_{next}$ is the name of S process key generator $K_S(i+1)$. Similarly, symbol K in the C code listing or above may refer to the order generator $K_O(i)$ being updated to $K_O(i+1)$.

The C code above executes generator updating that corresponds to rotating the key generator K by one to the right. In another embodiment, after the prior round of encryption or decryption, the key generator K may be updated to $K_{next}$, by first rotating K one element to the left and then exclusive-or'ing this rotated K key with the one-way hash of $K_m$. In this embodiment, $K_{next}=[k_1 \oplus d_0, k_2 \oplus d_1, \ldots, k_q \oplus d_{q-1}, k_{q+1}, \ldots, k_{n-1}, k_0]$. In other embodiment, key generator K may be rotated left by i elements where 1<i<n. For example, K may be rotated left by i=5 elements. In other embodiment, key generator K may be rotated right by j elements where 1<j<n. When q=n, an embodiment may choose to NOT rotate key K before the one-way hash of $K_m$ is exclusive-or'd with elements of K. In another embodiment, the key generator $K_H$ for the process H is updated in this way after one byte of information has been encrypted as described in section 6.13.

In what follows, a key generator update of $K_P$ for $|K_P|=512$ bits is described that uses one-way hash SHA-512. This demonstrates how the updated key generator $K_P$ changes and how the Hamming distance between $K_P(n)$ and $K_P(n+1)$ stays close to $\frac{1}{2}|K_P(n)|=256$ bits. Below is $K_P(1)$ represented as bytes. Each byte is represented by a number between 0 and 255 inclusive.

| 250 | 133 | 237 | 118 | 205 | 252 | 77  | 62  | 207 | 103 | 68  | 102 | 187 | 63  | 204 | 237 |
| --- | --- | --- | --- | --- | --- | --- | --- | --- | --- | --- | --- | --- | --- | --- | --- |
| 44  | 238 | 49  | 189 | 137 | 29  | 132 | 206 | 193 | 202 | 190 | 160 | 218 | 224 | 6   | 113 |
| 69  | 168 | 125 | 49  | 88  | 211 | 155 | 14  | 91  | 182 | 14  | 190 | 133 | 198 | 117 | 201 |
| 14  | 40  | 203 | 127 | 170 | 189 | 55  | 49  | 2   | 225 | 115 | 40  | 105 | 150 | 231 | 35  |

Below is key generator $K_P(1)$ represented as 512 bits.

| 11111010 | 10000101 | 11101101 | 01110110 | 11001101 | 11111100 | 01001101 | 00111110 |
| --- | --- | --- | --- | --- | --- | --- | --- |
| 11001111 | 01100111 | 01000100 | 01100110 | 10111011 | 00011111 | 11001100 | 11101101 |
| 00101100 | 11101110 | 00110001 | 10111101 | 10001001 | 00011101 | 10000100 | 11001110 |
| 11000001 | 11001010 | 10111110 | 10100000 | 11011010 | 11100000 | 00000110 | 01110001 |
| 01000101 | 10101000 | 01111101 | 00110001 | 01011000 | 11010011 | 10011011 | 00001110 |
| 01011011 | 10110110 | 00001110 | 10111110 | 10000101 | 11000010 | 01110101 | 11001001 |
| 00001110 | 00101000 | 11001011 | 01111111 | 10101010 | 10111101 | 00110111 | 00110001 |
| 00000010 | 11100001 | 01110011 | 00101000 | 01101001 | 10010110 | 11100111 | 00100011 |

Observe that 250 represents 11111010 and 133 represents 10000101 and so on all the way to the last byte where 35 represents 00100011. Below is $K_P(2)$ represented as 64 bytes.

| 206 | 177 | 181 | 190 | 54  | 245 | 37  | 133 | 212 | 75  | 184 | 82  | 211 | 46  | 139 | 52  |
| --- | --- | --- | --- | --- | --- | --- | --- | --- | --- | --- | --- | --- | --- | --- | --- |
| 237 | 84  | 12  | 169 | 85  | 246 | 170 | 250 | 155 | 130 | 142 | 172 | 130 | 119 | 220 | 220 |
| 134 | 243 | 71  | 138 | 181 | 212 | 215 | 215 | 173 | 229 | 60  | 192 | 96  | 171 | 167 | 56  |
| 147 | 160 | 133 | 16  | 229 | 13  | 2   | 58  | 183 | 238 | 98  | 52  | 2   | 208 | 219 | 43  |

Below is $K_P(2)$ represented as 512 bits.

| 11001110 | 10110001 | 10110101 | 10111110 | 00110110 | 11110101 | 00100101 | 10000101 |
| --- | --- | --- | --- | --- | --- | --- | --- |
| 11010100 | 01001011 | 10111000 | 01010010 | 11010011 | 00101110 | 10001011 | 00110100 |
| 11101101 | 01010100 | 00001100 | 10101001 | 01010101 | 11110110 | 10101010 | 11111010 |
| 10011011 | 10000010 | 10001110 | 10101100 | 10000010 | 01110111 | 11011100 | 11011100 |
| 10000110 | 11110011 | 01000111 | 10001010 | 10110101 | 11010100 | 11010111 | 11010111 |
| 10101101 | 11100101 | 00111100 | 11000000 | 01100000 | 10101011 | 10100111 | 00111000 |
| 10010011 | 10100000 | 10000101 | 00010000 | 11100101 | 00001101 | 00000010 | 00111010 |
| 10110111 | 11101110 | 01100010 | 00110100 | 00000010 | 11010000 | 11011011 | 00101011 |

Below is $K_P(1) \oplus K_P(2)$ represented as 512 bits.

| | | | | | | | |
|---|---|---|---|---|---|---|---|
| 00110100 | 00110100 | 01011000 | 11001000 | 11111011 | 00001001 | 01101000 | 10111011 |
| 00011011 | 00101100 | 11111100 | 00110100 | 01101000 | 00010001 | 01000111 | 11011001 |
| 11000001 | 10111010 | 00111101 | 00010100 | 11011011 | 11101011 | 00101110 | 00110100 |
| 01011010 | 01001000 | 00110000 | 00001100 | 01011000 | 10010111 | 11011010 | 10101101 |
| 11000011 | 01011011 | 00111010 | 10111011 | 11101101 | 00000111 | 01001100 | 11011001 |
| 11110110 | 01010011 | 00110010 | 01111110 | 11100101 | 01101101 | 11010010 | 11110001 |
| 10011101 | 10001000 | 01001110 | 01101111 | 01001111 | 10110000 | 00110101 | 00001011 |
| 10110101 | 00001111 | 00010001 | 00011100 | 01101011 | 01000110 | 00111100 | 00001000 |

The Hamming distance between $K_P(1)$ and $K_P(2)$ is the number of ones in $K_P(1) \oplus K_P(2)$, which is 254. Observe that $$\frac{254}{512}$$

is about 0.496 which is close to 50%. The value $\frac{1}{2}|K(p)(n)|=256$ is the expected value for the Hamming ditanice between consecutive key generators updated by a true random process with a uniform distribution. A uniform distribution means that there is a 50% probability of the next bit being a zero and a 50% probability of the next bit being a one.

Below is $K_P(3)$ represented as 64 bytes.

| | | | | | | | | | | | | | | | |
|---|---|---|---|---|---|---|---|---|---|---|---|---|---|---|---|
| 217 | 213 | 34 | 123 | 224 | 13 | 79 | 215 | 178 | 250 | 130 | 135 | 7 | 162 | 155 | 232 |
| 164 | 195 | 15 | 117 | 197 | 10 | 19 | 132 | 114 | 65 | 154 | 37 | 114 | 150 | 190 | 205 |
| 148 | 98 | 244 | 113 | 195 | 156 | 224 | 194 | 229 | 239 | 235 | 202 | 184 | 141 | 85 | 37 |
| 19 | 64 | 82 | 1 | 2 | 83 | 56 | 165 | 10 | 203 | 217 | 14 | 90 | 247 | 202 | 218 |

Below is $K_P(3)$ represented as 512 bits.

| | | | | | | | |
|---|---|---|---|---|---|---|---|
| 11011001 | 11010101 | 00100010 | 01111011 | 11100000 | 00001101 | 01001111 | 11010111 |
| 10110010 | 11111010 | 10000010 | 10000111 | 00000111 | 10100010 | 10011011 | 11101000 |
| 10100100 | 11000011 | 00001111 | 01110101 | 11000101 | 00001010 | 00010011 | 10000100 |
| 01110010 | 01000001 | 10011010 | 00100101 | 01110010 | 10010110 | 10111110 | 11001101 |
| 10010100 | 01100010 | 11110100 | 01110001 | 11000011 | 10011100 | 11100000 | 11000010 |
| 11100101 | 11101111 | 11101011 | 11001010 | 10111000 | 10001101 | 01010101 | 00100101 |
| 00010011 | 01000000 | 01010010 | 00000001 | 00000010 | 01010011 | 00111000 | 10100101 |
| 00001010 | 11001011 | 11011001 | 00001110 | 01011010 | 11110111 | 11001010 | 11011010 |

Below is $K_P(2) \oplus K_P(3)$ represented as 512 bits.

| | | | | | | | |
|---|---|---|---|---|---|---|---|
| 00010111 | 01100100 | 10010111 | 11000101 | 11010110 | 11111000 | 01101010 | 01010010 |
| 01100110 | 10110001 | 00111010 | 11010101 | 11010100 | 10001100 | 00010000 | 11011100 |
| 01001001 | 10010111 | 00000011 | 11011100 | 10010000 | 11111100 | 10111001 | 01111110 |
| 11101001 | 11000011 | 00010100 | 10001001 | 11110000 | 11100001 | 01100010 | 00010001 |
| 00010010 | 10010001 | 10110011 | 11111011 | 01110110 | 01001000 | 00110111 | 00010101 |
| 01001000 | 00001010 | 11010111 | 00001010 | 11011000 | 00100110 | 11110010 | 00011101 |
| 10000000 | 11100000 | 11010111 | 00010001 | 11100111 | 10111110 | 00111010 | 10011111 |
| 10111101 | 00100101 | 10111011 | 00111010 | 01011000 | 00100111 | 00010001 | 11110001 |

The Hamming distance between key generator $K_P(2)$ and key generator $K_P(3)$ is 250.

In order to illustrate the other statement that the order of the zeroes and ones changes unpredictably between consecutive key generator updates, we compute $[K_P(1) \oplus K_P(2)] \oplus [K_P(2) \oplus K_P(3)] = K_P(1) \oplus K_P(3)$:

| | | | | | | | |
|---|---|---|---|---|---|---|---|
| 00100011 | 01010000 | 11001111 | 00001101 | 00101101 | 11110001 | 00000010 | 11101001 |
| 01111101 | 10011101 | 11000110 | 11100001 | 10111100 | 10011101 | 01010111 | 00000101 |
| 10001000 | 00101101 | 00111110 | 11001000 | 01001100 | 00010111 | 10010111 | 01001010 |
| 10110011 | 10001011 | 00100100 | 10000101 | 10101000 | 01110110 | 10111000 | 10111100 |
| 11010001 | 11001010 | 10001001 | 01000000 | 10011011 | 01001111 | 01111011 | 11001100 |
| 10111110 | 01011001 | 11100101 | 01110100 | 00111101 | 01001011 | 00100000 | 11101100 |
| 00011101 | 01101000 | 10011001 | 01111110 | 10101000 | 11101110 | 00001111 | 10010100 |
| 00001000 | 00101010 | 10101010 | 00100110 | 00110011 | 01100001 | 00101101 | 11111001 |

The number of ones in $K_P(1) \oplus K_P(3)$ is 252 which is close to 50%. Analogous to the second derivative in calculus, this computation illustrates the statement that the order of the zeroes and ones is unpredictable and close to the expected value of a random process with a uniform distribution.

In some embodiments, in each process, a different one-way hash function may be used for key generator updating. In an embodiment, Keccak may be used to update the key generator in process H; BLAKE may be used to update the key generator in process P; and SHA-512 may be used to update the key generator in process S. In section 6.11, titled UPDATING PERMUTATIONS IN THE S OR P PROCESS, further details are provided on how to update the permutation μ based on one of the nth key generators $K_H(n)$ or $K_P(n)$ or $K_S(n)$.

6.6 Process H as a Block Cipher

FIG. 5a shows an embodiment of process H. The block size is M=256 bytes of information and AES-256 encrypts 16 of these subblocks, labeled $B_1, B_2, \ldots, B_{16}$. Each of these 16 byte subblocks $B_k$ are encrypted by AES-256 with a different key due to the key generator updating. The function symbol S represents the encryption by AES-256. $B_1$ represents bytes 1 to 16 of the 256 byte block. $S(B_1, K_H(1))$ indicates that subblock $B_1$ is encrypted with a 256-bit AES key derived from the current value of key generator $K_H$ indicated as $K_H(1)$. $B_6$ represents bytes 81 to 96 of the 256 byte block. $S(B_6, K_H(6))$ indicates that $B_6$ is encrypted with a 256-bit AES key derived from the current key generator $K_H(6)$. $B_{15}$ represents bytes 225 to 240 of the 256 byte block. $S(B_{15}, K_H(15))$ indicates that $B_{15}$ is encrypted with a 256-bit AES key derived from the current key generator $K_H(15)$. The 15 inside the parentheses indicates that key generator H has been updated 15 times since its initial value $K_H(0)$.

FIG. 5b shows another embodiment of the H process being implemented with the DES block cipher. The block size is 64 bytes of information and DES encrypts 8 of these subblocks, labeled $B_1, B_2, \ldots, B_8$. In an embodiment, each of these 8 byte subblocks $B_k$ are encrypted by DES with a different 56 bit key due to the key generator updating. The function symbol Δ represents the encryption performed by the DES algorithm. $B_1$ refers to bytes 1 to 8 of the 64 byte block. $\Delta(B_1, K_H(1))$ indicates that $B_1$ is encrypted with a 56-bit DES key derived from the value of the key generator $K_H(1)$. $B_3$ refers to bytes 17 to 24 of the 64 byte block. $\Delta(B_3, K_H(3))$ indicates that $B_3$ is encrypted with a 56-bit DES key derived from the current value of key generator $K_H(3)$.

Before an embodiment with key updating for AES-256 is described below, the AES block cipher [5] is briefly described. AES has a 128-bit state. AES supports three key sizes: 128, 192, and 256 bits. AES is a 16 byte block cipher that uses 10 rounds for a 128-bit key; 12 rounds for a 192-bit key and 14 rounds for a 256-bit key. The internal state can be represented as a 4×4 matrix of bytes. During each round of AES, the internal state is transformed by the following operations:

1. SubBytes applies a substitution box S: $\{0, 1, \ldots, 255\} \rightarrow \{0, 1, \ldots, 255\}$, denoted below as unsigned char S_BOX [256], to each byte of the state.
2. ShiftRows computes a cyclic shift of each row of the state matrix by some amount k.
3. MixColumns computes columnwise matrix multiplication.
4. AddRoundKey computes an exclusive-or of the state with the subkey.

An additional AddRoundKey operation is performed before the first round. The Mix-Columns operation is omitted in the last round. The key schedule produces eleven, thirteen or fifteen 128-bit subkeys from master keys of sizes 128, 192 or 256 bits, respectively. The block ciphers are referred to AES-128, AES-192 and AES-256, respectively, where the number specifies the master key size. Each 128-bit subkey contains four words. A word is a 32-bit quantity which is denoted by W[·].

Let the number of rounds be $N_r$. Let the number of 32-bit words in the master key be $N_k$. AES-128 has $N_r=10$ and $N_k=4$. AES-256 has $N_r=14$ and $N_k=8$. Below is the key schedule expressed in pseudo-code.

```
For i = 0 ... N_k − 1
    W[i] = K[i]   where K[i] is a 32-bit word of the master key.
For i = N_k ... 4N_r + 3
    temp = W[i − 1]
    If ( i mod N_k == 0 ) then temp = SB(RotWord(temp)) ⊕ RCON [i/N_k]
    If (N_k == 8 and i mod 8 == 4) then temp = SB(temp)
    W[i] = W[i − N_k] ⊕ temp
``` where RCON[·] are round constants and RotWord(•) rotates four bytes by one byte to the left.

A C code listing of the four operations applied during a round is shown below. The 4×4 state matrix is represented as unsigned char State [4] [4].

```
int WCount;
unsigned char  State[4][4];
const unsigned char S_BOX[256] =
{0x63,0x7c,0x77,0x7b,0xf2,0x6b,0x6f,0xc5,0x30,0x1,0x67,0x2b,0xfe,0xd7,0xab,0x76,
0xca,0x82,0xc9,0x7d,0xfa,0x59,0x47,0xf0,0xad,0xd4,0xa2,0xaf,0x9c,0xa4,0x72,0xc0,
0xb7,0xfd,0x93,0x26,0x36,0x3f,0xf7,0xcc,0x34,0xa5,0xe5,0xf1,0x71,0xd8,0x31,0x15,
0x4,0xc7,0x23,0xc3,0x18,0x96,0x5,0x9a,0x7,0x12,0x80,0xe2,0xeb,0x27,0xb2,0x75,
0x9,0x83,0x2c,0x1a,0x1b,0x6e,0x5a,0xa0,0x52,0x3b,0xd6,0xb3,0x29,0xe3,0x2f,0x84,
0x53,0xd1,0x0,0xed,0x20,0xfc,0xb1,0x5b,0x6a,0xcb,0xbe,0x39,0x4a,0x4c,0x58,0xcf,
0xd0,0xef,0xaa,0xfb,0x43,0x4d,0x33,0x85,0x45,0xf9,0x2,0x7f,0x50,0x3c,0x9f,0xa8,
0x51,0xa3,0x40,0x8f,0x92,0x9d,0x38,0xf5,0xbc,0xb6,0xda,0x21,0x10,0xff,0xf3,0xd2,
0xcd,0xc,0x13,0xec,0x5f,0x97,0x44,0x17,0xc4,0xa7,0x7e,0x3d,0x64,0x5d,0x19,0x73,
0x60,0x81,0x4f,0xdc,0x22,0x2a,0x90,0x88,0x46,0xee,0xb8,0x14,0xde,0x5e,0xb,0xdb,
0xe0,0x32,0x3a,0xa,0x49,0x6,0x24,0x5c,0xc2,0xd3,0xac,0x62,0x91,0x95,0xe4,0x79,
0xe7,0xc8,0x37,0x6d,0x8d,0xd5,0x4e,0xa9,0x6c,0x56,0xf4,0xea,0x65,0x7a,0xae,0x8,
0xba,0x78,0x25,0x2e,0x1c,0xa6,0xb4,0xc6,0xe8,0xdd,0x74,0x1f,0x4b,0xbd,0x8b,0x8a,
0x70,0x3e,0xb5,0x66,0x48,0x3,0xf6,0xe,0x61,0x35,0x57,0xb9,0x86,0xc1,0x1d,0x9e,
0xe1,0xf8,0x98,0x11,0x69,0xd9,0x8e,0x94,0x9b,0x1e,0x87,0xe9,0xce,0x55,0x28,0xdf,
0x8c,0xa1,0x89,0xd,0xbf,0xe6,0x42,0x68,0x41,0x99,0x2d,0xf,0xb0,0x54,0xbb,0x16
};
int sub_state_bytes(unsigned char state[4][4])  {
  int row, col;
  for (row = 0; row < 4; row++)
```

```
      for (col = 0; col < 4; col++)
      { state [row][col] = S_BOX[ state [row][col] ];  }
   return 0;
}
int shift_rows(unsigned char state[4][4])  {
   unsigned char temp[4];
   int r, c;
   for (r = 1; r < 4; r++)
   {
      for (c = 0; c < 4; c++)
         temp[c] = state[r][(c + r) % 4];
      for (c = 0; c < 4; c++)
         state[r][c] = temp [c];
   }
   return 0;
}
unsigned char FMul(unsigned char a, unsigned char b)  {
   unsigned char aa = a, bb = b, r = 0, t;
   while (aa != 0)
   {
      if ((aa & 1) != 0) r = (unsigned char) (r ^ bb);
      t = (unsigned char) (bb & 0x80);
      bb = (unsigned char) (bb << 1);
      if (t != 0) bb = (unsigned char) (bb ^ 0x1b);
      aa = (unsigned char) ((aa & 0xff) >> 1);
   }
   return r;
}
int mix_columns(unsigned char state[4][4])  {
 int i, c, sp[4];
 unsigned char x02 = (unsigned char) 0x02;
 unsigned char x03 = (unsigned char) 0x03;
 for (c = 0; c < 4; c++)
 {
    sp[0]=FMul(x02,state[0][c]) ^ FMul(x03,state[1][c]) ^ state[2][c] ^ state[3][c];
    sp[1]=state[0][c] ^ FMul(x02,state[1][c]) ^ FMul(x03,state[2][c]) ^ state[3][c];
    sp[2]=state[0][c] ^ state[1][c] ^ FMul(x02,state[2][c]) ^ FMul(x03,state[3][c]);
    sp[3]=FMul(x03,state[0][c]) ^ state[1][c] ^ state[2][c] ^ FMul(x02,state[3][c]);
    for(i = 0; i < 4; i++)
       state[i][c] = (unsigned char) (sp[i]);
 }
 return 0;
}
int add_round_key(unsigned char state[4][4])  {
   int c, r;
   for (c = 0; c < 4; c++)
      for (r = 0; r < 4; r++)
      {
         state[r][c] = (unsigned char) (state[r][c] ^ W[WCount]);
         WCount++;
      }
   return 0;
}
int aes_encrypt(unsigned char* cipher, unsigned char* plain, int num_rounds)  {
      int round;
      WCount = 0;
      copy_in(State, plain);
      add_round_key(State);
      for(round = 1; round < num_rounds; round++)
      {
         sub_state_bytes(State);
         shift_rows(State);
         mix_columns(State);
         add_round_key(State);
      }
      sub_state_bytes(State);
      shift_rows(State);
      add_round_key(State);
      copy_out(cipher, State);
      return 0;
}
```

An example of this key updating and encrypting with AES-256 is shown below. Consider the plaintext "Photons are keysPhotons are keysPhotons are keysPhotons are keys" The phrase "Photons are keys" repeats four times in the plaintext. In what follows, each byte of ciphertext and the current AES-256 key will be expressed as a number between 0 and 255 inclusive.

Plaintext "Photons are keys" is

| 80 | 104 | 111 | 116 | 111 | 110 | 115 | 32 | 97 | 114 | 101 | 32 | 107 | 101 | 121 | 115 |
|---|---|---|---|---|---|---|---|---|---|---|---|---|---|---|---|

The first AES key $K_1$ derived from key generator $K_H(1)$ is

| 49 | 204 | 127 | 197 | 122 | 54 | 96 | 2 | 160 | 221 | 204 | 228 | 192 | 201 | 39 | 195 |
|---|---|---|---|---|---|---|---|---|---|---|---|---|---|---|---|
| 98 | 184 | 161 | 197 | 193 | 176 | 187 | 204 | 23 | 132 | 76 | 124 | 170 | 63 | 229 | 38 |

After encrypting plaintext block $B_1$="Photons are keys" with AES-256 and key $K_1$, the ciphertext is 251 150 133 203 3 182 4 7 13 198 112 173 159 22 26 173.

The second AES key $K_2$ derived from key generator $K_H(2)$ is

| 28 | 182 | 250 | 112 | 238 | 48 | 71 | 79 | 11 | 76 | 203 | 67 | 106 | 61 | 93 | 171 |
|---|---|---|---|---|---|---|---|---|---|---|---|---|---|---|---|
| 64 | 103 | 230 | 63 | 1 | 188 | 208 | 133 | 128 | 230 | 99 | 94 | 178 | 54 | 106 | 75 |

After encrypting plaintext block $B_2$="Photons are keys" with AES-256 and key $K_2$, the ciphertext is 65 7 228 219 145 13 117 25 52 169 72 225 225 81 104 11.

The third AES key $K_3$ derived from key generator $K_H(3)$ is

| 203 | 216 | 128 | 224 | 174 | 19 | 253 | 33 | 86 | 68 | 39 | 231 | 138 | 201 | 215 | 80 |
|---|---|---|---|---|---|---|---|---|---|---|---|---|---|---|---|
| 215 | 9 | 138 | 112 | 235 | 239 | 104 | 48 | 207 | 214 | 101 | 83 | 66 | 183 | 220 | 111 |

After encrypting plaintext block $B_3$="Photons are keys" with AES-256 and key $K_3$, the ciphertext is 23 116 212 23 67 91 3 235 82 172 89 172 223 144 115 250.

The fourth AES key $K_4$ derived from key generator $K_H(4)$ is

| 91 | 97 | 42 | 241 | 167 | 27 | 11 | 254 | 236 | 131 | 38 | 3 | 177 | 11 | 79 | |
|---|---|---|---|---|---|---|---|---|---|---|---|---|---|---|---|
| 68 | 28 | 203 | 120 | 207 | 180 | 8 | 46 | 72 | 153 | 247 | 13 | 38 | 193 | 46 | 43 | 239 |

After encrypting plaintext block $B_4$="Photons are keys" with AES-256 and key $K_4$, the ciphertext is 8 161 3 243 173 80 124 200 110 18 216 43 156 194 22 206.

In some embodiments, the key generator update of $K_H$ occurs after every other encryption of a subblock: the update occurs after subblocks $B_2, B_4, B_6 \ldots$ but not after the subblocks $B_1, B_3, B_5 \ldots$. In other embodiments, the key generator update occurs only after subblocks $B_1, B_3, B_5 \ldots$ but not after the subblocks $B_2, B_4, B_6 \ldots$. In some embodiments, the key generator update of $K_H$ occurs after only the fourth subblocks $B_4, B_8, B_{12} \ldots$ of encryption.

6.7 Deriving a Block Cipher Key from a Generator

This section describes the derivation of a block cipher key from the current key generator $K_H(n)$. In an embodiment for a block cipher that uses an m bit key, the first m bits of the current key generator $K_H(n)$ may be used to encrypt the current block. In an embodiment, the block cipher is AES-256 and the length of the key generator $K_H$ is 64 bytes (512 bits). In an alternative embodiment, the length of the key generator is 128 bytes (1024 bits).

In the embodiment described below, the key generator $K_H$ is 64 bytes. The block cipher is AES-256. After every other block of 16 bytes, the key generator is updated as described in section 6.5. Below key generator $K_H(1)$ is 64 bytes, where each number between 0 and 255 inclusive represents 8 bits.

| 129 | 165 | 24 | 90 | 164 | 61 | 166 | 218 | 203 | 144 | 104 | 88 | 9 | 207 | 128 | 203 |
|---|---|---|---|---|---|---|---|---|---|---|---|---|---|---|---|
| 205 | 58 | 232 | 83 | 72 | 24 | 213 | 25 | 156 | 81 | 250 | 187 | 123 | 80 | 197 | 184 |
| 251 | 74 | 49 | 194 | 76 | 153 | 208 | 59 | 26 | 209 | 17 | 240 | 129 | 26 | 225 | 218 |
| 60 | 97 | 227 | 240 | 127 | 219 | 2 | 190 | 116 | 241 | 29 | 83 | 109 | 107 | 135 | 133 |

The AES-256 block cipher uses the first 256 bits of key generator $K_H(1)$ as the key:

| 129 | 165 | 24 | 90 | 164 | 61 | 166 | 218 | 203 | 144 | 104 | 88 | 9 | 207 | 128 | 203 |
|---|---|---|---|---|---|---|---|---|---|---|---|---|---|---|---|
| 205 | 58 | 232 | 83 | 72 | 24 | 213 | 25 | 156 | 81 | 250 | 187 | 123 | 80 | 197 | 184 |

This key is used to encrypt the first 16 byte block of plain text in process H. In the second 16 byte block, $K_H(2)=K_H(1)$ because no updating has occurred. The same 256 bit key is used to encrypt the second 16 byte block of plain text in process H.

Before the third block is encrypted, key generator is updated as described in section 6.5. Key generator $K_H(3)$ equals:

| 41 | 36 | 203 | 73 | 192 | 63 | 221 | 101 | 102 | 95 | 80 | 9 | 55 | 218 | 91 | 181 |
|---|---|---|---|---|---|---|---|---|---|---|---|---|---|---|---|
| 32 | 5 | 172 | 3 | 174 | 179 | 43 | 117 | 250 | 72 | 59 | 39 | 110 | 227 | 240 | 5 |
| 34 | 10 | 27 | 92 | 214 | 247 | 230 | 82 | 136 | 254 | 216 | 73 | 5 | 29 | 166 | 177 |
| 43 | 4 | 80 | 187 | 3 | 81 | 150 | 193 | 222 | 150 | 1 | 100 | 126 | 51 | 73 | 144 |

The AES-256 block cipher uses the first 256 bits of key generator $K_H(3)$ as the key:

| 41 | 36 | 203 | 73 | 192 | 63 | 221 | 101 | 102 | 95 | 80 | 9 | 55 | 218 | 91 | 181 |
|---|---|---|---|---|---|---|---|---|---|---|---|---|---|---|---|
| 32 | 5 | 172 | 3 | 174 | 179 | 43 | 117 | 250 | 72 | 59 | 39 | 110 | 227 | 240 | 5 |

AES-256 uses this key to encrypt the third 16 byte block of plain text in process H. AES-256 uses this same key to encrypt the fourth 16 byte block of plain text in process H.

Before the fifth block is encrypted, key generator is updated. Key generator $K_H(5)$ equals:

| 96 | 52 | 112 | 190 | 153 | 179 | 248 | 252 | 15 | 230 | 46 | 215 | 216 | 7 | 61 | 231 |
|---|---|---|---|---|---|---|---|---|---|---|---|---|---|---|---|
| 73 | 215 | 102 | 153 | 175 | 10 | 90 | 163 | 255 | 68 | 211 | 238 | 224 | 73 | 141 | 242 |
| 100 | 148 | 24 | 45 | 231 | 174 | 159 | 217 | 93 | 237 | 66 | 126 | 125 | 112 | 8 | 15 |
| 170 | 156 | 138 | 186 | 146 | 162 | 206 | 64 | 48 | 254 | 17 | 187 | 65 | 17 | 244 | 50 |

The AES-256 block cipher uses the first 256 bits of key generator $K_H(5)$ as the key:

| 96 | 52 | 112 | 190 | 153 | 179 | 248 | 252 | 15 | 230 | 46 | 215 | 216 | 7 | 61 | 231 |
|---|---|---|---|---|---|---|---|---|---|---|---|---|---|---|---|
| 73 | 215 | 102 | 153 | 175 | 10 | 90 | 163 | 255 | 68 | 211 | 238 | 224 | 73 | 141 | 242 |

AES-256 uses this key to encrypt the fifth 16 byte block of plain text in process H. This key derivation and updating method is continued indefinitely until the whole data stream has been encrypted.

In an alternative embodiment described below, the key generator $K_H$ is 96 bytes. The block cipher is DES. After every block of 8 bytes is encrypted, the key generator is updated as described in section 6.5. Key generator $K_H(1)$ equals

| 49 | 204 | 127 | 197 | 122 | 54 | 96 | 2 | 160 | 221 | 204 | 228 | 192 | 201 | 39 | 195 |
|---|---|---|---|---|---|---|---|---|---|---|---|---|---|---|---|
| 98 | 184 | 161 | 197 | 193 | 176 | 187 | 204 | 23 | 132 | 76 | 124 | 170 | 63 | 229 | 38 |
| 82 | 149 | 5 | 202 | 41 | 226 | 106 | 137 | 55 | 239 | 92 | 99 | 169 | 8 | 222 | 158 |
| 104 | 102 | 56 | 240 | 251 | 102 | 86 | 160 | 157 | 199 | 151 | 121 | 150 | 246 | 104 | 87 |
| 17 | 140 | 63 | 133 | 58 | 118 | 32 | 66 | 224 | 157 | 140 | 164 | 128 | 137 | 103 | 131 |
| 34 | 248 | 225 | 133 | 129 | 240 | 251 | 140 | 87 | 196 | 12 | 60 | 234 | 127 | 165 | 102 |

The DES block cipher uses a 56 bit key that is generated by applying SHA-512 to the key generator $K_H(1)$ and using the first 56 bits of the digest as the key:

| 199 | 20 | 209 | 195 | 126 | 132 | 197 |
|---|---|---|---|---|---|---|

Before the second block of 8 bytes is encrypted by DES, key generator is updated as described in section 6.5. Key generator $K_H(2)$ equals

| 176 | 122 | 15 | 150 | 18 | 17 | 154 | 170 | 122 | 62 | 135 | 60 | 82 | 41 | 96 | 199 |
|---|---|---|---|---|---|---|---|---|---|---|---|---|---|---|---|
| 92 | 65 | 254 | 126 | 48 | 70 | 220 | 3 | 59 | 38 | 17 | 170 | 155 | 175 | 177 | 109 |
| 145 | 243 | 232 | 159 | 120 | 166 | 66 | 31 | 174 | 164 | 192 | 176 | 114 | 110 | 228 | 164 |
| 49 | 163 | 204 | 203 | 47 | 22 | 166 | 153 | 202 | 8 | 5 | 60 | 194 | 81 | 76 | 12 |
| 129 | 90 | 79 | 214 | 82 | 81 | 218 | 234 | 58 | 126 | 199 | 124 | 18 | 105 | 32 | 135 |
| 28 | 1 | 190 | 62 | 112 | 6 | 156 | 67 | 123 | 102 | 81 | 234 | 219 | 239 | 241 | 45 |

The DES block cipher uses a 56 bit key that is generated by applying SHA-512 to the key generator $K_H(2)$ and using the first 56 bits of the digest as the key:

| 227 | 114 | 181 | 58 | 168 | 40 | 196 |
|---|---|---|---|---|---|---|

Before the third block of 8 bytes is encrypted by DES, key generator is updated as described in section 6.5. Key generator $K_H(3)$ equals

| 126 | 126 | 183 | 2 | 151 | 62 | 12 | 140 | 2 | 102 | 252 | 220 | 94 | 179 | 247 | 221 |
|---|---|---|---|---|---|---|---|---|---|---|---|---|---|---|---|
| 78 | 249 | 13 | 78 | 26 | 43 | 151 | 92 | 32 | 192 | 84 | 7 | 82 | 96 | 192 | 196 |
| 208 | 22 | 190 | 33 | 193 | 234 | 195 | 164 | 195 | 122 | 228 | 189 | 87 | 65 | 208 | 166 |
| 97 | 88 | 186 | 22 | 222 | 186 | 0 | 77 | 33 | 191 | 139 | 251 | 188 | 131 | 58 | 242 |
| 95 | 79 | 151 | 66 | 215 | 126 | 76 | 204 | 66 | 38 | 188 | 156 | 30 | 243 | 183 | 157 |
| 14 | 185 | 77 | 14 | 90 | 107 | 215 | 28 | 96 | 128 | 20 | 71 | 18 | 32 | 128 | 132 |

The DES block cipher uses a 56 bit key that is generated by applying SHA-512 to the key generator $K_H(3)$ and using the first 56 bits of the digest as the key:

| 106 | 7 | 29 | 109 | 200 | 183 | 151 |
|---|---|---|---|---|---|---|

DES uses this 56 bit key to encrypt the third 8 byte block of plain text in process H. This key derivation and updating method is continued indefinitely until the whole data stream has been encrypted.

6.8 Permutations

Process P applies an unpredictable sequence of permutations to scramble the information elements across the whole block. Process S uses an unpredictable sequence of permutations to create a new substitution box for each block of information.

Let the symbol X denote a set. X can be a finite or infinite set. A permutation is a function $\sigma: X \to X$ that maps elements of X to elements of X, is 1 to 1, and is onto. 1 to 1 means that no two distinct elements from X get mapped by $\sigma$ to the same element. More formally, if $s_1$, $s_2$ are any two distinct element from X, in other words $s_1 \neq s_2$, then $\sigma(s_1) \neq \sigma(s_2)$. Onto means that if you choose any element r from X, you can find an element s so that $\sigma$ maps s to r. In other words, for any element r from X, there is some element s in X satisfying $\sigma(s)=r$. In the context of cryptography, the properties 1 to 1, and onto are useful because they help assure that a sequence of information that has been scrambled by a permutation(s) can be unscrambled by the inverse permutation(s).

When X is finite and contains n elements, then the set of all permutations on X is called the symmetric group on n elements; there are n! permutations in $S_n$. For example, when n=5, then $S_5$ contains 5*4*3*2*1=120 permutations.

The identity permutation is the permutation that sends every element to itself. Formally, $i: X \to X$. For every element s in X, $i(s)=s$. As an example, choose X to be the numbers 0 thru 4, inclusive. The identity i sends every element to itself means that $i(0)=0$, $i(1)=1$, $i(2)=2$, $i(3)=3$, and $i(4)=4$.

A finite permutation is a permutation on a finite set. Any finite permutation can be represented as a finite sequence of numbers. The word 'sequence' means that the order of the numbers matters. The sequence [1, 2, 3] is not the same sequence as [2, 3, 1].

The sequence, [0, 1, 2, 3, 4], represents the identity permutation on X. This sequence is interpreted as a permutation in the following way. The number 0 is at the beginning of the sequence, so i(0)=0. The next number in the sequence is 1, so i(1)=1. The number 2 follows 1 in the sequence, so i(2)=2. The number 3 follows 2 in the sequence, so i(3)=3. Finally, 4 follows 3 in the sequence, so i(4)=4.

As a different example, choose X to be the numbers 0 thru 7, inclusive. Choose λ=[1,5,3,6,7,2,4,0]. The number 1 is at the beginning of the sequence, so λ(0)=1. The next number in the sequence is 5, so λ(1)=5. The number 3 follows 5, so λ(2)=3. Similarly, λ(3)=6, λ(4)=7, λ(5)=2, λ(6)=4, and λ(7)=0.

There is a simple way to check that λ is 1 to 1 and onto. Check that all 8 numbers are in the sequence, and make sure none of these numbers occurs in the sequence more than once.

If σ is a permutation, then the inverse of σ is denoted $\sigma^{-1}$. When you apply σ and then apply $\sigma^{-1}$, or vice versa, this composite function is the identity map. Formally, $\sigma \bigcirc \sigma^{-1} = \sigma^{-1} \bigcirc \sigma = i$. In other words, the function $\sigma \bigcirc \sigma^{-1}$ sends every element to itself, and the function $\sigma^{-1} \bigcirc \sigma$ maps every element to itself.

The inverse of λ, denoted $\lambda^{-1}$, is represented by the sequence, [7,0,5,2,6,1,3,4]. The following analysis verifies that this sequence defines the inverse of lambda. From the sequence, $\lambda^{-1}(0)=7$, $\lambda^{-1}(1)=0$, $\lambda^{-1}(2)=5$, $\lambda^{-1}(3)=2$, $\lambda^{-1}(4)=6$, $\lambda^{-1}(5)=1$, $\lambda^{-1}(6)=3$, and $\lambda^{-1}(7)=4$. Next, check that $\lambda \bigcirc \lambda^{-1}(0)=\lambda(7)=0$, $\lambda \bigcirc \lambda^{-1}(1)=\lambda(0)=1$, $\lambda \bigcirc \lambda^{-1}(2)=\lambda(5)=2$, $\lambda \bigcirc \lambda^{-1}(3)=\lambda(2)=3$, $\lambda \bigcirc \lambda^{-1}(4)=\lambda(6)=4$, $\lambda \bigcirc \lambda^{-1}(5)=\lambda(1)=5$, $\lambda \bigcirc \lambda^{-1}(6)=\lambda(3)=6$, $\lambda \bigcirc \lambda^{-1}(7)=\lambda(4)=7$.

This paragraph defines two different operations on a permutation. A transposition is an operation that swaps two elements in a permutation. Let σ=[1,0,2,6,7,5,3,4] be the initial permutation. Transpose 2 and 5 in σ. After the transposition, σ=[1,0,5,6,7,2,3,4]. A rotation is an operation that rotates the elements in a permutation. Let σ=[1,0,2,6,7,5,3,4] be the initial permutation. After a rotation, the new permutation is σ=[4,1,0,2,6,7,5,3].

Any permutation can be constructed efficiently using transpositions. Consider the permutation σ=[$\sigma_0$, $\sigma_1$, ..., $\sigma_{n-1}$] on n elements. In other words, σ(k)=$a_k$. σ can be constructed from the identity [0, 1, ..., n–1]. Starting with the identity, the transpositions (0 $c_0$), (1 $c_1$), (n–1 $c_{n-1}$) are successively applied, where $c_k$ is the array index of $a_k$ in the current state of the permutation as consequence of the previous transpositions (0 $c_0$) ... (k–1 $c_{k-1}$).

Mathematically, the application of these transpositions is not function composition of a transposition with a permutation even though both the permutation and transposition lie in $S_n$. Instead, each transposition $\tau_k$ acts as an transformation on the current permutation, where $\tau_k: S_n \rightarrow S_n$ and as defined previously.

The following example demonstrates how to build A=[1,5,3,6,7,2,4,0] in S, starting with the identity permutation and applying transpositions as transformations. The identity permutation on 8 elements is represented by the sequence [0,1,2,3,4,5,6,7].

[0,1,2,3,4,5,6,7]. The array index of $a_0$=1 is 1, so $c_0$=1. Apply transposition (0 1).
[1,0,2,3,4,5,6,7]. The array index of $a_1$=5 is 5, so $c_1$=5. Apply transposition (1 5).
[1,5,2,3,4,0,6,7]. The array index of $a_2$=3 is 3, so $c_2$=3. Apply transposition (2 3).
[1,5,3,2,4,0,6,7]. The array index of $a_3$=6 is 6, so $a_3$=6. Apply transposition (3 6).
[1,5,3,6,4,0,2,7]. The array index of $a_4$=7 is 7, so $a_4$=7. Apply transposition (4 7).
[1,5,3,6,7,0,2,4]. The array index of $a_5$=2 is 6, so $a_5$=6. Apply transposition (5 6).
[1,5,3,6,7,2,0,4]. The array index of $a_5$=0 is 7, so $a_5$=6. Apply transposition (6 7).
[1,5,3,6,7,2,4,0].

It took 7 transpositions to transform the identity permutation to the permutation λ. Starting with the identity permutation, it takes at most 8 transpositions to generate any of the possible permutations. There are a total of 8!=8*7*6*5*4*3*2*1=40320 possible permutations.

For a permutation of size 256, the number of possible permutations is greater than $10^{506}$. In the future, as the speed of computers improves, the size of the permutations used in the S and P processes should increase enough so that attacks are impractical.

If X has n elements, it takes at most n transpositions to construct any permutation on X. The general procedure for constructing any of the n! permutations is similar to the steps already mentioned. Start with the identity permutation, and then execute n transpositions. Initialize σ equal to the identity permutation, [0, 1, 2, 3, ..., n–2, n–1].

Execute the steps inside the brackets at least n times.

{
  Randomly choose two distinct natural numbers i ≠ k, satisfying 0 ≤ i, k < n.
  Transpose the ith element and the kth element in σ.
}

This procedure is shown for a permutation of length 32. Initialize σ equal to the identity permutation:
[0,1,2,3,4,5,6,7,8,9,10,11,12,13,14,15,16,17,18,19,20,21,22,23,24,25,26,27,28,29,30,31]. Choose 21 and 4 randomly. Transpose the 21st and 4th elements.
[0,1,2,3,21,5,6,7,8,9,10,11,12,13,14,15,16,17,18,19,20,4,22,23,24,25,26,27,28,29,30,31] Choose 27 and 14 randomly. Transpose the 27th and 14th elements.
[0,1,2,3,21,5,6,7,8,9,10,11,12,13,27,15,16,17,18,19,20,4,22,23,24,25,26,14,28,29,30,31] Choose 29 and 4 randomly. Transpose the 29th and 4th elements.
[0,1,2,3,29,5,6,7,8,9,10,11,12,13,27,15,16,17,18,19,20,4,22,23,24,25,26,14,28,21,30,31] Choose 11 and 17 randomly. Transpose the 11th and 17th elements.
[0,1,2,3,29,5,6,7,8,9,10,17,12,13,27,15,16,11,18,19,20,4,22,23,24,25,26,14,28,21,30,31]

Continue these steps for another 28 transpositions to build a random permutation on 32 elements. This method of constructing an arbitrary permutation is important because it pre-vents an intruder from trying to guess the permutation. A potential intruder can not eliminate permutations that may be unreachable by some other algorithm that constructs a permutation. In our case, the intruder must check on average $$\frac{n!}{2}$$

possibilities. Further, transpositions can be executed very quickly on a digital computer. A permutation σ of size 256 requires only 256 memory swaps, and about 2*256=512 bytes of memory to store σ and the inverse of σ. On the other hand, a brute force attack requires checking more than 10506 permutations because $$\frac{256!}{2} > 10^{506}.$$

This transposition method when combined with key generator updating using one-way hash functions is able to generate an unpredictable sequence of permutations, using a small amount of computation (256 memory swaps), and a small amount of memory.

6.9 The P Process: Permuting Information

This section describes in further detail how permutations are used to represent and compute the diffusion (spreading) of information across a block. It describes methods of using permutations to change the order of a sequence of information. The information may be plaintext. The information may be partially encrypted plaintext. The information may be a key generator or key generators. The information may be states that are used by a block cipher or stream cipher.

In section 6.3, titled CRYPTOGRAPHIC PROCESS, the permutation $\mu: \{1, 2, \ldots, M\} \rightarrow \{1, 2, \ldots, M\}$, in the P process, diffuses information across a block of size M. The information is diffused by reordering the information, based on the permutation $\mu$. By updating the permutation $\mu$ after each block, this enables the P process to diffuse the information across the block of size M in an unpredictable way.

In some embodiments, the elements of information are bits (0's and 1's). As an illustrative example, consider $\sigma=[4,2,0,5,3,1]$ applied to the 6 bits of information $b_0 b_1 b_2 b_3 b_4 b_5$. This permutation of 6 bits is shown in FIG. 6a. $\sigma(0)=4$ means that bit $b_0$ in location 0 is permuted to bit location 4. $\sigma(1)=2$ means that bit $b_1$ in location 1 is permuted to bit location 2. $\sigma(2)=0$ means that bit $b_2$ in location 2 is permuted to bit location 0. $\sigma(3)=5$ means that bit $b_3$ in location 3 is permuted to bit location 5. $\sigma(4)=3$ means that bit $b_4$ in location 4 is permuted to bit location 3. $\sigma(5)=1$ means that bit $b_5$ in location 5 is permuted to bit location 1. Thus, $\sigma(b_0 b_1 b_2 b_3 b_4 b_5)=b_2 b_5 b_1 b_0 b_3$. For example, if $b_0 b_1 b_2 b_3 b_4 b_5=010101$, then $\sigma(010101)=011001$.

In FIG. 6b, an embodiment is shown where information elements are bits and M is 512. The permutation $\mu: \{1, 2, \ldots, 512\} \rightarrow \{1, 2, \ldots, 512\}$ sends the block of information $b_1 b_2 \ldots b_{512}$ to $c_1 c_2 \ldots c_{512}$ where $c_k = b_{\mu(k)}$. In FIG. 6b, one arrow indicates that $b_{181}$ is permuted by $\mu$ to bit location 267. In other words, $c_{267} = b_{181}$ which means that $\mu(181)=267$. Similarly, another arrow indicates that $b_{181}$ is permuted by $\mu$ to bit location 511. In other words, $c_{511} = b_{182}$ which means that $\mu(182)=511$. Similarly, the third arrow indicates $\mu(311)=1$, so $b_{311}$ is permuted to location 1 in the permuted block.

In some embodiments, elements of information are permuted that may be larger than a bit. The element of information may be a sequence of bits. In some embodiments the number of bits in an element may change. In other embodiments, the element of information that is permuted may be different from a bit. Although current computers are built from hardware that is natively base 2, information elements can be used that are based on a different base from base 2. For example, in base 3 each element of information $e_k$ in $[e_1, \ldots, e_k, \ldots, e_n]$ could represent 0, 1, 2. This embodiment is useful when the native hardware of a computer has 3 physical states instead of 2 physical states (bits). Then these information elements could be permuted to $[ep_{\mu(1)}, \ldots,$ $e_{\mu(k)}, \ldots, e_{\mu(n)}]$ where $\mu: \{1,2, \ldots, n\} \rightarrow \{1,2, \ldots, n\}$ is a permutation. In some embodiments, the information elements could represent part of a continuum instead of a discrete symbol.

Details are provided below that describe how different permutations sizes may be used. Let $D=[m_0, m_1, m_2, m_3, m_4, m_5, m_6, m_7, m_8, m_9, m_{10}, m_{11}, m_{12}]$ be a sequence of information with 13 elements. Each information element, m, represents $n_i$ information elements, where $n_i \geq 1$. Define the permutation $\lambda$ of length 4 to be $[2,0,3,1]$. This means that $\lambda(0)=2, \lambda(1)=0, \lambda(2)=3,$ and $\lambda(3)=1$. Define the permutation σ of length 6 to be $\sigma=[4, 2, 0, 5, 3, 1]$. This means that $\sigma(0)=4, \sigma(1)=2, \sigma(2)=0, \sigma(3)=5, \sigma(4)=3,$ and $\sigma(5)=1$. Define $\gamma=[2,0,1]$. Then $\gamma(0)=2, \gamma(1)=0,$ and $\gamma(2)=1$.

Apply $\lambda$ to permute the first 4 elements of D, apply σ to permute the next 6 elements of D, and apply $\gamma$ to permute the last 3 elements of D. The permuted sequence is: $[m_{\lambda(0)}, m_{\lambda(1)}, m_{\lambda(2)}, m_{\lambda(3)}, m_{\sigma(0)+4}, m_{\sigma(1)+4}, m_{\sigma(2)+4}, m_{\sigma(3)+4}, m_{\sigma(4)+4}, m_{\sigma(5)+4}, m_{\gamma(0)+10}, m_{\gamma(1)+10}, m_{\gamma(2)+10}] = [m_2, m_0, m_3, m_1, m_8, m_6, m_4, m_9, m_7, m_5, m_{12}, m_{10}, m_{11}]$.

Here are some details on σ is applied to the subsequence, $[m_4, m_5, m_6, m_7, m_8, m_9]$, of the information sequence D. Applying σ creates a new permuted subsequence $[m_8, m_6, m_4, m_9, m_7, m_5]$. The 0th element of the permuted subsequence is $m_8$ because $\sigma(0)+4=8$. The first element of the permuted subsequence is $m_6$ because $\sigma(1)+4=6$. The second element of the permuted subsequence is $m_4$ because $\sigma(2)+4=4$. The third element of the permuted subsequence is $m_9$ because $\sigma(3)+4=9$. The fourth element of the permuted subsequence is $m_7$ because $\sigma(4)+4=7$. The fifth element of the permuted subsequence is $m_5$ because $\sigma(5)+4=5$. Notice that 4 is added each time because $\lambda$ is the sum of the lengths of the previous permutations applied to D. In this particular case, $\lambda$ is the only previous permutation applied to D and $\lambda$'s length is 4 so the sum is 4.

Further details are provided here on how to apply $\gamma$ to the subsequence $[m_{10}, m_{11}, m_{12}]$ of the information sequence D. Applying $\gamma$ creates a new permuted subsequence $[m_{12}, m_{10}, m_{11}]$. The 0th element of the permuted subsequence is $m_{12}$ because $\gamma(0)+10=12$. The first element of the permuted subsequence is $m_{10}$ because $\gamma(1)+10=10$. The second element of the permuted subsequence is $m_{11}$ because $\gamma(2)+10=11$. Notice that 10 is added each time because 10 is the sum of the lengths of the previous permutations, $\lambda$ and σ, applied to D.

In a similar way, $\lambda$, σ, and $\gamma$ can permute the sequence of states $S=[s_0, s_1, s_2, s_3, s_4, s_5, s_6, s_7, s_8, s_9, s_{10}, s_{11}, s_{12}]$. After applying $\lambda$, σ, and $\gamma$, the permuted sequence is $[s_2, s_0, s_3, s_1, s_8, s_6, s_4, s_9, s_7, s_5, s_{12}, s_{10}, s_{11}]$.

In general, let D be a sequence of information $[m_0, m_1, m_2, m_3, m_4, \ldots m_{n-1}]$ with n information elements. Choose any sequence of permutations $[\sigma_1, \sigma_2, \ldots \sigma_k]$, where $\sigma_1$ is a permutation of length $n_1$, $\sigma_2$ is a permutation of length $n_2$, and so forth up to, $\sigma_k$ is a permutation of length $n_k$, and all the lengths sum to n. In other words, $n_1+n_2+n_3+\ldots+n_k=n$. Permute the information sequence D with this sequence of permutations so that the new permuted information sequence is $[m_{\sigma_1(0)}, m_{\sigma_1(1)}, m_{\sigma_1(2)}, \ldots, m_{\sigma(n_1-1)}, m_{\sigma_2(0)+n_1}, \ldots, m_{\sigma_2(n_2-1)+n_1}, m_{\sigma_3(0)+n_1+n_2}, m_{\sigma_4(1)+n_1+n_2}, \ldots, m_{\sigma_3(n_3-1)+n_1+n_2}, m_{\sigma_4(0)+n_1+n_2+n_3}, \ldots, m_{\sigma_k(n_k-1)+n-n_k}]$.

Similarly, let S be a sequence of states $[s_0, s_1, s_2, s_3, s_4, \ldots, s_{n-1}]$ with n elements. Choose any sequence of permutations $[\sigma_1, \sigma_2, \ldots \sigma_k]$, where $\sigma_1$ is a permutation of length $n_1$, $\sigma_2$ is a permutation of length $n_2$, and so forth, $\sigma_k$ is a permutation of length k, and all the lengths sum to n. In other words, $n_1+n_2+\ldots+n_k=n$. Permute this sequence of states S: the permuted sequence is $[s_{\sigma_1(0)}, s_{\sigma_1(1)}, s_{\sigma_1(2)}, \ldots,$ $S_{\sigma(n_1-1)}$, $S_{\sigma_2(0)+n_1}$, . . . , $S_{\sigma_2(n_2-1)+n_1}$, $S_{\sigma_3(0)+n_1+n_2}$, $S_{\sigma_3(1)+n_1+n_2}$, . . . , $S_{\sigma_3(n_3-1)+n_1+n_2}$, $S_{\sigma_4(0)+n_1+n_2+n_3}$, . . . , $S_{\sigma_k(n_k-1)+n-n_k}$].

6.10 Initializing Permutations with a Generator

A NADO key generator is a collection of integers, or a sequence of bits interpreted as a collection of integers or a sequence of bytes, where 8 bits is a byte.

To generate a permutation σ, first initialize σ to the identity permutation, where n is the size of σ. A part of the NADO key generator can be a sequence of non-negative integers, denoted as $k_0, k_1, \ldots, k_m$. When the following three conditions hold, 1. m+1 equals n.
2. The numbers $k_0, k_1, \ldots, k_m$ satisfy $1 \le k_i \le n$.
3. $k_0, k_1, \ldots, k_m$ are created by a reliable hardware, random number generator (RNG) and software selects the next $k_j$ generated from the RNG such that $k_j \notin \{k_0, k_1, \ldots, k_{j-1}\}$.

then initialize σ equal to $[k_0, k_1, k_2, \ldots, k_m]$.

In the case where the three previous conditions do not hold, note that num_keys is m+1. Also, k[j] corresponds to key generator $k_j$. Further sigma_inverse corresponds to $\sigma^{-1}$ and similarly, sigma_inverse [i] corresponds to $\sigma^{-1}(i)$. Finally, mod corresponds to modulo arithmetic. In an embodiment, execute the steps in the following for loop to initialize permutation σ.

```
for(i = 0; i < n; i++)
{
    r = k[i mod num_keys];
    j = (r + j − sigma_inverse[i]) mod n;
    transpose elements i and sigma_inverse(j) in the permutation sigma;
    update sigma_inverse;
}
```

In embodiments, the permutations used in processes S and P can be initialized from the NADO key generators using either of these methods.

6.11 Updating Permutations in the S or P Process

This section describes how to create an unpredictable sequence of permutations that are used in the P process and the S process. There is an initial permutation μ with length L. $K = [k_0, \ldots, k_{n-1}]$ represents the key generator $K_P$ for process P or the key generator $K_S$ for process S. s is an index satisfying $0 \le s < L$. μ represents a permutation that can represent the substitution box σ in the S process or the permutation that diffuses the bits across a block in the P process, as described in section 6.3. $\mu^{-1}$ is the inverse permutation of μ; in other words, $\mu \bigcirc \mu^{-1}(a) = a$ for every a satisfying $0 \le a < L$. In this code, notice that permutation $\mu: \{0, \ldots, L-1\} \to \{0, \ldots, L-1\}$, since programming languages generally use arrays that start at 0 instead of 1.

The number of times the loop is executed is based on a variable num_iterates. In the code shown below, mu corresponds to μ. The expression mu_inverse corresponds to $\mu^{-1}$ and mu_inverse(s) is $\mu^{-1}(s)$. The expression k[j] corresponds to $k_j$. The expression mod means perform modulo arithmetic. 23 mod 11 is 1. In an embodiment, the next permutation is generated by the instructions in the following for loop.

```
for(r = 0; r < num_iterates; r++)
{
    j = r mod n;
    i = k[j] mod L;
    transpose elements mu(i) and mu_inverse(s) in mu;
    update mu_inverse;
    s = (s + mu(i)) mod L;
}
```

Before entering the for loop, suppose $\mu: \{0, \ldots, 255\} \to \{0, \ldots, 255\}$ is the permutation:
[44, 248, 189, 104, 187,201,127, 3, 220,136,155,237,86, 144,166,27,152,204,150,202   114,157,67,245,172,22,89, 167,214,145,42,191,57,77,186,251,31,161,221,111, 250,51, 117,205,0,48,79,165,76,209,181,151,198,78,200,129,179, 49,230,226,102,  222,146,203,30,227,70,196,140,109,177, 63,32,75,228,178,253,43,10,105,38,128,  11,174,23,215,25, 223,110,182,137,216,176,229,141,163,212,94,143,193,219, 88, 133,218,197,180,90,171,255,84,95,81,124,185,108,121, 247,194,87,40,9,41,238,  92,131,168,184,115,2,14,54,103, 17,122,26,192,246,4,208,225,71,119,126,118,33,  130,183, 46,101,159,224,1,125,142,107,217,37,234,242,15,35,239, 211,236,65,154,  16,5,34,98,61,156,53,6,59,100,162,116, 206,68,169,85,58,113,45,62,148,106,243, 249,7,55,147,66, 91,233,39,36,47,190,252,29,235,82,96,60,188,97,18,213, 24,153,  240,158,195,139,232,72,120,93,135,210,199,164, 149,99,160,134,13,19,83,52,132, 175,231,123,241,28,207, 73,112,64,50,12,80,74,20,56,8,173,254,138,244,170,69,21]

One iteration of the loop is described when r is 0. Suppose the key size n is 79. Before entering the loop, suppose s is 3 and k[0] is 7.

The first instruction j=r mod n sets j to 0. The second instruction i=k[j] mod L sets i to 7. For the transposition instruction, the elements $\mu(7)$ and $\mu^{-1}(3)$ of μ are transposed. $\mu(7)=3$ and $\mu^{-1}(3)=7$. Thus, the third element (104) and the seventh element (3) are swapped. μ is updated to:
44,248,189, 3, 87,201,127, 104, 220,136,155,237,86,144, 166,27,152,204,150,202   114,157,67,245,172,22,89,167, 214,145,42,191,57,77,186,251,31,161,221,111, 250,51,117, 205,0,48,79,165,76,209,181,151,198,78,200,129,179,49, 230,226,102,  222,146,203,30,227,70,196,140,109,177,63, 32,75,228,178,253,43,10,105,38,128,  11,174,23,215,25, 223,110,182,137,216,176,229,141,163,212,94,143,193,219, 88, 133,218,197,180,90,171,255,84,95,81,124,185,108,121, 247,194,87,40,9,41,238, 92,131,168,184,115,2,14,115, 454, 103,17,122,26,192,246,4,208,225,71,119,126,118,33,  130, 183,46,101,159,224,1,125,142,107,217,37,234,242,15,35, 239,211,236,65,154,  16,5,34,98,61,156,53,6,59,100,162, 116,206,68,169,85,58,113,45,62,148,106,243,  249,7,55, 147,66,91,233,39,36,47,190,252,29,235,82,96,60,188,97, 18,213,24,153,  240,158,195,139,232,72,120,93,135,210, 199,164,149,99,160,134,13,19,83,52,132, 175,231,123,241, 28,207,73,112,64,50,  12,80,74,20,56,8,173,254,138,244, 170,69,21]

Also, $\mu^{-1}$ is updated accordingly with the changes $\mu^{-1}(104)=7$ and $\mu^{-1}(3)=3$. The last instruction is s=(s+mu(i)) mod 256 which is computed as s=(3+104) mod 256=107.

6.12 The S Process

This section describes how permutations are used to represent and compute a substitution box. In an embodiment, a substitution box used in process S is a permutation σ in the symmetric group $S_{256}$. In alternative embodiments, the substitution boxes used in process S may be permutations in the symmetric group $S_{512}$, $S_{2048}$ or even $S_{65536}$. In process S, the substitution box is not static during the encryption process. It is updated based on methods shown in 6.11. In some embodiments, the avalanche effect of the one-way functions used during the key generator updating of $K_S$ helps unpredictably update the substitution box σ.

An embodiment is further described where the permutation σ is in $S_{256}$ and the block size M for the P process is 512 bits, where this block is represented as 64 bytes [$e_1$, $e_2$, ... ,$e_{64}$]. In this embodiment, during the S process, $\sigma_1$ is applied to the first byte $e_1$, received from process P, $\sigma_2$ is applied to the second byte $e_2$, received from process P, and so on, all the way up to $\sigma_{64}$ is applied to the 64th byte $e_{64}$, received from process P. After each application of $\sigma_k(e_k)$, $\sigma_k$ is updated to $\sigma_{k+1}$. In other words, the substitution box $\sigma_k$ in $S_{256}$ is updated after each byte of encryption. After the last byte of encryption by $\sigma_{64}(e_{64})$, the key generator $K_S(n)$ is updated using the methods described in section 6.5. After the key generator $K_S(n)$ is updated to the new key generator $K_S(n+1)$, the new key generator $K_S(n+1)$ helps further transpose the elements of $\sigma_{64}$, using transposition methods similar to those described in section 6.8.

To distinguish between the successive 64 byte blocks, $\sigma_1$ represents the substitution box that encrypts the first byte of the first 64 byte block; $\sigma_{64}$ represents the substitution box that encrypts the 64th byte of the first 64 byte block; $\sigma_{65}$ represents the substitution box that encrypts the first byte of the second 64 byte block; $\sigma_{66}$ represents the substitution box that encrypts the second byte of the second 64 byte block, and so on.

Suppose $\sigma_1$ initially equals:
[206, 45, 204, 90, 93, 99, 166, 53, 3, 9, 211, 68, 233, 229, 23, 178, 159, 205, 213, 43, 185, 2, 209, 51, 227, 76, 238, 4, 247, 73, 191, 142, 122, 201, 85, 49, 54, 37, 219, 86, 151, 164, 102, 231, 162, 78, 123, 147, 148, 71, 144, 132, 35, 52, 169, 216, 218, 128, 214, 228, 225, 177, 136, 103, 236, 104, 146, 224, 11, 33, 44, 1, 126, 10, 27, 56, 193, 24, 65, 16, 174, 5, 8, 230, 248, 255, 47, 250, 105, 82, 115, 120, 167, 235, 25, 114, 69, 244, 116, 170, 29, 62, 118, 125, 139, 58, 34, 28, 223, 176, 101, 0, 194, 249, 131, 89, 160, 7, 111, 192, 150, 96, 32, 12, 135, 110, 237, 94, 57, 112, 74, 240, 215, 234, 17, 220, 40, 252, 221, 38, 81, 155, 246, 137, 119, 196, 88, 175, 163, 199, 64, 138, 46, 232, 239, 165, 127, 183, 195, 222, 60, 189, 243, 70, 158, 212, 72, 55, 200, 21, 121, 181, 50, 190, 254, 179, 48, 245, 207, 124, 95, 203, 42, 157, 106, 173, 152, 63, 15, 130, 226, 14, 202, 156, 186, 66, 149, 100, 97, 187, 39, 41, 208, 113, 242, 134, 182, 98, 83, 184, 107, 154, 141, 217, 129, 161, 210, 36, 253, 197, 26, 251, 19, 6, 91, 171, 77, 20, 59, 13, 140, 92, 153, 180, 18, 198, 87, 108, 84, 67, 30, 117, 172, 109, 61, 143, 31, 188, 80, 241, 133, 168, 22, 75, 79, 145]

This means that $\sigma_1$ maps 0 to 206, $\sigma_1(1)$=45, $\sigma_1(2)$=204, ... and $\sigma_1(255)$=145. In this notation, the byte 0 corresponds to the eight bits 00000000. Byte 1 corresponds to the eight bits 00000001. The byte 2 corresponds to the eight bits 00000010. The byte 3 corresponds to the eight bits 00000011 .... The byte 149 corresponds to the bits 10010101 .... The byte 255 corresponds to the eight bits 11111111. For example, in bits $\sigma_1$(11111111) =10010001.

The function perturb_generator_v_hash(uchar*K, int n, uchar*digest, int q)—defined in the C code listing below—is a method for updating a key generator or order generator. This method of updating the generator was described in section 6.5. It exploits the avalanche effect of the one-way hash function one_way_hash(uchar*digest, uchar*K, int n). In an embodiment, one_way_hash(uchar*digest, uchar*K, int n) is implemented with Keccak. In another embodiment, it is implemented with SHA-512. In another embodiment, it is implemented with BLAKE.

In the C listing, function transpose(uchar*mu, uchar*mu_inverse, int a, int b) transposes the elements of permutation mu ($\mu$) and mu_inverse ($\mu^{-1}$) as described in section 6.8, titled PERMUTATIONS. transpose_sboz (uchar*mu, uchar*mu_inverse, int offset, int num_transpositions) transposes the elements of mu and mu_inverse based on the digest derived from the current key generator. Since the digest values exhibit an avalanche effect, this updates the permutation mu in an unpredictable manner.

In an embodiment, perturb_sboz(uchar*sbox, ... , uchar*digest, int q) transposes about the same number of elements as the number of elements in the symmetric group. For example, in the C code embodiment, transpose_sboz( ... ) is called inside a loop 8 times and num_transpositions =32. Thus, 8*32=256 and the substitution box S_box lies in the symmetric group $S_{256}$. This embodiment follows the observation from section 6.8 that it is possible with n transpositions to transform any permutation in $S_n$ to any other permutation in $S_n$.

Function call initialize_permutation_inverse (S_boz_inverse, S_box, S_BOX_LENGTH); exits with the array S_boz_inverse storing the inverse permutation of $\sigma_1$ i.e., $\sigma_1^{-1}$.

```
#define S_BOX_LENGTH  256
typedef unsigned char  uchar;
const int  N  =  64;
const int  q  =  64;
uchar  S_box[S_BOX_LENGTH] =
{
  206, 45, 204, 90, 93, 99, 166, 53, 3, 9, 211, 68, 233, 229, 23, 178, 159,
  205, 213, 43, 185, 2, 209, 51, 227, 76, 238, 4, 247, 73, 191, 142, 122,
  201, 85, 49, 54, 37, 219, 86, 151, 164, 102, 231, 162, 78, 123, 147, 148,
  71, 144, 132, 35, 52, 169, 216, 218, 128, 214, 228, 225, 177, 136, 103, 236,
  104, 146, 224, 11, 33, 44, 1, 126, 10, 27, 56, 193, 24, 65, 16, 174,
  5, 8, 230, 248, 255, 47, 250, 105, 82, 115, 120, 167, 235, 25, 114, 69,
  244, 116, 170, 29, 62, 118, 125, 139, 58, 34, 28, 223, 176, 101, 0, 194,
  249, 131, 89, 160, 7, 111, 192, 150, 96, 32, 12, 135, 110, 237, 94, 57,
  112, 74, 240, 215, 234, 17, 220, 40, 252, 221, 38, 81, 155, 246, 137, 119,
  196, 88, 175, 163, 199, 64, 138, 46, 232, 239, 165, 127, 183, 195, 222, 60,
  189, 243, 70, 158, 212, 72, 55, 200, 21, 121, 181, 50, 190, 254, 179, 48,
  245, 207, 124, 95, 203, 42, 157, 106, 173, 152, 63, 15, 130, 226, 14, 202,
  156, 186, 66, 149, 100, 97, 187, 39, 41, 208, 113, 242, 134, 182, 98, 83,
  184, 107, 154, 141, 217, 129, 161, 210, 36, 253, 197, 26, 251, 19, 6, 91,
  171, 77, 20, 59, 13, 140, 92, 153, 180, 18, 198, 87, 108, 84, 67, 30,
  117, 172, 109, 61, 143, 31, 188, 80, 241, 133, 168, 22, 75, 79, 145
};
uchar S_box_inverse[S_BOX_LENGTH];
uchar K[N] =
{
  12,  37, 68, 213,  218, 178, 219, 36,   85,  72, 29, 57,  189, 33,  13,  72,
  64,  98, 24, 247,   56,  29, 62, 10,   16, 251, 181, 78,  171, 89,   7,  21,
```

```
    7,  82, 233,  28,  205, 147, 153, 125,   92, 116, 127, 157, 215,  24, 114,  70,
  186, 228,  39,  53,   48,  11,   2, 254,   82, 165, 224, 237,  58,  35, 203, 199,
};
uchar  Digest[q];
void one_way_hash(uchar* digest, uchar* K, int n);
void perturb_generator_w_hash(uchar* K, int n, uchar* digest, int q)
{
  int i;
  uchar temp = K[n-1];
  /*  Rotate the circular array of unsigned char one byte to the right. */
  memmove(K+1, K, n-1);
  /*  K[n-1] is rotated into K[0] */
  K[0] = temp;
  /*  Hash n bytes of the key and store the digest in d */
  one_way_hash(digest, K, n);
  /*  ^ is the exclusive-or in C syntax. */
  for(i = 0; i < q; i++)
    K[i] = K[i] ^ digest[i];
}
void transpose(uchar* mu, uchar* mu_inverse, int a, int b)
{
  unsigned char temp = mu[a];
  mu[a] = mu[b];
  mu[b] = temp;
  mu_inverse[ mu[a] ] = a;
  mu_inverse[ mu[b] ] = b;
}
void initialize_permutation_inverse(uchar* mu_inverse, uchar* mu, int n)
{
  int k;
  for(k = 0; k < n; k++) mu_inverse[ mu[k] ] = k;
}
void transpose_sbox(uchar* mu, uchar* mu_inverse, int offset, int num_transpositions)
{
  static int j = 0;
  int k, o_idx;
  o_idx = offset % S_BOX_LENGTH;
  for(k = 0; k < num_transpositions; k++)
  {
    j = (j + mu_inverse[o_idx]) % S_BOX_LENGTH;
    transpose(mu, mu_inverse, mu_inverse[o_idx], mu_inverse[j]);
    o_idx =  (o_idx+1) % S_BOX_LENGTH;
  }
}
void perturb_sbox(uchar* sbox, uchar* sbox_inverse, int m, uchar* g,
                  int g_size, uchar* digest, int q)
{
  int k;
  perturb_generator_w_hash(g, g_size, digest, q);
  for(k = 1; k <= 8; k++)
    transpose_sbox(sbox, sbox_inverse, digest[k], m);
}
initialize_permutation_inverse(S_box_inverse, S_box, S_BOX_LENGTH);
```

In the embodiment shown below, function one_way_hash is implemented with SHA-512. After encrypting the first block of 64 bytes perturb_sboz(S_box, S_boz_inverse, 32, K, N, Digest); is called. Consequently, $\sigma_{65}$ equals
[176,53,151,217,20,99,87,247,251,228,25,65,27,196,206, 98,175,   198,171,52,173,2,105,233,28,190,238,4,162,156, 136,70,186, 165,209,168,82,178,174,10,9,195,102,231,249, 220,14,158,54,   202,144,132,253,90,213,133,146,37,187, 128,122,44,143,5,55,   7,218,46,160,95,113,1,172,232,135, 166,142,6,68,185,48,   103,141,159,248,255,58,245,236,69, 115,120,75,71,36,114,91,  194,116,180,205,104,118,31,139, 157,169,242,56,214,101,76,254, 63,131,89,92,239,203,161, 8,96,49,100,35,110,237,94,134,   112,84,224,240,226,59, 252,211,246,30,22,3,216,73,137,62,   183,88,147,197,200, 184,138,12,29,81,97,127,199,77,153,125,  0,74,154,149,51, 219,189,241,43,121,38,229,126,244,16,24, 117,108,124,13, 19,85,193,86,188,152,208,42,130,234,21,18,   181,182,39, 227,191,79,223,215,170,207,109,106,221,93,192,148, 78,107,250,163,57,41,32,15,230,23,150,34,50,155,17,179, 26,66,47,129,212,140,11,222,40,225,177,72,45,123,235,61, 80,164,201,33,67,119,243,204,83,111,60,64,167,210,145]

perturb_sbox(S_box, S_box_inverse, 32, K, N, Digest); iscalled again afterencrypting the second block of 64 bytes. Consequently, $\sigma_{129}$ equals
[97,6,252,94,20,68,99,13,240,228,202,66,70,83,9,222,133, 154,87,82,207,89,147,176,28,157,80,65,81,203,136,131,57, 16,199,48,139,214,193,5,95,231,7,166,249,104,179,192, 114,  183,115,178,172,245,105,209,116,61,243,128,170,44, 145,210,142, 162,159,126,47,255,73,124,58,204,56,33,184, 153,235,221,135,   112,141,143,29,106,93,90,181,118,144, 64,152,194,36,219,85, 244,37,111,251,125,107,238,67,102, 239,78,177,165,241,217,254, 225,100,122,190,200,71,195, 8,224,49,88,35,17,163,31,150,  79,253,130,205,226,167,75, 113,246,30,212,3,180,188,137,42,  232,160,213,247,191,1, 138,168,121,186,220,189,223,164,27,175, 62,74,134,54,51, 52,127,101,43,236,38,229,174,215,182,206,   146,156,185, 96,19,14,208,23,155,120,218,69,123,234,21,18,   22,60,39, 77,171,55,161,216,211,4,148,103,46,117,187,109,   10,92, 76,72,53,25,237,15,230,91,0,34,50,119,110,173, 26,197,84, 129,32,140,198,86,40,59,149,227,45,132,63,41,   196,201, 248,12,108,242,233,151,158,11,24,98,2,250,169]

In some embodiments, a static substitution box with a good avalanche effect may be applied first, followed by a dynamic substitution box. It is known that the static substitution box used in AES exhibits statistics that are close to a good avalanche effect [40]. In an embodiment, consider this AES substitution box T shown below.
[99,124,119,123,242,107,111,197,48,1,103,43,254,215,171, 118,202, 130,201,125,250,89,71,240,173,212,162,175,156, 164,114,192,183, 253,147,38,54,63,247,204,52,165,229, 241,113,216,49,21,4, 199,35,195,24,150,5,154,7,18,128, 226,235,39,178,117,9, 131,44,26,27,110,90,160,82,59,214, 179,41,227,47,132,83, 209,0,237,32,252,177,91,106,203, 190,57,74,76,88,207,208, 239,170,251,67,77,51,133,69, 249,2,127,80,60,159,168,81, 163,64,143,146,157,56,245, 188,182,218,33,16,255,243,210,205, 12,19,236,95,151,68, 23,196,167,126,61,100,93,25,115,96, 129,79,220,34,42, 144,136,70,238,184,20,222,94,11,219,224, 50,58,10,73,6, 36,92,194,211,172,98,145,149,228,121,231, 200,55,109, 141,213,78,169,108,86,244,234,101,122,174,8,186, 120,37, 46,28,166,180,198,232,221,116,31,75,189,139,138,112, 62,181,102,72,3,246,14,97,53,87,185,134,193,29,158,225, 248,152,17,105,217,142,148,155,30,135,233,206,85,40, 223,140, 161,137,13,191,230,66,104,65,153,45,15,176,84, 187,22]

Using function composition, in an embodiment, $\sigma_1 \bigcirc \tau$ is applied to the first byte of information $e_1$ and computed as $\sigma_1 \bigcirc \tau(e_1)$. On the second byte $e_2$ of information $\sigma_2 \bigcirc \tau(e_2)$ is computed. On the 65th byte $e_{65}$ of information, $\sigma_{65} \bigcirc \tau(e_{65})$ is computed. On the 129th byte $e_{129}$ of information, $\sigma_{129} \bigcirc \tau(e_{129})$ is computed.

As an example of this composition of substitution boxes, if $e_{65}=255$, then $\sigma_{65} \bigcirc \tau(e_{65}) = \sigma_{65}(22) = 105$, based on the substitution boxes previously shown for $\sigma_{65}$ and $\tau$. If $e_{129}=255$, then $\sigma_{129} \bigcirc \tau(e_{129}) = \sigma_{65}(22) = 147$.

This composition of substitution boxes yields a favorable cryptographic property because a static substitution box (static permutation) can be used that is known to exhibit close to a good avalanche effect and the other substitution box is unknown to the adversary. Furthermore, due to the good avalanche effect of one-way hash functions and the use of the key generator updating, the unknown substitution box unpredictably changes as the encryption process executes. This increases the computational complexity of potential cryptographic attacks.

6.13 Process H as a State Generator

In an alternative embodiment, process H is a state generator. This process is a dynamical system that creates a sequence of states. An iterative autonomous dynamical system is created by a function $f: X \to X$, where X is a set. When a function $f$ and an initial orbit point x are chosen, the iteration of $f$ on x creates a sequence of states: $[x, f(x), f \bigcirc f(x), f \bigcirc f \bigcirc f(x), \ldots]$. This sequence of states is called the orbit of x with the function $f$. It is also possible to create a sequence of states using a sequence of functions $[f_1, f_2, f_3, f_4, \ldots]$, rather than a single function. The iteration of this collection on an initial orbit point x creates a sequence of states: $[x, f_1(x), f_2 \bigcirc f_1(x), f_3 \bigcirc f_2 \bigcirc f_1(x), f_4 \bigcirc f_3 \bigcirc f_2 \bigcirc f_1(x), \ldots]$. As the system is iterated, if the function applied sometimes changes, then this is an iterative non-autonomous dynamical system [41]. An iterative autonomous dynamical system is a special case of a non-autonomous dynamical system. If all the $f_i$ represent the same function, then this is the definition of an autonomous dynamical system.

A smooth dynamical system is created by a vector field on a manifold [42]. If the vector field does not change over time, then it is a smooth autonomous dynamical system. If the vector field changes smoothly over time, then it is a smooth non-autonomous dynamical system. In a smooth dynamical system, one creates a sequence of unpredictable states by sampling the coordinates of the trajectory at successive time intervals: $t_0 < t_1 < t_2 < \ldots$.

Below is a summary of an alternative embodiment when the H process acts as a state generator.

Process H State Generator Encryption. For each block of plaintext of size n, this part describes an encryption process $P \bigcirc S \bigcirc H$. Plaintext $[m_1, m_2, \ldots, m_n]$ is the current block that will be encrypted.

1. Process H uses some of the current key generator $K_H$ to generate the next n states $[s_1, s_2, \ldots, s_n]$ and partially encrypts this block as $[m_1 \oplus s_1, m_2 \oplus s_2, \ldots, m_n \oplus s_n]$. A portion of the current key generator $K_H$ is updated using a one-way hash function: this means that the next n states used to partially encrypt the next block will usually be different from $[s_1, s_2, \ldots, s_n]$.

2. Process S uses some of the current key generator $K_S$ to generate a substitution box, represented as $\sigma_1$. $\sigma_1$ further encrypts the first element of the block from step 2 as $\sigma_1(m_1 \oplus s_1)$. In some embodiments, $\sigma_1$ is updated to $\sigma_2$ so that $\sigma_2 \neq \sigma_1$; in other embodiments, $\sigma_1$ may not be updated so that $\sigma_2 = \sigma_1$. $\sigma_2$ further encrypts the second element of the block from process H as $\sigma_2(m_2 \oplus s_2)$ and so on all the way up to $\sigma_n(m_n \oplus s_n)$.

The current key generator $K_S$ is updated using a one-way hash function: This means that the substitution box for the next block is usually different.

3. Process P uses some of key generator $K_P$ to create permutation $\tau: \{1, \ldots, n\} \to \{1, \ldots, n\}$ and permute the block from step 2 to $[\sigma_{\tau(1)}(m_{\tau(1)} \oplus s_{\tau(1)}), \ldots, \sigma_{\tau(n)}(m_{\tau(n)} \oplus s_{\tau(n)})]$. Permutation $\tau$ spreads the encrypted plaintext from process S over a block of size n. The fully encrypted plaintext block is $[e_1, \ldots, e_n]$ where $e_k = \sigma_{\tau(k)}(m_{\tau(k)} \oplus s_{\tau(k)})$.

A portion of the current key generator $K_P$ is updated using a one-way hash function: this means that the permutation $\tau$ used for the next block will usually be different.

In one embodiment, the current key generator for process H is $K_H = [k_1, k_2, \ldots, k_n]$ and m is a positive integer such that m<n. The current plaintext element p will be encrypted by the next state, which is determined as described here. In an embodiment, key generator $K_H$ is used to help construct a state generator, wherein one-way hash function $\Phi$ is applied to two different portions of the key generator $K_H$ and the resulting two message digests are compared to generate the next state. In an alternative embodiment, only one message digest is computed and states are determined based on the parity of elements of this single message digest.

In an embodiment, a one-way function $\Phi$ is applied to one portion $k_1, k_2, \ldots, k_m$ and $\Phi$ is applied to a second portion $k_j, k_{j+1}, \ldots, k_{m-j}$ where $j+1 < n-m$ or $j+1 < m$. In an embodiment, one message digest is $\Phi(k_1, k_2, \ldots, k_m)$ and the second message digest is $\Phi(k_3, k_4, \ldots, k_{m-2})$. In an alternative embodiment, when m is an even number, one message digest is $\Phi(k_1, k_3, k_5, \ldots, k_{m-1})$ and the second message digest is $\Phi(k_2, k_4, k_6, \ldots, k_m)$.

Let $[t_1, t_2, \ldots, t_q]$ denote the first aforementioned message digest and let $[u_1, u_2, \ldots, u_q]$ denote the second aforementioned message digest. In one embodiment, plaintext message element p is 8 bits and each bit of p is encrypted by comparing elements of the first message digest $[t_1, t_2, \ldots, t_q]$ with elements of the second message digest $[u_1, u_2, \ldots, u_q]$.

Suppose $q \geq 40$. In an embodiment, the first bit of p is exclusive-or'd with 1 if $[u_1, u_9, u_{17}, u_{25}, u_{33}]$ is less than $[t_1, t_9, t_{17}, t_{25}, t_{33}]$ with respect to the dictionary order. The first bit of p is left unchanged if $[u_1, u_9, u_{17}, u_{25}, u_{33}]$ is greater than $[t_1, t_9, t_{17}, t_{25}, t_{33}]$ with respect to the dictionary order. Ties are determined by whether $u_{33}$ is odd or even.

The following code computes $[u_1, u_9, u_{17}, u_{25}, u_{33}]$ is less than $[t_1, t_9, t_{17}, t_{25}, t_{33}]$ with respect to the dictionary order.

```
if (u[1] < t[1])   return true;
else if (u[1] == t[1])
{
    if (u[9] < t[9])   return true;
    else if (u[9] == t[9])
    {
        if (u[17] < t[17])   return true;
        else if (u[17] == t[17])
        {
            if (u[25] < t[25])   return true;
            else if (u[25] == t[25])
            {
                if (u[33] < t[33])   return true;
                else if (u[33] == t[33])
                {
                    if (u[33] is even) return true;
                    else return false;
                }
                return false;
            }
            return false;
        }
        return false;
    }
    return false;
}
return false;
```

In an embodiment, the second bit of p is exclusive-or'd with 1 if $[u_2, u_{10}, u_{18}, u_{26}, u_{34}]$ is less than $[t_2, t_{10}, t_{18}, t_{26}, t_{34}]$ with respect to the dictionary order. The second bit of p is left unchanged if $[u_2, u_{10}, u_{18}, u_{26}, u_{34}]$ is greater than $[t_2, t_{10}, t_{18}, t_{26}, t_{34}]$. Ties are resolved the same way as for bit 1: i.e., if (u[34] is even) return true; else return false;

In an embodiment, the third bit of p is exclusive-or'd with 1 if $[u_3, u_{11}, u_{19}, u_{27}, u_{35}]$ is less than $[t_3, t_{11}, t_{19}, t_{27}, t_{35}]$ with respect to the dictionary order. The third bit of p is left unchanged if $[u_3, u_{11}, u_{19}, u_{27}, u_{35}]$ is greater than $[t_3, t_{11}, t_{19}, t_{27}, t_{35}]$. Ties are resolved the same way as for bit 1: i.e., if (u[35] is even) return true; else return false;

This same pattern of dictionary order comparison and encryption is continued for bits 4, 5, 6, 7 and bit 8 of plaintext information p.

In some other embodiments, q<40. In some embodiments, a different comparison operator is used on the two message digests. In some embodiments, only one message digest is computed and each bit of the plaintext is encrypted, based on whether one element of the message digest has an odd or even number of 1 bits.

6.14 Distribution of the NADO Key Generators

NADO uses symmetric private key generators $K_H$, $K_P$ and $K_S$. This means the initial private key generator that the encryptor uses for each process is the same as the private key generator that the decryptor uses for that corresponding process. There are different methods for distributing the NADO private key generators.

1. A Diffie-Hellman exchange can be used.
2. A courier may hand-carry the key or key generators to two or more parties.

Method 1 is preferable when the number of potential recipients of an encrypted transmission is large and potential recipients are unknown. These applications include: Secure wireless applications such as mobile phone conversations, wireless e-mail transmissions, wireless trans-actions, wireless e-commerce, and satellite transmissions. Secure software applications such as e-mail applications, enterprise computing, online e-commerce, online messaging, enterprise portal software, and other internet applications.

In applications where the number of potential recipients of an encrypted transmission is small and the recipients are known beforehand, method 2 can be used, where sending and receiving agents can agree to have the private key or key generators transmitted in a secure way. This method can be used when there are concerns about man-in-the-middle attacks on the Diffie-Hellman exchange.

6.15 Diffie-Hellman Exchange of Key Generators

In the prior art, the Diffie-Hellman key exchange is a key exchange method where two parties (Alice and Bob) that have no prior knowledge of each other jointly establish a shared secret key over an unsecure communications channel. In this specification, the Diffie-Hellman exchange method is used by two parties (Alice and Bob) to establish an initial shared key generator $K_H(0)$ for the H process; establish an initial shared key generator $K_P(0)$ for the P process; and establish an initial shared key generator $K_S(O)$ for the S process.

The standard Diffie-Hellman exchange depends on the properties of abelian groups. A group G is a set with a binary operation *, ($g^2$ means g*g and $g^5$ means g*g*g*g*g), such that the following four properties hold:

1. The binary operation * is closed on G. In other words, a*b lies in G for all elements a and b in G.
2. The binary operation * is associative on G. a*(b*c)= (a*b)*c for all elements a, b, and c in G.
3. There is a unique identity element e in G. a*e=e*a=a.
4. Each element a in G has a unique inverse denoted as a. $a*a^{-1}=a^{-1}*a=e$.

Sometimes the identity of the group is represented as 1 when the group operation is a form of multiplication. Sometimes the identity of the group is represented as 0 when the group operation is a form of addition. The integers $\{\ldots, -2, -1, 0, 1, 2, \ldots\}$ with respect to the binary operation+ are an example of an infinite group. 0 is the identity element. For example, the inverse of 5 is −5 and the inverse of −107 is 107. The set of permutations on n elements $\{1, 2, \ldots, n\}$, denoted as $S_n$, is an example of a finite group with n! elements where the binary operation is function composition. Each element of $S_n$ is a function $\sigma: \{1, 2, \ldots, n\} \to \{1, 2, \ldots, n\}$ that is 1 to 1 and onto. In this context, $\sigma$ is called a permutation. The identity permutation e is the identity element in $S_n$, where e(k)=k for each k in $\{1, 2, \ldots, n\}$.

If H is a non-empty subset of a group G and H is a group with respect to the binary group operation * of G, then H is called a subgroup of G. H is a proper subgroup of G if H is not equal to G (i.e., H is a proper subset of G). G is a cyclic group if G has no proper subgroups. The integers modulo n (i.e., $Z_n = \{[0], [1], \ldots [n-1]\}$ are an example of a finite group with respect to addition modulo n. If n=5, [4]+[4]=[3] in $\mathbb{Z}_5$ because 5 divides (4+4) 3. Similarly, [3]+[4]=[3] in $\mathbb{Z}_5$. $\mathbb{Z}_5$ is a cyclic group because 5 is a prime number. When p is a prime number, $\mathbb{Z}_p$ is a cyclic group containing p elements $\{[0], [1], \ldots [p-1]\}$. [1] is called a generating element for cyclic group $\mathbb{Z}_p$ since $[1]^m = [m]$ where m is a natural number such that $0 < m \leq p-1$ and $[1]^p = [0]$. This multiplicative notation works as follows: $[1]^2 = [1]+[1]$; $[1]^3 = [1]+[1]+[1]$; and so on. This multiplicative notation (i.e. using superscripts) is used in the description of the Diffie-Hillman exchange protocol described below.

There are an infinite number of cyclic groups and an infinite number of these cyclic groups are extremely large. The notion of extremely large means the following: if $2^{1024}$ is considered to be an extremely large number based on the computing power of current computers, then there are still an infinite number of finite cyclic groups with each cyclic group containing more than $2^{1024}$ elements.

Steps 1, 2, 3, 4, and 5 describe the Diffie-Hellman key generator exchange.

1. Alice and Bob agree on an extremely large, finite, cyclic group G and a generating element g in G. The group G is written multiplicatively as explained previously.
2. Alice picks a random natural number a and sends ga to Bob.
3. Bob picks a random natural number b and sends gb to Alice.
4. Alice computes (gb)a.
5. Bob computes (ga)b.

Alice and Bob sometimes agree on finite cyclic group G and element g long before the rest of the key exchange protocol; g is assumed to be known by all attackers. The mathematical concepts of cyclic group, generating element and finite field are presented in [43].

Both Alice and Bob are now in possession of the group element gab, which can serve as the shared secret key. The values of (gb)a and (ga)b are the same because g is an element of group G. Alice can encrypt information m, as mgab, and sends mgab to Bob. Bob knows |G|, b, and ga. A result from group theory implies that the order of every element of a group divides the number of elements in the group, denoted as |G|. This means $x^{|G|}=1$ for all x in G where 1 is the identity element in G. Bob calculates $(ga)^{|G|-b} = (g^{|G|})^a g^{-ab} = (g^{ab})^{-1}$. After Bob receives the encrypted information $mg^{ab}$ from Alice, then Bob applies $(g^{ab})^{-1}$ and decrypts the encrypted information by computing $mg^{ab}(g^{ab})^{-1}=m$.

6.16 Elliptic Curve Key Generator Exchange

This section describes an asymmetric key cryptography, called elliptic curve cryptography, which in some embodiments can be used to implement a Diffie-Hellman key generator exchange.

The notation Enc(E, m) is used to represent the result of encrypting plaintext m using an elliptic curve E. In what follows, the notation Dec(E, c) is used to represent the result of decrypting ciphertext c which is embedded as a point on elliptic curve E. In an embodiment, elliptic curve cryptography is an asymmetric cryptography method used to establish shared key generators between Alice and Bob.

In an embodiment, it is assumed that E is an elliptic curve over finite field $\mathbb{F}_p$ where p is a prime number and H is a cyclic subgroup of $E(\mathbb{F}_p)$ generated by the point P that lies in $E(\mathbb{F}_p)$. Alice wants to securely send information to Bob whose public key is (E, P, aP) and whose private key is the natural number a<p−1.

Alice executes the following Encryption Stage. Chose a random natural number b<p−1. Consider the plaintext information embedded as points m on E. Compute β=bP and γ=m+b(aP). Send the ciphertext Enc(E, m)=c=(β, γ) to Bob.

Bob executes the following Decryption Stage after receiving the ciphertext c=(β, γ). The plaintext m is recovered using the private key as Dec(E, c)=m=γ−aβ.

Elliptic curve computations over a finite field also enable Alice and Bob to establish common private key generators before NADO cryptography is started. The following is a simple example described here for illustrative purposes, not security purposes. Consider the elliptic curve E given by $y^2=x^3+4x+4$ over $\mathbb{F}_{13}$. It can be shown that $E(\mathbb{F}_{13})$ has 15 elements which is necessarily cyclic. Also, P=(1,3) is a generator of E. Assuming that Bobs public key is (E, P, 4P) where a=4 is the private key and m=(10, 2) is the information that Alice wants to send to Bob, then Alice performs the following. Alice chooses b=7 at random. Then Alice calculates Enc(E, m)=Enc(E, (10, 2))=(bP, m+b(aP))=(7P, (10, 2)+7(4P))=((0, 2), (10, 2)+7(6, 6))=((0,2), (10,2)+(12,5))=((0,2), (3, 2))=(β, γ)=c. Then Alice sends ciphertext c=(8, 7)=((0,2), (3,2)) to Bob who uses his private key to decrypt the ciphertext and recover information m=(10, 2) as follows: Dec(E, c)=(3,2)−4(0, 2)=(3, 2)−(12, 5)=(3, 2)+(12, 8)=(10, 2). For further information on elliptic curves, see [45, 46].

In a Diffie-Hellman exchange embodiment, the Bernstein 25519 curve [44] may be used to perform a Diffie-Hellman elliptic curve key generator exchange. The curve 25519 function is $\mathbb{F}_p$ restricted x-coordinate multiplication on $E(\mathbb{F}_{p^2})$, where p is the prime number $2^{255}-19$ and E is the elliptic curve $y^2=x^3+486662x^2+x$. The order of the basepoint 9 on curve 25519 equals $2^{252}+$ 27742317777372353535851937790883648493 which is a prime number so the group for this elliptic curve is cyclic. Curve 25519 is conjectured to have a complexity of $2^{128}$ for conventional Turing machine algorithms, based on the last two decades of research on elliptical curve cryptography.

A private elliptic curve point for curve 25519 can be created by any sequence of 32 bytes (256 bits). In an embodiment shown in 136 of FIG. 1B and in 140 of FIG. 1D, a non-deterministic generator creates these bits by measuring event times of photons as described in section 6.4, titled CRYPTOGRAPHIC HARDWARE and INFRASTRUCTURE. In an embodiment, 256 distinct triplets of photon event times $(t_{(1,1)}, t_{(1,2)}, t_{(1,3)}), (t_{(2,1)}, t_{(2,2)}, t_{(2,3)}), \ldots, (t_{(k,1)}, t_{(k,2)}, t_{(k,3)}), \ldots (t_{(256,1)}, t_{(256,2)}, t_{(256,3)})$, that for each k satisfy $t_{(k,1)}<t_{(k,2)}<t_{(k,3)}$ and $t_{(k,2)}-t_{(k,1)} \neq t_{(k,3)}-t_{(k,2)}$, are observed by the non-deterministic generator. Each triplet generates a 1 or 0 depending on whether $t_{(k,2)}-t_{(k,1)}>t_{(k,3)}-t_{(k,2)}$ or $t_{(k,2)}-t_{(k,1)}<t_{(k,3)}-t_{(k,2)}$.

Each corresponding public elliptic curve point is computed, using curve 25519, the basepoint 9 and the 32 byte private elliptic curve point that was obtained from non-deterministic generator 136 in FIG. 1B. In an embodiment, Alice may generate 6 public elliptic curve point a using curve 25519 and Bob may generate 6 public elliptic curve points. As described in further detail below, Alice and Bob may execute the Diffie-Hellman key generator exchange 6 times using curve 25519.

As a result of performing this exchange 6 times, Alice and Bob are able to establish a shared 64 bytes for key generator $K_H(0)$ and a shared 64 bytes for key generator $K_P(0)$, and also and a shared 64 bytes for key generator $K_S(0)$. In this embodiment and other embodiments, each of these shared key generators may be established independently of the other two.

Next a particular execution—of curve 25519 establishing a shared secret of 32 bytes between Alice and Bob—is described. From non-deterministic hardware shown in FIG. 1D, Alice generates the following private elliptic curve point.

| 176 | 58 | 103 | 36 | 37 | 153 | 39 | 136 | 180 | 50 | 46 | 216 | 242 | 83 | 24 | 30 |
|---|---|---|---|---|---|---|---|---|---|---|---|---|---|---|---|
| 195 | 218 | 194 | 126 | 250 | 57 | 183 | 248 | 185 | 98 | 39 | 166 | 78 | 243 | 168 | 110 |

Alice uses her private elliptic curve point and basepoint 9 to compute on curve 25519 the following public key.

| 176 | 14 | 25 | 19 | 209 | 34 | 71 | 218 | 92 | 255 | 207 | 141 | 132 | 249 | 209 | 123 |
|---|---|---|---|---|---|---|---|---|---|---|---|---|---|---|---|
| 121 | 96 | 174 | 173 | 235 | 210 | 156 | 15 | 93 | 151 | 82 | 191 | 57 | 78 | 189 | 101 |

Alice sends her public elliptic curve point to Bob.

From non-deterministic hardware shown in FIG. 1D, Bob generates the following private elliptic curve point.

| 160 | 234 | 84 | 52 | 17 | 88 | 119 | 69 | 197 | 210 | 143 | 199 | 195 | 20 | 88 | 62 |
|---|---|---|---|---|---|---|---|---|---|---|---|---|---|---|---|
| 228 | 4 | 215 | 143 | 181 | 48 | 78 | 47 | 23 | 101 | 23 | 184 | 47 | 232 | 37 | 80 |

Bob uses his private elliptic curve point and basepoint 9 to compute on curve 25519 the following public elliptic curve point.

| 104 | 9 | 3 | 245 | 60 | 155 | 177 | 175 | 166 | 78 | 151 | 128 | 205 | 57 | 243 | 109 |
|---|---|---|---|---|---|---|---|---|---|---|---|---|---|---|---|
| 121 | 237 | 239 | 140 | 224 | 210 | 200 | 46 | 214 | 102 | 212 | 168 | 162 | 221 | 188 | 21 |

Bob sends his public elliptic curve point to Alice.

Next Alice uses her private elliptic curve point and Bob's public elliptic curve point to compute on curve 25519 the shared point shown below.

| 134 | 141 | 241 | 224 | 244 | 91 | 115 | 246 | 226 | 156 | 20 | 66 | 29 | 94 | 238 | 158 |
|---|---|---|---|---|---|---|---|---|---|---|---|---|---|---|---|
| 67 | 135 | 202 | 219 | 21 | 47 | 129 | 214 | 150 | 235 | 119 | 141 | 40 | 57 | 202 | 83 |

Similarly, Bob uses his private elliptic curve point and Alice's public elliptic curve point to compute on curve 25519 the shared point shown below.

| 134 | 141 | 241 | 224 | 244 | 91 | 115 | 246 | 226 | 156 | 20 | 66 | 29 | 94 | 238 | 158 |
|---|---|---|---|---|---|---|---|---|---|---|---|---|---|---|---|
| 67 | 135 | 202 | 219 | 21 | 47 | 129 | 214 | 150 | 235 | 119 | 141 | 40 | 57 | 202 | 83 |

When this exchange is performed 6 times, this enables Bob and Alice to establish 64 bytes of shared key generator $K_H(0)$ for process H, 64 bytes of shared key generator $K_P(0)$ for process P and 64 bytes of shared key generator $K_S(0)$ for process S.

Although the invention has been described with reference to specific embodiments, it will be understood by those skilled in the art that various changes may be made and equivalents may be substituted for elements thereof without departing from the true spirit and scope of the invention. In addition, modifications may be made without departing from the essential teachings of the invention.

REFERENCES

[1] Mihir Bellare and Phillip Rogaway. Introduction to Modern Cryptography. 2005. http://www.cs.ucdavis.edu/~rogaway/classes/227/springOS/book/main.pdf

[2] Oded Goldreich. Foundations of Cryptography. Volumes I Basic Tools. Cambridge University Press. 2001.

[3] Oded Goldreich. Foundations of Cryptography. Volume II Basic Applications. Cambridge University Press. 2004.

[4] T. W. Cusick and Pante Stanica. Cryptographic Boolean Functions and Applications. Academic Press, Elsevier, 2009.

[5] NIST. Advanced Encryption Standard (AES), FIPS 197. November 2001. http://carc.nist.gov/publicat ions/fips/fips197/fips-197.pdf

[6] Richard A. Mollin. Codes: The Guide to Secrecy From Ancient to Modern Times. Chapman & Hall. 527-530, 2005.

[7] Juliano Rizzo and Thai Duong. Practical Padding Oracle Attacks. Black Hat Conference. 2010. https://www.usenix.org/legacy/event/voot10/tech/full_papers/Rizzo. pdf http://en.wikipedia.org/wiki/Padding_oracle_attack http://people.cs.kuleuven.be/~andre.marien/security/playing %20with %20cbc.pdf

[8] Alex Biryukov and Khovratovich, D.: Related-Key Cryptanalysis of the Full AES-192 and AES-256. In Matsui, M., ed.: Asiacrypt. LNCS 5912, Springer, 1-18, 2009.

[9] Alex Biryukov, Khovratovich, D., Nikolic, I. Distinguisher and Related-Key Attack on the Full AES-256. Advances in Cryptology—Crypto 2009. LNCS 5677. Springer, 231-249, 2009.

[10] Patrick Derbez, Pierre-Alain Fouque and Jeremy Jean. Improved Key Recovery Attacks on Reduced-Round AES in the Single-Key Setting. Advances in Cryptology—Eurocrypt 2011. LNCS 7881. Springer, 371-387, 2011.

[11] Alex Biryukov and Dmitry Khovratovich. Feasible Attack on the 13-round AES-256. 2010.

[12] Andrey Bogdanov, Dmitry Khovratovich, and Christian Rechberger. Biclique Cryptanalysis of the Full AES. Advances in Cryptology—Asiacrypt 2011. LNCS 7073, Springer, 344-371, 2011.

[13] Daniel Bernstein and Tanja Lange. Non-uniform cracks in the concrete: the power of free precom-putation. Advances in Cryptology—Asiacrypt. LNCS 8270. Springer, 321-340, 2013.

[14] Orr Dunkelman, Nathan Keller, Adi Shamir. Improved Single-Key Attacks on 8-round AES. Cryptology ePrint Archive, Report 2010:322, 2010. http://eprint.iacr.org/2010/322.pdf

[15] Jon Passki and Tom Ritter. An Adaptive-Ciphertext Attack against I⊕C Block Cipher Modes with Oracle. IACR Cryptology ePrint Archive 2012:292, 2012. http://eprint.iacr.org/2012/292.pdf http://ritter.vg/blog-separator_oracle.html

[16] Horst Feistel. Cryptography and Computer Privacy. Scientific American. 228, No. 5, 15-23, 1973.

[17] Clark Robinson. Dynamical Systems Stability, Symbolic Dynamics, and Chaos. CRC Press. 1995.

[18] Dake. Image of SHA-1 avalanche effect. http://commons.wikimedia.org/wiki/File: Sha1_avalanche_effect.png

[19] Xuejia Lai. Higher Order Derivatives and Differential Cryptanalysis. In Communications and Cryptography: Two Sides of One Tapestry, R. E. Blahut et al., eds., Kluwer Adademic Publishers, 227-233, 1994.

[20] Ming Duan, Xuejia Lai, Mohan Yang, Xiaorui Sun and Bo Zhu. Distinguishing Properties of Higher Order Derivatives of Boolean Functions. IACR Cryptology ePrint. 2010. https://eprint.iacr.org/2010/417.pdf.

[21] NIST. FIPS-180-4. Secure Hash Standard, March 2012. http://carc.nist.gov/publications/fips/fips180-4/fips-180-4.pdf

[22] John Hennessy, David Patterson. Computer Architecture. 5th Edition, Morgan Kaufmann, 2012.

[23] NIST. FIPS-180-2: Secure Hash Standard, August 2002. http://www.itl.nist.gov/fipspubs/.

[24] Data Encryption Standard. Federal Information Processing Standards Publication. FIPS PUB 46, National Bureau of Standards, Washington, D.C. 1977.

[25] Data Encryption Standard (DES). Federal Information Processing Standards Publication, FIPS PUB 46-3, National Bureau of Standards, Gaithersburg, Md. 1999. http://carc.nist.gov/publications/fips/fips46-3/fips46-3.pdf

[26] Claude Shannon. Communication Theory of Secrecy Systems. http://netlab.cs.ucla.edu/wiki/files/shannon1949.pdf. 1949.

[27] Alan M. Turing. On computable numbers, with an application to the Entscheidungsproblem. Proc. London Math. Soc. Series 2 42 (Parts 3 and 4), 230-265, 1936.

[28] Andre Stefanov, Nicolas Gisin, Olivier Guinnard, Laurent Guinnard, and Hugo Zbinden. Optical quantum random number generator. Journal of Modern Optics, 47(4): 595 598, 2000.

[29] Mario Stipcevic and B. Medved Rogina. Quantum random number generator based on photonic emission in semiconductors. Review of Scientific Instruments. 78, 045104: 1-7, 2007.

[30] A. A. Abbott, C. S. Calude, J. Conder & K. Svozil. Strong Kochen-Specker theorem and incom-putability of quantum randomness. Physical Review A. 86 062109, 1-11, 2012.

[31] John Conway and Simon Kochen. The Strong Free Will Theorem. Notices of the American Mathematical Society. 56(2), 226-232, February 2009.

[32] Simon Kochen and Ernst P. Specker. The Problem of Hidden Variables in Quantum Mechanics. Journal of Mathematics and Mechanics (now Indiana Univ. Math Journal) 17 No. 1, 59-87, 1967.

[33] Klint Finley. Chinese Supercomputer Is Still the Worlds Most Powerful. Wired Magazine. Nov. 18, 2013.

[34] Guido Bertoni, Joan Daemen, Michael Peeters, Gilles Van Assche. Keccak Reference 3.0 2011. http://keccak.noekean.org/http://en.wikipedia.org/wiki/Keccak

[35] Jean-Philippe Aumasson, Samuel Neves, Zooko Wilcox-O'Hearn, Christian Winnerlein. BLAKE. https://131002.net/blake/http://en.wikipedia.org/wiki/BLAKE_(hash_function)

[36] Praveen Gauravaram, Lars Knudsen, Krystian Matusiewicz, Florian Mendel, Christian Rechberger, Martin Schlffer, and Sren S. Thomsen. Grstl a SHA-3 candidate. http://www.groestl.info http://ww.groestl.info/Croestl.pdf

[37] Hongjun Wu. The Hash Function JH. 2011. http://ehash.iaik.tugraz.at/wiki/JH http://www3.ntu.edu.sg/home/vuhj/research/jh/jh_round3.pdf

[38] Niels Ferguson, Stefan Lucks, Bruce Schneier, Doug Whiting, Mihir Bellare, Tadayoshi Kohno, Jon Callas, Jesse Walker. The Skein Hash Function Family. 2010. https://www.schneier.com/skeinl.3.pdf http://en.wikipedia.org/wiki/Skein_(hash_function)

[39] A. F. Webster and S. E. Tavares. On the Design of S-Boxes. Advances in Cryptology. CRYPTO 85 Proceedings. LNCS 218. Springer, 523-534, 1986.

[40] Fouz Sattar and Muid Mufti. Spectral Characterization and Analysis of Avalanche in Cryptographic Substitution Boxes using Walsh-Hadamard Transformations. International Journal of Computer Applications. 28 No. 6. August 2011.

[41] Michael Stephen Fiske. Non-autonomous Dynamical Systems Applicable to Neural Computation. Northwestern University. 1996.

[42] Mike Spivak. Differential Geometry. Volume I. Publish or Perish, Inc. 1979.

[43] Nathan Jacobson. Basic Algebra I. W.H. Freeman and Company. 1985.

[44] Daniel Bernstein. Curve25519: new Diffie-Hellman speed records. Public Key Cryptography. LNCS 3958. New York, Springer. 207-228, 2006. http://cr.yp.to/ecdh/curve25519-20060209.pdf

[45] Neil Koblitz. Introduction to Elliptic Curves and Modular Forms. Springer-Verlag 1984.

[46] Joseph Silverman and John Tate. Rational Points on Elliptic Curves. Springer-Verlag 1992.

The invention claimed is:

1. A machine-implemented method of encrypting information, comprising:
   providing, by a machine, information and a key generator;
   using, via the machine, said key generator to help construct a state generator, wherein a one-way hash function is applied to two different portions of the key generator and resulting two message digests are compared to generate the next state;
   using, by the machine, a sequence of states, created by said state generator of the machine to encrypt information, by the machine.

2. The method of claim 1, wherein a sequence of permutations are applied to a sequence of said encrypted information where said permutations permute encrypted information across a whole block.

3. The method of claim 2, wherein said block has a size of at least 16 bytes.

4. The method of claim 3, wherein a one-way function is applied to said key generator at least once after a block has been encrypted.

5. The method of claim 1, wherein said one-way hash function applied is one of the following: SHA-1, SHA-256, SHA-512, Keccak, BLAKE, GrØstL, JH, or Skein.

6. A machine-implemented method of encrypting information, comprising:
   providing, by a system, information and a key generator, the system including at least one machine having a processor system having at least one processor and a memory system;
   providing, by the system, a block cipher;
   the providing of the block cipher including at least encrypting, by the system, one or more blocks of the block cipher based on the key generator;
   after encrypting the one or more blocks of the block cipher, updating, by the system, the key generator, based on one-way function to form an updated key generator.

7. The method of claim 6, wherein said one-way function is a one-way hash function.

8. The method of claim 7, wherein said one-way hash function is SHA 1.

9. The method of claim 7, wherein said one-way hash function is one of the following:
   SHA-256 or SHA-512.

10. The method of claim 7, wherein said one-way hash function is one of the following:
    Keccak, BLAKE, GrØstL, JH, or Skein.

11. The method of claim 6, wherein key generator updating includes an operation that exclusive-or's at least part of key generator with a digest that results from applying a one-way hash of at least part of key generator.

12. The method of claim 11, wherein said key generator updating includes an operation that rotates said key generator.

13. The method of claim 6, wherein said one-way function exhibits a good avalanche effect.

14. The method of claim 6, wherein said block cipher is AES.

15. The method of claim 14, wherein said AES block cipher uses a 256-bit AES key derived from said key generator whose size is greater than 256 bits.

16. The method of claim 15, wherein at least two distinct 256-bit AES keys are derived from said key generator and used to encrypt at least two distinct blocks.

17. The method of claim 14, wherein said AES block cipher uses a 128-bit AES key derived from said key generator whose size is greater than 128 bits.

18. The method of claim 17, wherein at least two distinct 128-bit AES keys are derived from said key generator and used to encrypt at least two distinct blocks.

19. The method of claim 6, wherein said block cipher is DES.

20. The method of claim 6, wherein said key generator has a size greater than 256 bits.

21. The method of claim 6, wherein said method encrypts a phone call.

22. The method of claim 6, wherein said method encrypts information transmitted across the Internet.

23. The method of claim 6, wherein a permutation operates on said encrypted information where said operation permutes encrypted information across a block.

24. The method of claim 23, wherein a one-way function is applied at least once to a key generator corresponding to said permutation and wherein permutation is updated at least once based on the updated key generator.

25. The method of claim 24, wherein transposition operations are used in updating of the permutation and transposition operations depend at least partly on said updated key generator.

26. The method of claim 6, wherein one or more permutations that represent substitution boxes, the one or more permutations operate on said encrypted information one or more times where each operation is a substitution based on a permutations representing a substitution box.

27. The method of claim 26, wherein a one-way function is applied at least once to a key generator corresponding to said permutation and wherein said permutation is updated at least once based on this updated key generator.

28. The method of claim 27, wherein transposition operations are used in said updating of permutation and the transposition operations depend at least partly on said updated key generator.

29. The method of claim 6, wherein the key generator is larger than key generated by the key generator.

30. A machine-implemented method of encrypting information, comprising:
    providing, by a system including a machine, information and a key generator;
    generating, by the system, an initial permutation from the key generator,
    permuting, by the system, the information, based on the initial permutation, to perform a substitution, a substitution box represented by the permutation, and;
    substituting, by the system, elements of the information for other information one or more times based on updated based on the permuting.

31. The method of claim 30, wherein a one-way function is applied at least once to said key generator and wherein said permutation is updated at least once based on this updated key generator.

32. The method of claim 31, wherein transposition operations are used in said updating of permutation and the transposition operations depend at least partly on said updated key generator.

33. The method of claim 31, wherein said one-way function is a one-way hash function and said key generator updating includes an operation that exclusive-or's at least part of key generator with a digest that results from applying a one-way hash of at least part of key generator.

34. The method of claim 33, wherein said key generator updating includes an operation that rotates said key generator.

35. The method of claim 30, further comprising:
substituting, by the machine, elements of the information for other information one or more times based on at substitution box.

36. A machine-implemented method of encrypting information, comprising:
providing, by a system, information and a key generator, the system including a processor system including at least one processor and a memory system;
generating, by the system, an initial permutation from the key generator;
wherein a permutation, performed by the system, permutes the information across a block.

37. The method of claim 36, wherein a one-way function is applied at least once to said key generator and wherein said permutation is updated at least once based on this updated key generator.

38. The method of claim 37, wherein transposition operations are used in said updating of permutation and the transposition operations depend at least partly on said updated key generator.

39. The method of claim 37, wherein said one-way function is a one-way hash function and said key generator updating includes an operation that exclusive-or's at least part of key generator with a digest that results from applying a one-way hash of at least part of key generator.

40. The method of claim 39, wherein said key generator updating includes an operation that rotates said key generator.

41. The method of claim 36, further comprising
applying a one-way hash function, by the machine, at least once to the key generator
updating the permutation at least once based on the key generator that was updated, and
wherein updating the permutations includes applying an exclusive-or to at least part of the key generator with a digest that results from applying a one-way hash of at least part of the key generator.

42. A machine-implemented method of encrypting information, comprising:
providing, by a system, information, the system including a processor system including at least one processor and a memory system;
providing, by the system, a key generator;
constructing, by the processor system, a state generator based on said key generator, the constructing including at least applying a one-way hash function to two different portions of the key generator, therein resulting in two message digest, and comparing the two message digests to generate a next state; and
encrypting, by the system, data based on a sequence of states that is created by said state generator of the system, to encrypt the data.

43. The method of claim 42, wherein the one way function has a an avalanche effect, such that an average of one half of the output bits of the one way function change whenever a single input bit is complemented as compared to when the one way function is applied to the input without the bit being changed.

44. The method of claim 42, wherein the two message digests include a first message digest that results from applying the one-way hash function to a first portion of the two portions of the key generator and a second message digests that results from applying the one way function to a second portion of the two portions of the key generator.

45. The method of claim 42, wherein a sequence of permutations are applied to a sequence of said encrypted information where said permutations act as substitution boxes.

46. The method of claim 45, wherein a one-way function is executed at least once to help update the substitution box used to encrypt a next block of information.

47. The method of claim 42, wherein said method encrypts a phone call.

48. The method of claim 42, wherein said method encrypts information transmitted across the Internet.

* * * * *